United States Patent [19]
Blasing et al.

[11] Patent Number: 6,052,582
[45] Date of Patent: *Apr. 18, 2000

[54] SECTORIZED MULTI-FUNCTION COMMUNICATION SYSTEM

[75] Inventors: Raymond R. Blasing, San Jose; Edward A. Keible, Palo Alto, both of Calif.; Paul Likins, Southport, Conn.; Douglas G. Lockie, Monte Sereno; Clifford A. Mohwinkel, San Jose, both of Calif.

[73] Assignee: Endlink Corporation, Stamford, Conn.

[ * ] Notice: This patent is subject to a terminal disclaimer.

[21] Appl. No.: 09/019,821

[22] Filed: Feb. 12, 1998

Related U.S. Application Data

[63] Continuation of application No. 08/519,476, Aug. 25, 1995, Pat. No. 5,771,449, which is a continuation-in-part of application No. 08/210,404, Mar. 17, 1994, abandoned.

[51] Int. Cl.[7] ...................................................... H04B 1/38
[52] U.S. Cl. ........................................... 455/422; 455/562
[58] Field of Search ...................................... 455/422, 429, 455/449, 561, 562, 517, 524; 343/824; 380/20

[56] References Cited

U.S. PATENT DOCUMENTS 2,288,802   7/1942   Hammond, Jr. .
4,525,861   7/1985   Freeburg .
4,528,656   7/1985   Morais .
4,633,463   12/1986  Mack .
4,704,733   11/1987  Kawano .
4,747,160   5/1988   Bossard .
4,783,664   11/1988  Karikomi et al. .
4,785,450   11/1988  Bolgiano et al. .

(List continued on next page.)

FOREIGN PATENT DOCUMENTS 0179612    10/1985   European Pat. Off. .
0201254    4/1986    European Pat. Off. .
0361299    9/1989    European Pat. Off. .
1024523    9/1950    France .
1586260    12/1977   Germany .
2659638    5/1978    Germany .
2261575    11/1992   United Kingdom .
PCT/SE90/
  00681    of 0000   WIPO .
90/03088   3/1990    WIPO .
PCT/DE93/
  00382    5/1993    WIPO .

OTHER PUBLICATIONS

"Xerox Corporation Petition for Rule Making" submitted to the Federal Communications Commission (RM–3247) filed Nov. 16, 1978 including appendixes, 135 pages.
"Reply of Xerox Corporation" submitted to the Federal Communications Commission (RM–3247) filed Jan. 30, 1979, 20 pages.
"Comments of Xerox Corporation" submitted to the Federal Communications Commission (RM–3247) filed Jan. 14, 1980, 75 pages.
George Jacobs, "Low Power Television", IEEE Spectrum, Jun. 1982.

(List continued on next page.)

Primary Examiner—Reinhard J. Eisenzopf
Assistant Examiner—Sam Bhattacharya
Attorney, Agent, or Firm—Edward B. Anderson; Thomas N. Giaccherini

[57] ABSTRACT

The preferred embodiment of the present invention is a communications apparatus which includes a first transmitting antenna array (15A) having a transmitting antenna (16) which is dedicated to serve only a first sector (12). Similarly, a second transmitting antenna array (17A) having a transmitting antenna (18) is dedicated to serve only a second sector (14). Each of the transmitting antenna arrays (15A, 17A) have a beamwidth (19) of generally less than fifteen degrees. Both the first and the second transmitting antenna arrays (15A, 17A) emanate shaped beams which are alternately polarized to ensure the isolation of beams that serve adjacent sectors.

11 Claims, 45 Drawing Sheets

U.S. PATENT DOCUMENTS

| | | |
|---|---|---|
| 4,845,504 | 7/1989 | Roberts et al. . |
| 4,916,737 | 4/1990 | Chomet et al. . |
| 4,920,567 | 4/1990 | Malek . |
| 5,003,384 | 3/1991 | Durden et al. . |
| 5,021,801 | 6/1991 | Smith et al. . |
| 5,175,878 | 12/1992 | Davis et al. . |
| 5,212,830 | 5/1993 | Miller . |
| 5,280,297 | 1/1994 | Profera, Jr. . |
| 5,319,455 | 6/1994 | Hoarty et al. . |
| 5,388,101 | 2/1995 | Dinkins . |
| 5,491,739 | 2/1996 | Wadin et al. . |
| 5,581,260 | 12/1996 | Newman ............................ 455/277.2 |
| 5,649,293 | 7/1997 | Reed ...................................... 455/447 |
| 5,771,449 | 6/1998 | Blasing et al. .......................... 455/562 |

OTHER PUBLICATIONS

Donald Silverman, "The Digital Termination System Solution for High Speed Local Distribution", Microwave Journal, Jan. 1983.

Cooper & Nettleton, "Cellular Mobile Technology: The Great Multiplier", IEEE Spectrum, Jun. 1983.

Murakami et al., "Multiple Access Digital Microwave Radio System for Local Subscribers", IEEE International Conference on Communications '83, Jun. 1983, pp. b.2.5.1.

Urich & Bohm, "Digital Termination Systems", Computerworld, 6 Jun. 1984, pp. 35–38.

Mihelich, "Mitchell Commits to Cellular Television Study", Private Cable, Feb. 1991.

Hardy & Lemp, "New Autoplex Cell Site Paves the Way for Digital Cellular Communications", AT&T Technology, No.4, 1990, pp. 20–25.

Edward C. Dufort, "Constrained Feeds for Limited Scan Arrays", IEEE, May 1978, pp. 407–413.

Robert J. Maillous, "An Overlapped Subarray for Scan Application", IEEE Transactions on Antennas and Propogation, May 1974, pp. 487–489.

| INTERDICT TABLE | | | | | | | | | | |
|---|---|---|---|---|---|---|---|---|---|---|
| CHANNEL | 2 | 3 | 4 | 5 | 6 | . | . | 25 | 26 | . |
| ALLOWED | 1 | 1 | 1 | 0 | 1 | . | . | 1 | 0 | . |

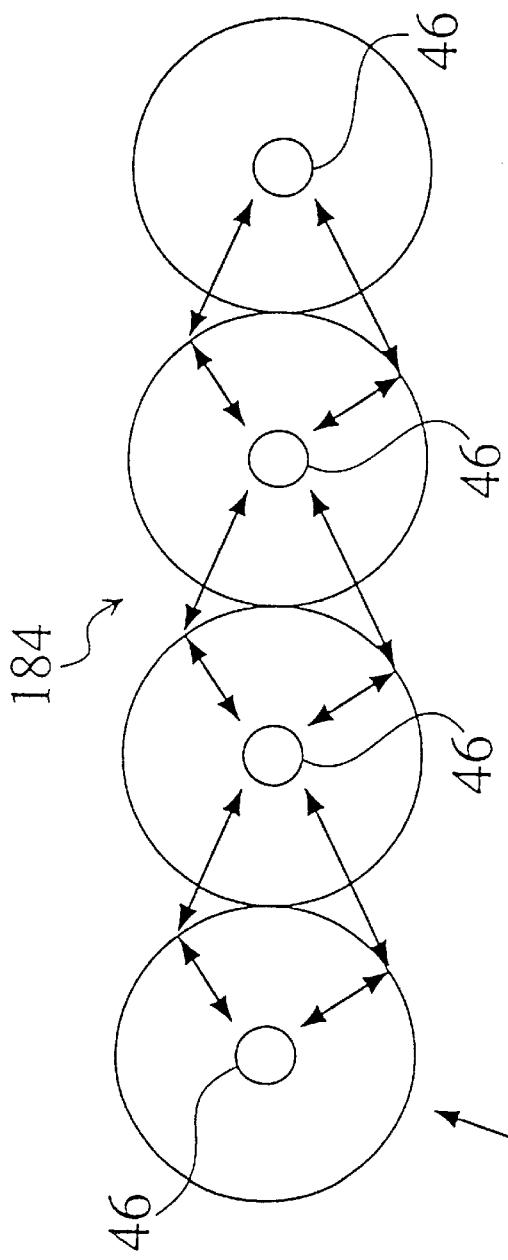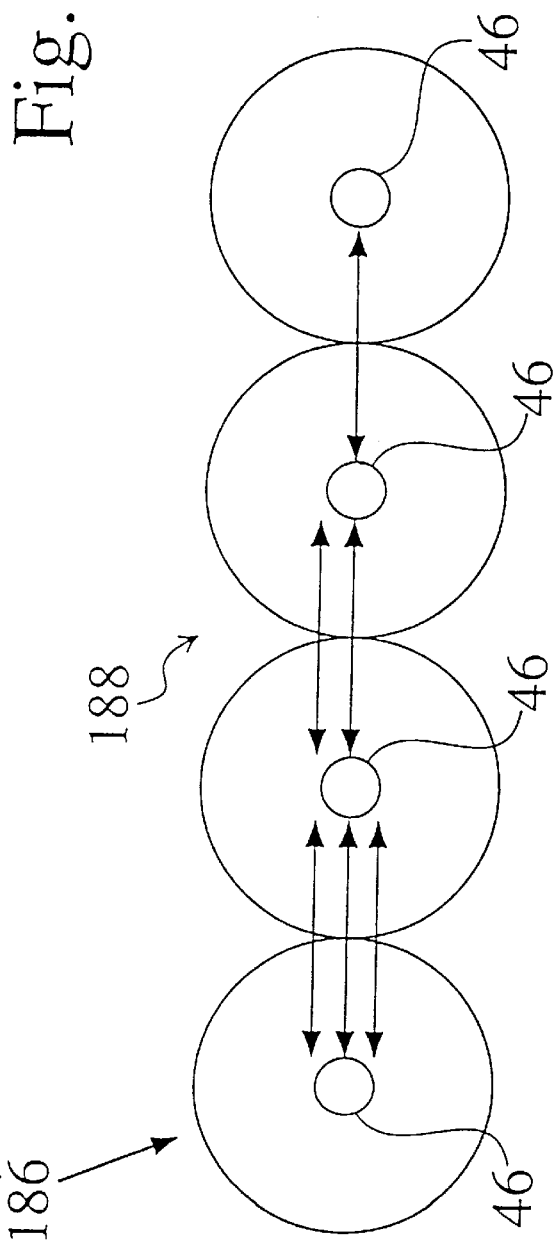
Fig. 32

1 - MAIN BEAM
2 - FIRST SIDELOBE
3 - SECOND SIDELOBE
4 - RECEIVER IN SECOND ADJACENT SECTOR
5 - RECEIVER IN FIRST ADJACENT SECTOR
6 - RECEIVER ON SECTOR BOUNDARY
7 - TRANSMITTER
8 - SPILLOVER

1 - TRANSMISSION FROM ORIGINAL CELL
2 - RECEIVERS SUBJECT TO INTERFERENCE

1 - TRANSMISSION FROM ORIGINAL CELL
2 - RECEIVERS SUBJECT TO MAXIMUM INTERFERENCE

SECTORIZED MULTI-FUNCTION COMMUNICATION SYSTEM

CROSS-REFERENCE TO RELATED PATENT APPLICATIONS

This is a Continuation Application of application Ser. No. 08/519,476, filed Aug. 25, 1995, now U.S. Pat. No. 5,171,449 which is a Continuation-in-Part Application, and is related to a commonly-owned Patent Application entitled Sectorized Multi-Function Communication System by Raymond R. Blasing et al., which was filed on Mar. 17, 1994 and which was assigned U.S. Ser. No. 08/210,404, now abandoned. The inventors hereby claim the benefit of priority under Section 120 of Title 35 of the United States Code of Laws for any and all subject matter which is commonly disclosed in the Present Application and in the Patent Applications assigned U.S. Ser. Nos. 08/210,404 and 08/519,476. The inventors hereby claim the benefit of priority under Section 119 of Title 35 of the United States Code of Laws for any and all subject matter which is commonly disclosed in the Present Application and in the PCT International Application No. PCT/US95/02977 filed on Mar. 16, 1995.

FIELD OF THE INVENTION

The present invention relates to the field of communication systems. More particularly, this invention comprises an extension of the telephone communications network or a stand-alone communications system which is capable of providing two-way broadband links, selectable video-on-demand, wireless cable services and enhanced audio programming.

BACKGROUND OF THE INVENTION

In recent years, the demand for communications capacity has increased dramatically. Governments, businesses and individuals produce prodigious quantities of information at ever increasing rates, and also stoke the demand for high speed transfers of data, voice and video signals. More powerful personal computers and software are now able to create large database, real-time video, graphics and multimedia files. While our ability to generate information has skyrocketed, our ability to distribute and exchange this information is limited by the embedded narrow band infrastructure of the existing local telephone systems. Although the world is wired with over a billion miles of copper and has tens of millions of miles of installed optical fiber, this network is severely constrained by the bottleneck which resides at the interface between the local telephone company and its customers' premises, i.e., the "last mile". The gradual addition of more optical fibers and the implementation of various compression technologies can ameliorate this critical fault in the existing communications environment, but ultimately at great cost and on a schedule which will require several decades for completion.

Several attempts to solve the problem of distributing information to large numbers of subscribers have met with mixed results.

U.S. Pat. No. 2,288,802 issued to John Hays Hammond in 1942 and entitled Signalizing System discloses a radio transmission system which employs a carrier wave that is transmitted in two substantially independent channels. The channels are "made independent" by using polarizations which propagate at right angles to each other. The carrier waves may also be modulated "by the same signal frequency, but with a predetermined phase relationship between the two modulations." See Hammond, Column 1, Lines 1–24.

U.S. Pat. No. 4,747,160, issued to Bernard Bossard on May 24, 1988 and entitled Low Power Multi-Function Cellular Television System describes a network of low power, substantially omni-directional cell node transmitters which communicate with a directional receiving antennas. Bossard's omni-directional transmitter imposes severe constraints on the ability of this system to provide diverse information services to many different customers.

One particular disadvantage of Bossard's system, which is due to its omni-directional signal, is the limitation of the system to compensate for rainfall in small portions of customer cells. Since the entire signal must be amplified at an omni-directional broadcast node, the system runs the risk of overpowering the signal to customers which are unaffected by the storm fronts. Bossard compensates for this constraint by limiting cell size.

Another severe limitation of the Bossard invention is the inability of the Bossard system to transmit to a single customer, or to transmit different signals to many different customers. The cell size in Bossard's system is also limited to the amount of power generated, which is dependent on the available (TWT) of about 100 watts. The base case for Bossard's system might be a quadratic cell for a "substantially" omni-directional system, in which a 100 watt TWT might be located in each of four quadrants of a broadcast cell, limiting the cell broadcast power to approximately 400 watts.

In 1977, Xerox Corporation initiated work on the Xerox Telecommunications Network (XTEN), a nationwide, high-speed, end-to-end, digital communications service. ATEN was designed to provide local data services using a combination of substantially omni-directional transmission from cell nodes and point-to-point return links from transceivers located at business premises. Local networks were to be connected by intercity satellite or terrestrial "backbone" facilities. See Xerox Petition for Rulemaking, filed with the Federal Communications Commission on Nov. 16, 1978. See also Xerox Comments on the DTS Notice of Proposed Rulemaking, filed with the Federal Communications Commission on Jan. 14, 1980.

Siemens Corporation received Patent No. 1,586,260 from the Federal Republic of Germany in 1977. This patent, entitled A Radio Telecommuncations System, discusses a system which connects stationary subscriber stations to a telecommunications network such as a public telephone network. A radio concentrator, assigned to a dial-operated exchange, is connected to the stationary subscribers via an omni-directional antenna. See Siemens '260, Column 1, Lines 9–13 and Lines 21–24.

Siemens was also awarded French Patent No. 1,024,523 entitled Réseau d'émetteurs dondes Ultra-courtes, which also pertains to transmission of radio and television programs. See Siemens '523, Resumé, Colunin 4.

In June of 1982, George Jacobs published a paper entitled Low Power Television in IEEE Spectrum. Jacobs explains the impact of the development of short-range, low-cost television systems. FIG. 3 of his article reveals the components of a low-power television station designed to produce electromagnetic power of a kilowatt or less.

Donald Silverman offers an analysis of an integrated, end-to-end digital communications service which may be used to augment existing inter-city network facilities in his paper entitled The Digital Termination System Solution for High Speed Local Distribution. This paper was published in the January, 1983 edition of Microwave Journal.

The IEEE Spectrum published a paper in June, 1983 by George Cooper and Ray Nettleton entitled Cellular Mobile Technology: The Great Multiplier. This article discusses the advantages of a cellular mobile communications system, interference problems, narrowband modulation, digital transmission, space diversity techniques which reduce fading and spread-spectrum and frequency hopping methods.

In their paper entitled Multiple Access Digital Microwave Radio System for Local Subscribers, Nasatoshi Murakami et al. describe a radio communication system which provides point-to-multipoint digital transmission in a metropolitan area. See IEEE International Conference on Communications '83, June 1983, pp. b2.5.1.

In an article entitled Digital Termination Systems, Walter Urich and Ronald Bohm describe a common carrier service designed to provide flexible, low-cost digital communications within a community using a portion of the microwave spectrum. See Computerworld, Jun. 6, 1984, pages 35–38.

In U.S. Pat. No. 4,525,861 issued in 1985, Thomas Freeburg explains the details of his Zoned Data Communications System for Communicating Message Signals between Portable Radios and a Host Computer. This system serves a geographic area that is divided into a number of non-overlapping zones. Signals carrying alphanumeric information are conveyed among a general communications controller and a number of portable radios. See Freeburg, Abstract, Lines 1–9.

Douglas Morais describes a Radio Communication System Using Frequency Division Multiplexing for Transmission between a Master Station and a Plurality of Remote Stations in his U.S. Pat. No. 4,528,656, printed in 1985. Morais' point-to-multipoint radio communication system includes a master station and a number of remote stations which communicate using frequency division multiplexing.

Alfred Mack discusses his Radio Communication System in his U.S. Pat. No. 4,633,463, granted in 1986. Mack's invention pertains to tactical military applications, and includes at least one remote station associated with each of several central stations. Each central station is connected to an omni-directional antenna, while each remote station is connected to a directional antenna. Each central station transmits at a distinct frequency, and each remote station is tuned to receive only the one frequency which is transmitted by its associated central station. See Mack, Abstract, Lines 1–11.

Minoru Kawano was granted U.S. Pat. No. 4,704,733 for his Cell Enhancer for Cellular Radio Telephone System Having Diversity, Function in 1987. His invention concerns a cell enhancer for use by one cellular provider in a cellular radio-telephone system. This cell enhancer has an "upstream" antenna system directed at the cell site for receiving the transmitted down-link signal from the cell site. See Kawano, Abstract, Lines 1–10 and Column 2, Lines 38–42.

John R. Mihelich published a paper entitled Mitchell Commits to Cellular Television Study in the February, 1991 edition of Private Cable. Mihelich discusses the prospects for universal multi-channel cellular television service.

Siemens holds German Patent No. 2659638, which is entitled Funksystem zum Anschluβ ortsfester Teilnehmerstationen an ein Nachrichtennetz.

European Patent Application No. 86303185.2, by Acampora et al., describes a terrestrial radio system which utilizes spot beam time division multiple access and frequency re-use to provide communication services from a base station to remote customer within a system service region.

PCT Patent Application No. PCT/SE90/00681, by Ahl et al., describes a method and a communications system for local dynamically connectable digital synchronous multiplex service networks. PCT Patent Application No. PCT/DE93/00382, by Ritter et al., describes a mobile radio network with central cell beaming.

U.S. Pat. No. 4,785,450, by Bolgiano et al., describes a communication system that comprises a plurality of subscriber stations in RF communication with a base station having multiple sequentially repetitive time slots.

In the article entitled New AUTOPLEX Cell Site Paves The Way For Digital Cellular Communications, Hardy and Lemp describe a cell site that has distributed rather than centralized control.

European Patent Application No. 85307456.5, by Horne, describes a cryptographic system for a direct broadcast satellite network. Ascom Zelcom AG has filed European Patent Application No. 89117388.2, which is entitled Digitales Funkübertragungssystem für ein aus Zellen aufgebautes Netz unter Verwendung der Bandspreiztechnik.

UK Patent Application No. GB 2 261 575 A, by Marsh et al., describes a method of establishing a telecommunications network between subscriber stations and their associated local station. The network is managed using a system controller.

The greatest barrier to selectively delivering information to millions of diverse consumers resides at the network-customer interface or "last mile" in the communications network. Overcoming the enormous expense and complexity of supplying specific types of information to many different kinds of customers over this "last mile" has presented a major challenge to the telecommunications industry. The development of an intelligent and versatile local, multiple-point distribution system would constitute a major technological advance and would satisfy a long felt need in the telephone, entertainment and information businesses.

SUMMARY OF THE INVENTION

The present invention comprises a sectorized communication system that is intended as an extension of existing telecommunication networks or as a stand-alone system. The system is designed to support integrated broadband business links which can accommodate two-way videoconferencing, high-speed image and data distribution and multiplexed voice traffic. The present invention also provides residential services including video-on-demand, consumer-selectable television programming and interactive multimedia distribution. Residential telephone services supported by this novel system include voice service and low-speed data transmission.

One of the preferred embodiments of the invention functions as a one-way point-to-multipoint distribution network. A particular geographical region served by the system is mapped with cells that each include a number of wedge-shaped sectors. One or more transmitting antenna arrays are located at a node in each cell. Each transmitting antenna array includes one or more transmitting antennas. A transmitting antenna array is dedicated to serve only one of the sectors in the cell, and has a typical beamwidth of fifteen degrees or less. Receivers are located at customer premises throughout the cells. Like the transmitting antenna array, each receiver is dedicated to operate only within the confines of a predetermined sector. Specifically, each receiver is limited to receive signals from only one of the transmitting antenna arrays. The signals conveyed by the first and second transmitting antenna arrays can be different or the same.

Another embodiment of the invention offers two-way cellular communications. Transmitting and receiving antenna arrays are installed at cell nodes assigned to each serve only one sector. Each transmitting and receiving antenna array includes at least one transmitting antenna and one receiving antenna. These transmitting and receiving antennas convey signals to and from transceivers residing at customer locations in the cell. Like the receivers in the preceding embodiment, the transceivers are constrained to communicate with a predetermined transmitting antenna and a predetermined receiving array.

Connections between cells and between local service areas are made by means of interfaces to telecommunications network facilities, located at the cell nodes. Transmissions arriving over the external network may be fed to any sector or combination of sectors within a cell, leading to the possibility of reusing a block of licensed spectrum as many times as there are individual sectors installed.

The sectorized architecture incorporated into the present invention enables the embodiments described below to provide enhanced and versatile narrow casting capabilities which are not generally offered by previous cellular communication systems. Novel beam shaping and polarization methods are employed to isolate beams serving adjacent cells.

The present invention can utilize dynamic channel allocation to maximize the utilization and re-use of the available frequency spectrum. Bandwidth may be allocated on demand by "intelligent" switching installed at the node of each cell. The system Is also capable of disseminating program information to all subscribers and providing continuous monitoring of system faults.

An appreciation of other aims and objectives of the present invention and a more complete and comprehensive understanding of this invention may be achieved by studying the following description of a preferred and alternative embodiments and by referring to the accompanying drawings.

A BRIEF DESCRIPTION OF THE DRAWINGS

FIGS. 1 and 2 are schematic illustrations of a sectorized communications system.

FIG. 3 portrays sectors which are designed to selectively serve various geographical regions. The invention is capable of attenuating power output for sectors which are affected by adverse weather conditions.

Figure 13:
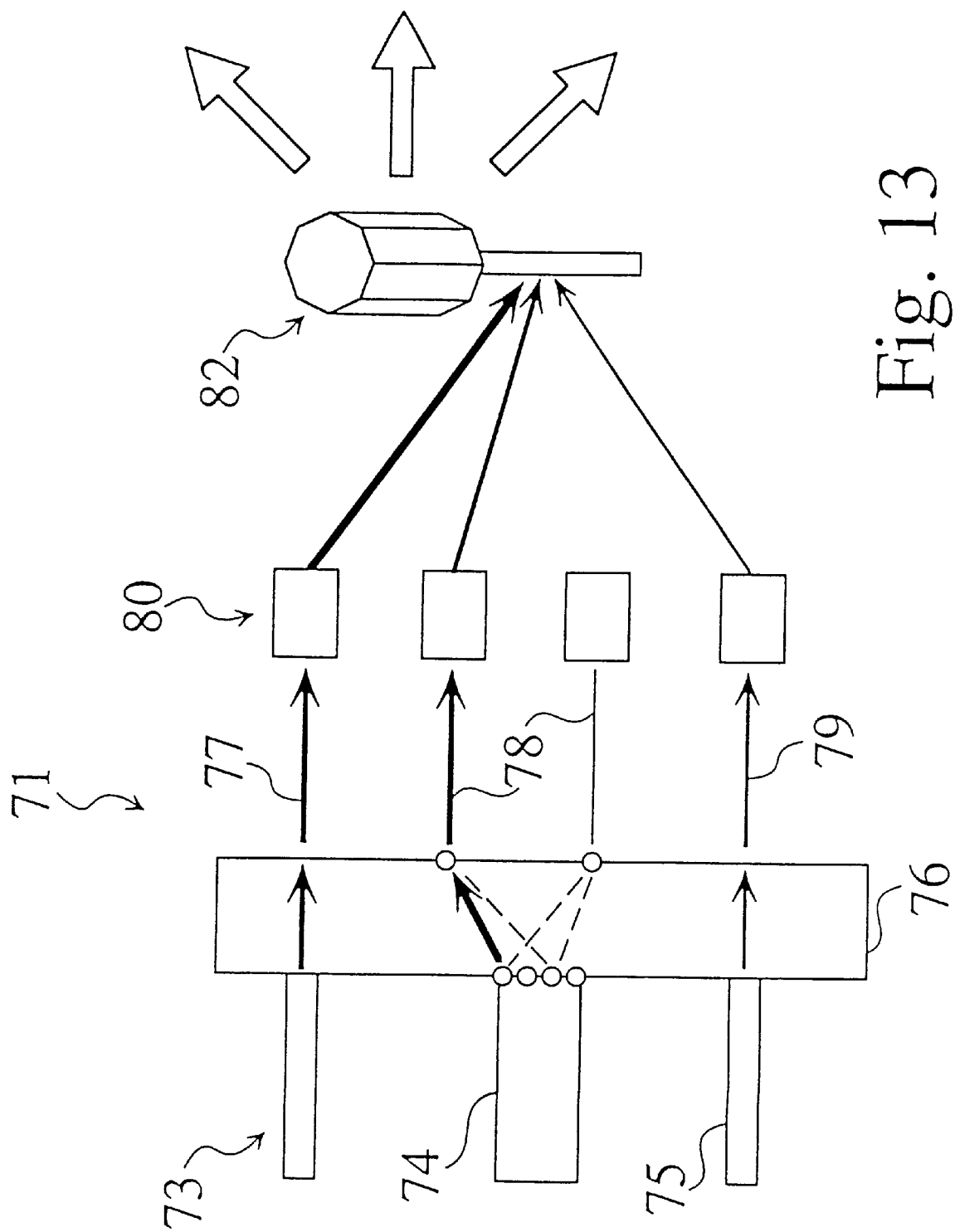

FIG. 13 portrays the switching and transmission of signals as they arrive at the node transmitter.

Figure 14:
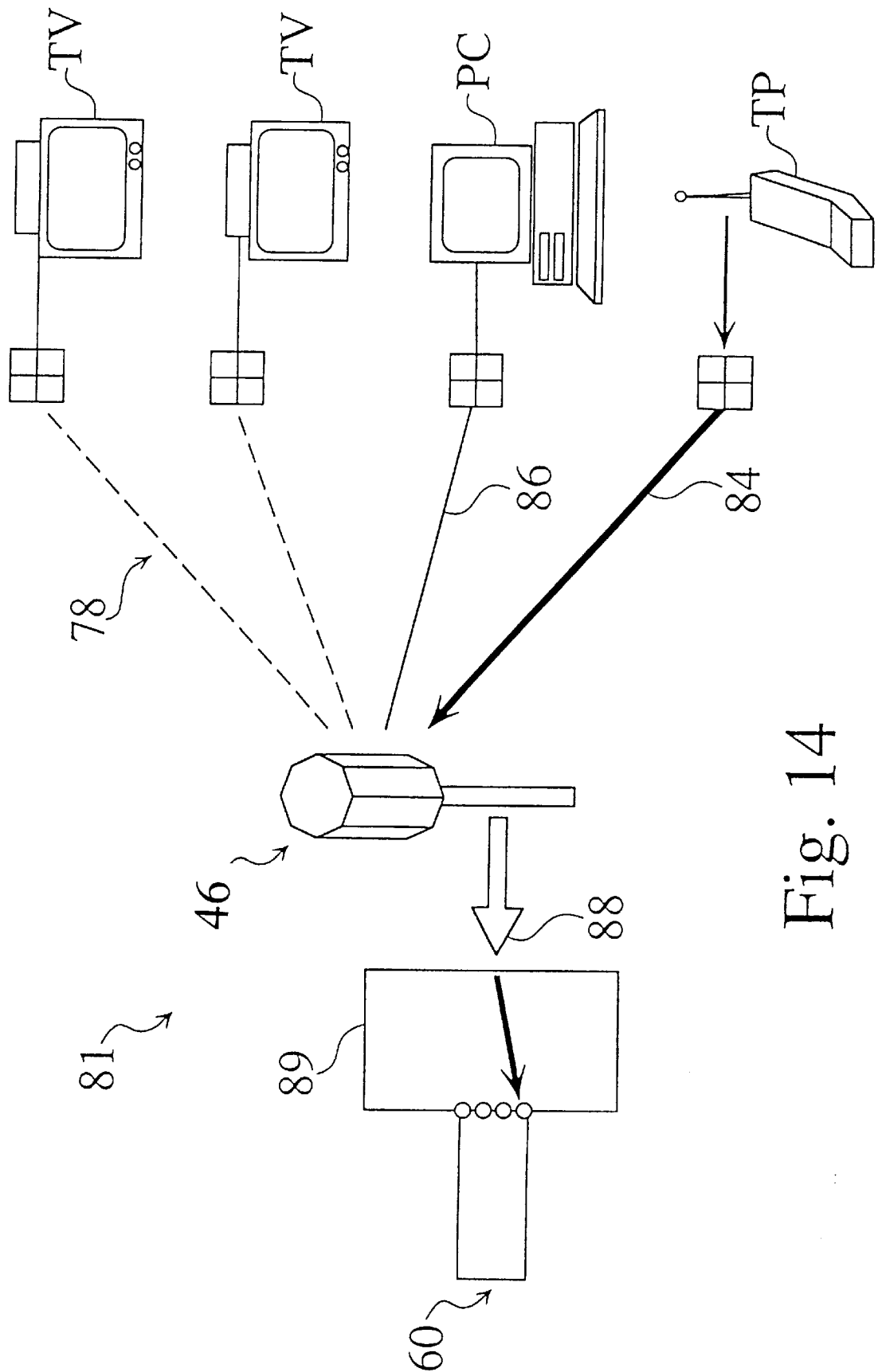

FIG. 14 depicts the distribution of various services that may be selected by individual consumers, including television programming and data and voice communication.

Figure 15:
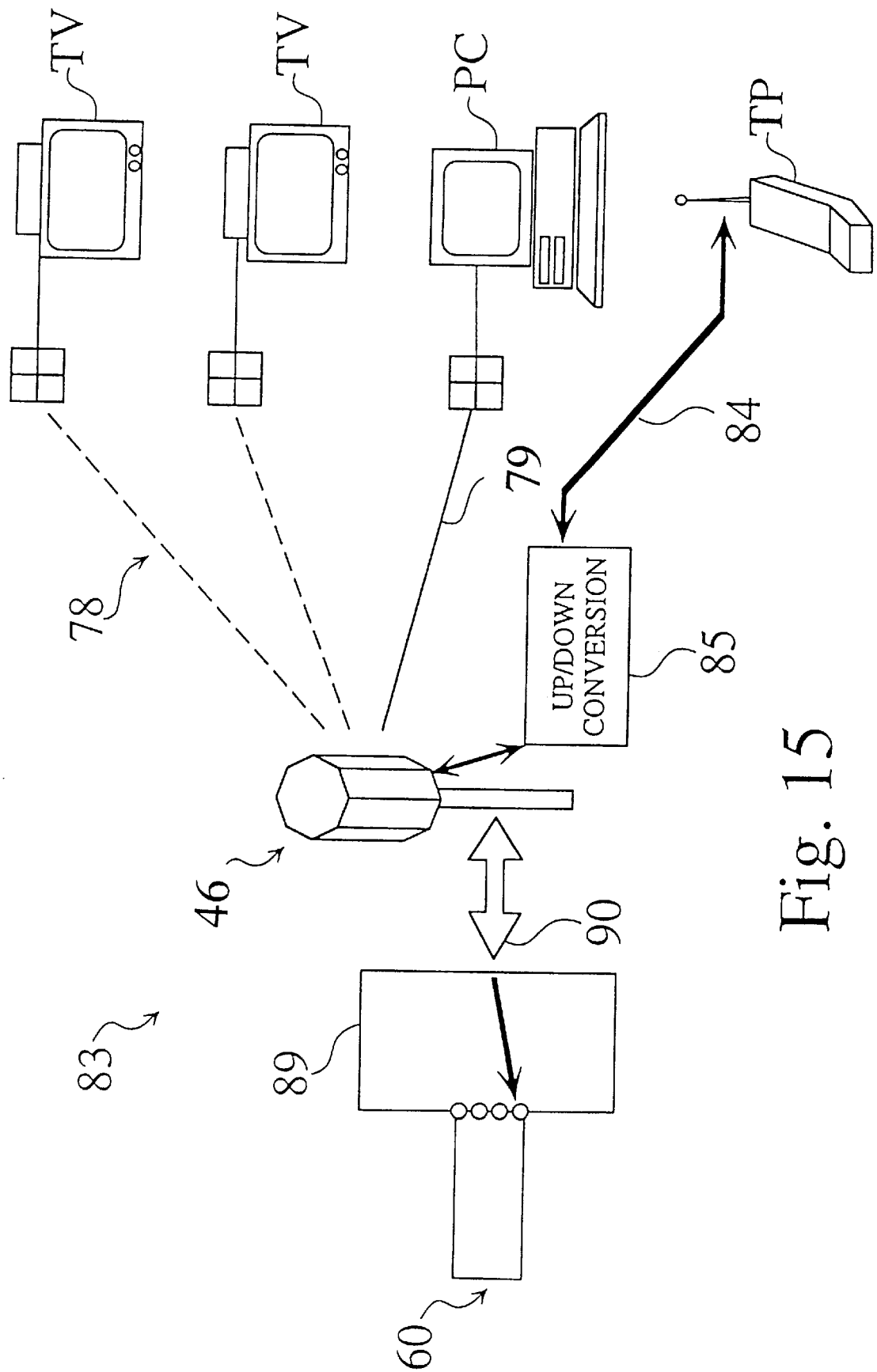

FIG. 15 depicts the same distribution of various services as shown in FIG. 14, but in a dual-frequency system.

Figure 16:
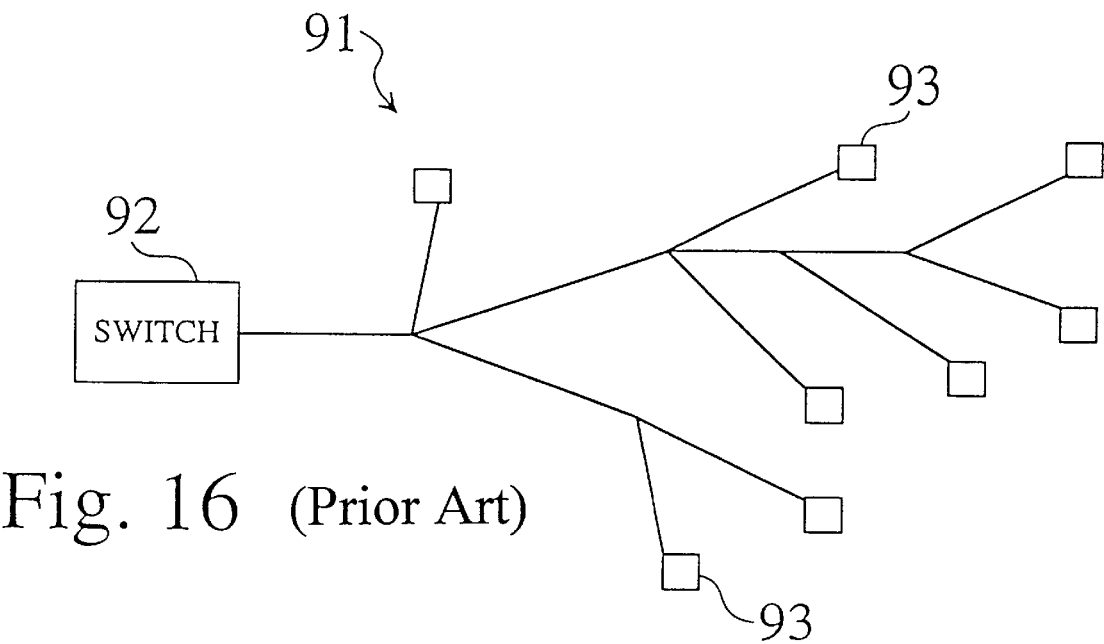

FIG. 16 portrays a conventional cable TV network signal distribution system.

Figure 17:
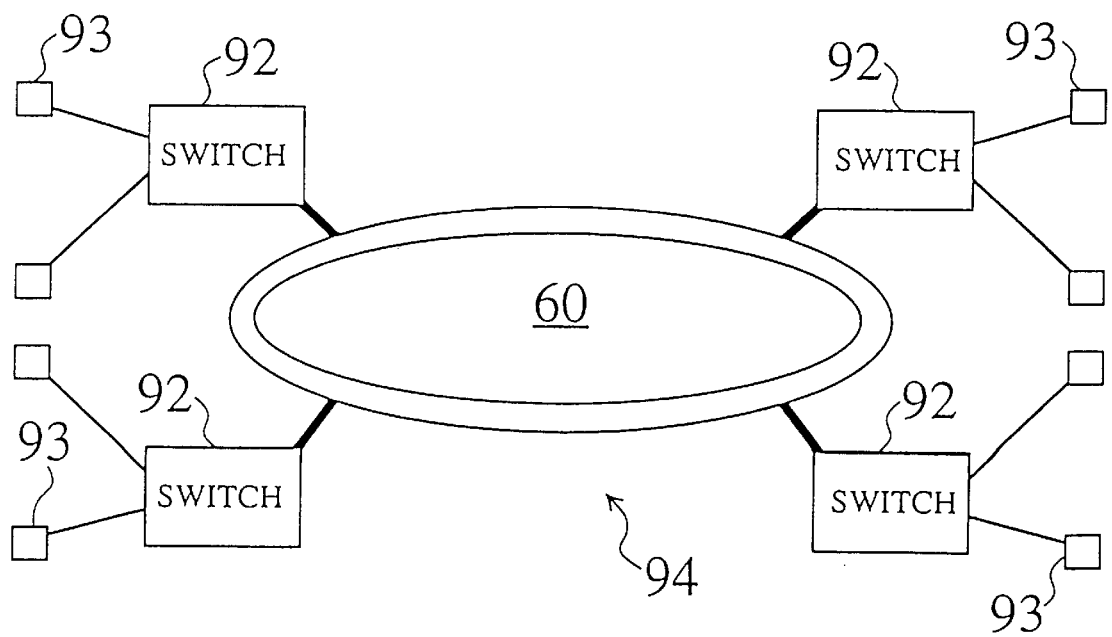

FIG. 17 portrays a conventional telephone network system.

Figure 18:
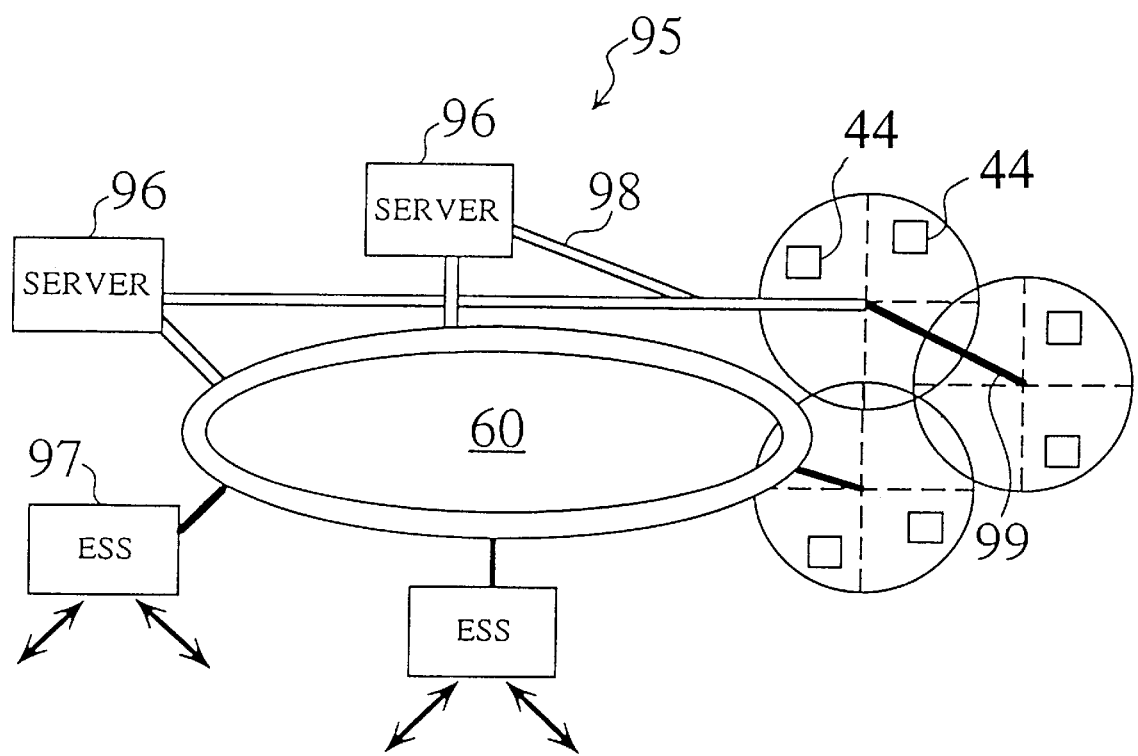

FIG. 18 is an illustration of one of the preferred embodiments of the present invention as an extension of an existing telephone network.

FIGS. 19, 20, 21, 22, 23 and 24 are schematic illustrations of six different embodiments of the Sectorized Multi-Function Communication System.

Figure 25:
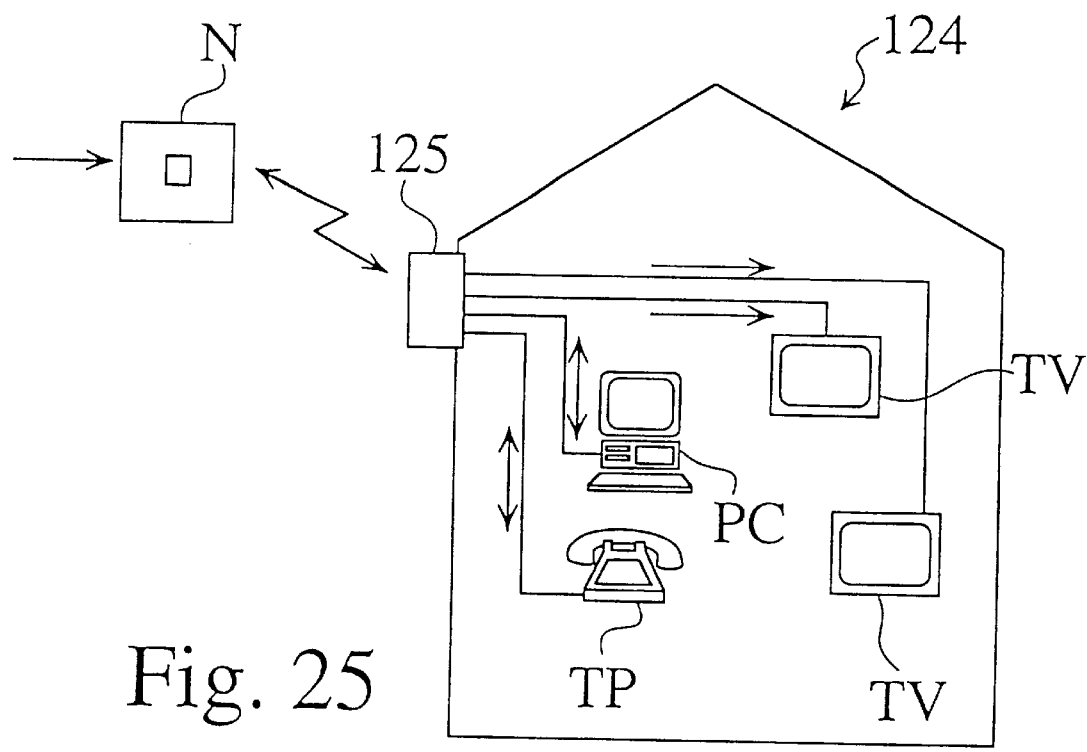
Figure 26:
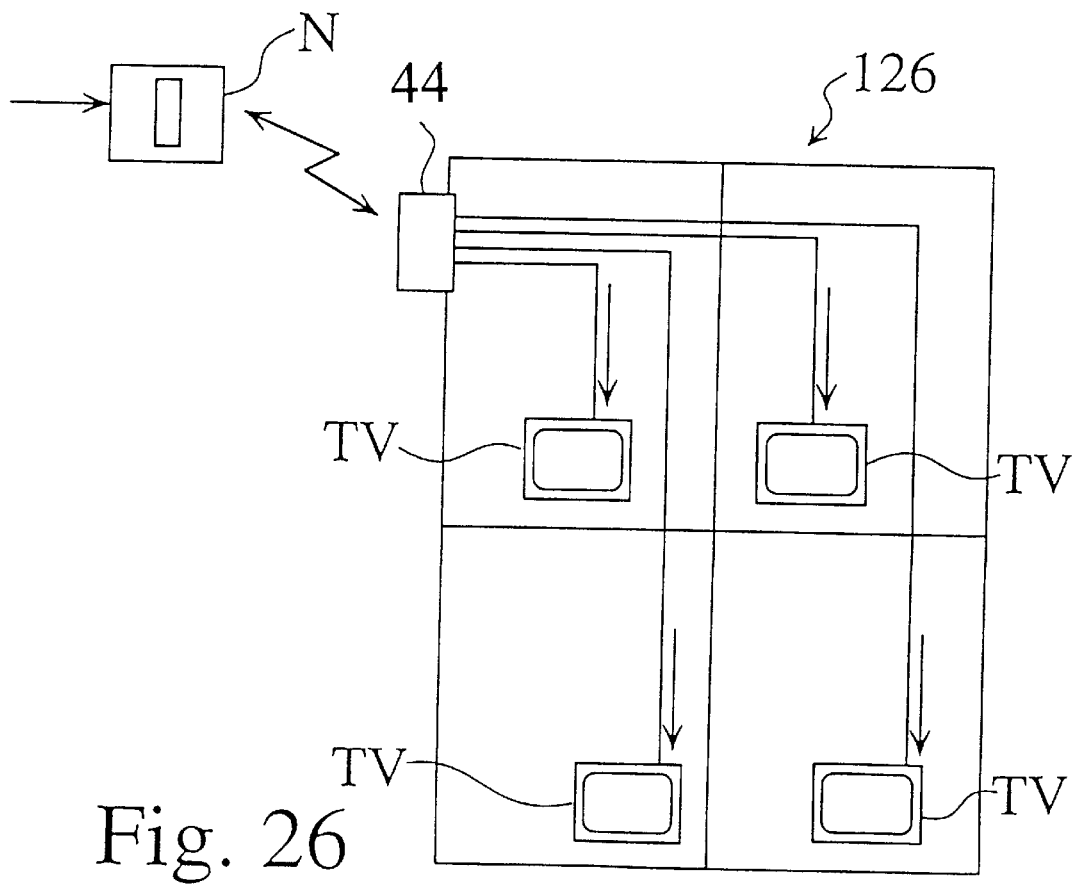

FIGS. 25 and 26 portray two-way communications between cellular nodes and televisions, computers and telephones situated in residential and business environments.

Figures 27, 28:
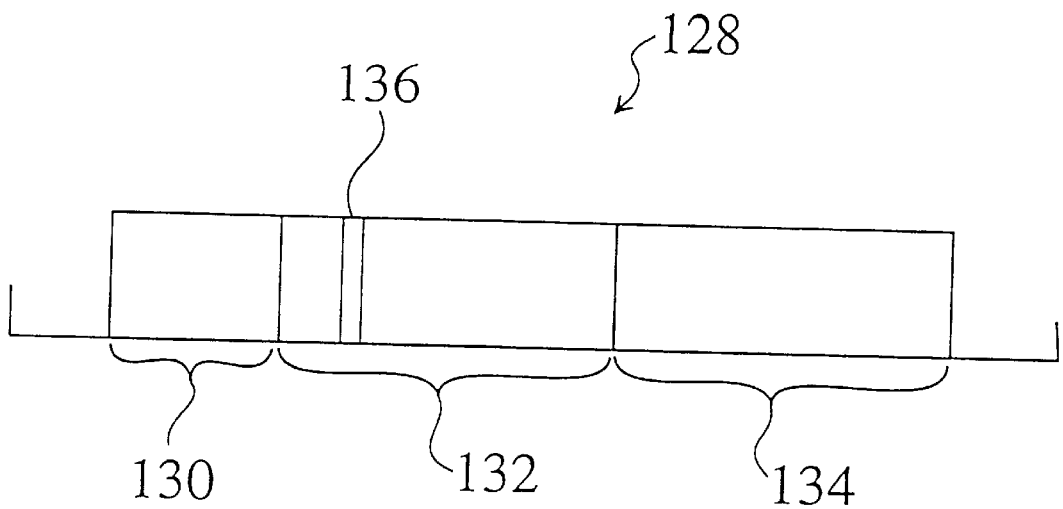

FIG. 27 exhibits an allocation of program channels that may be selected by a customer who subscribes to the advanced wireless cable service that may be offered using the present invention.

FIG. 28 is an interdict table that may be utilized as a filter which blocks access to specific channels shown in FIG. 27.

Figure 29:
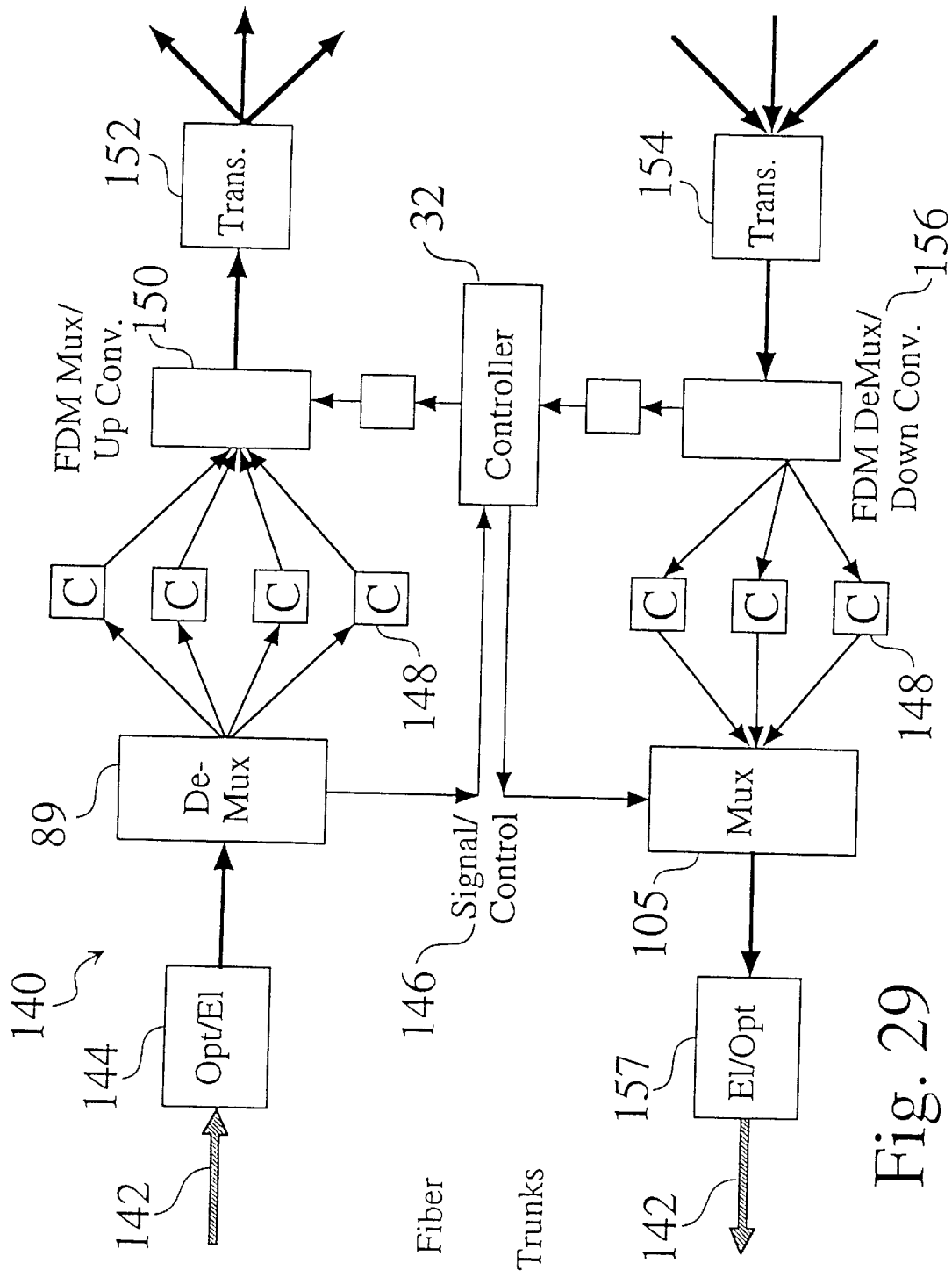

FIG. 29 is a node block diagram.

Figure 30:
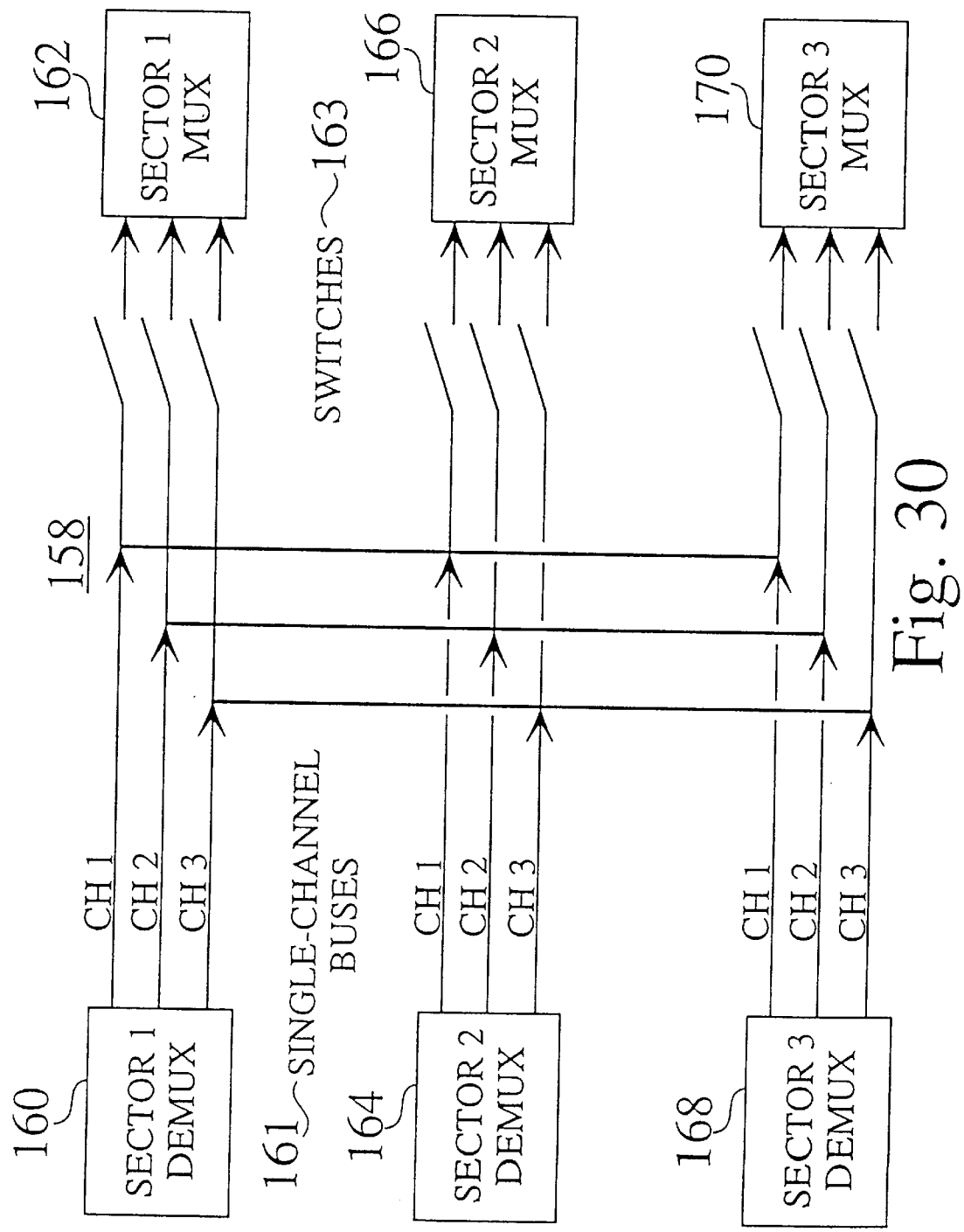

FIG. 30 depicts a switch which may be used in conjunction with embodiments of the present invention.

Figure 31:
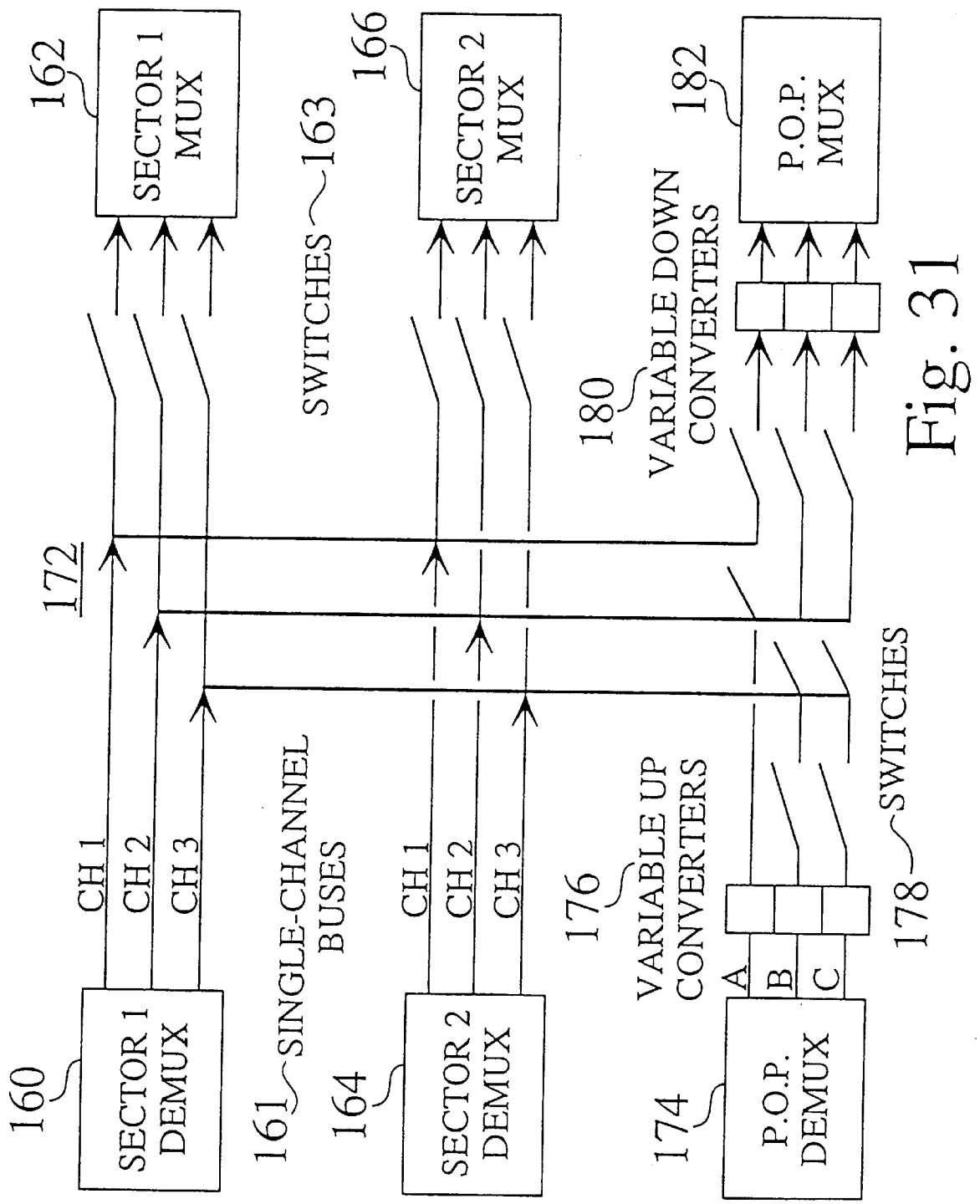

FIG. 31 reveals the details of a point of presence (POP) of a telephone or cable television network.

FIG. 32 is a diagram showing alternate point-to-point routing and links tailored to traffic density.

Figure 33:
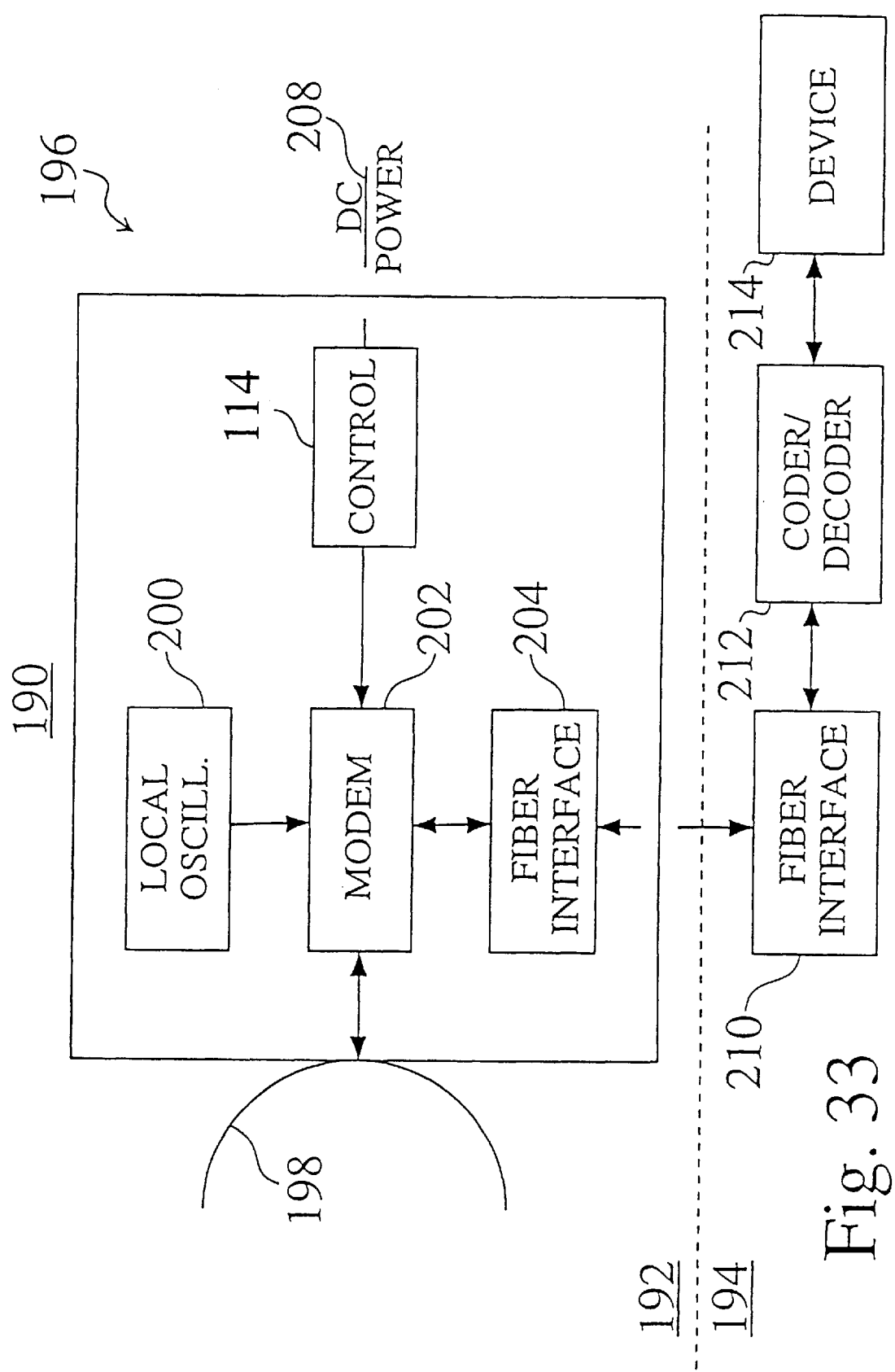
Figure 34:
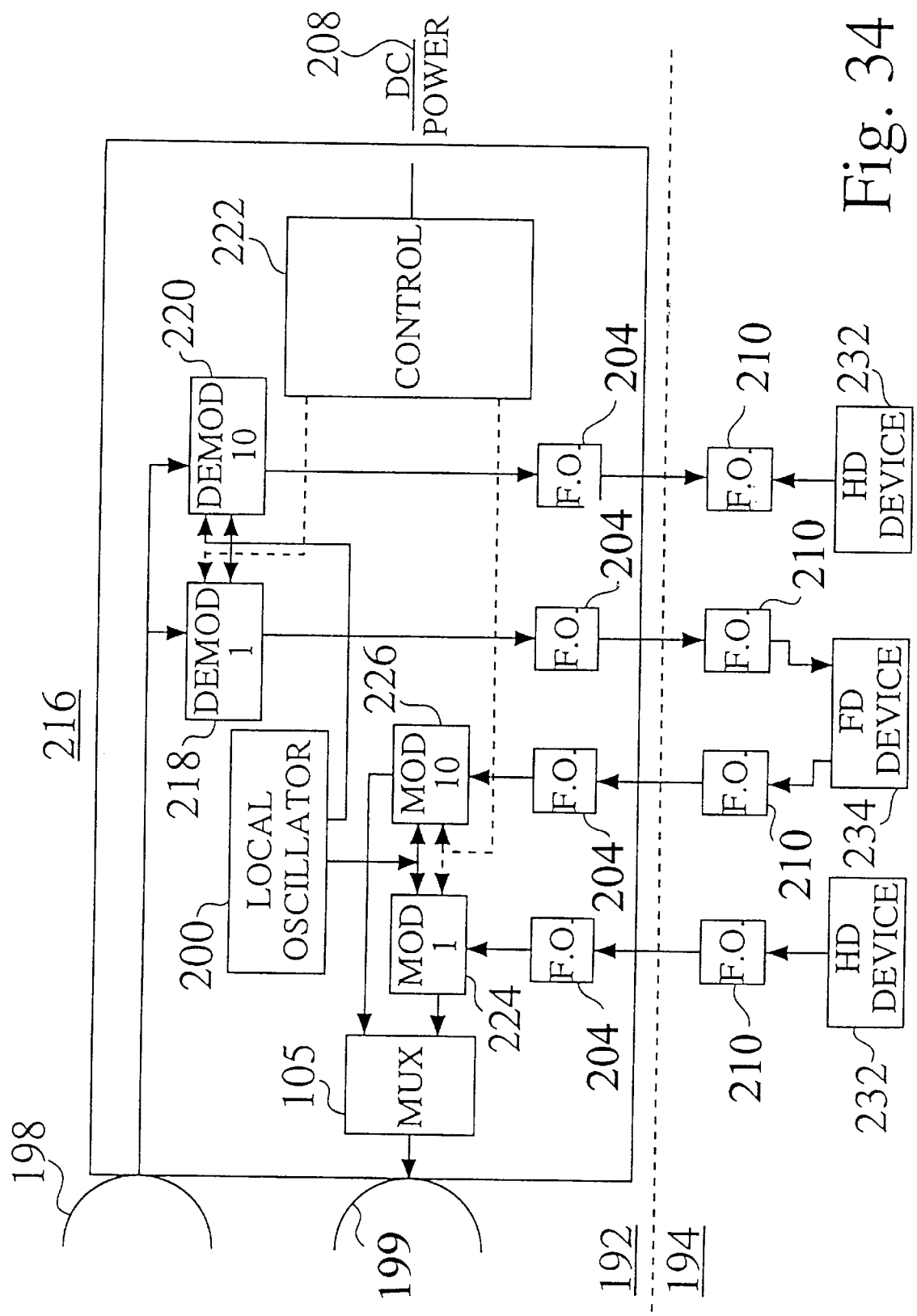

FIG. 33 is a block diagram of a single user transceiver, while FIG. 34 is a block diagram of a multi-user transceiver.

Figure 35:
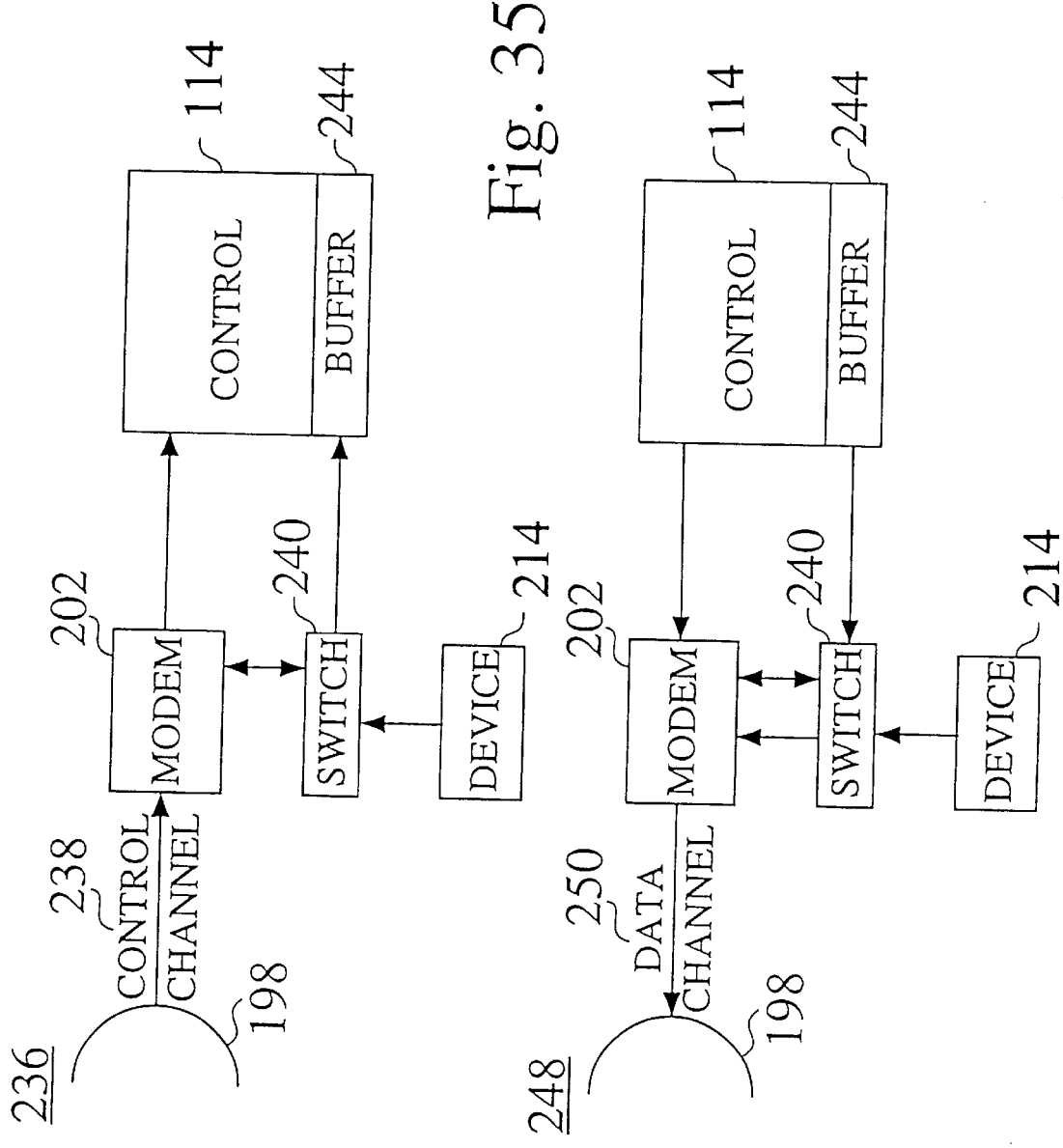

FIG. 35 is a flow diagram that depicts both a wait state and a transmit condition.

Figure 36:
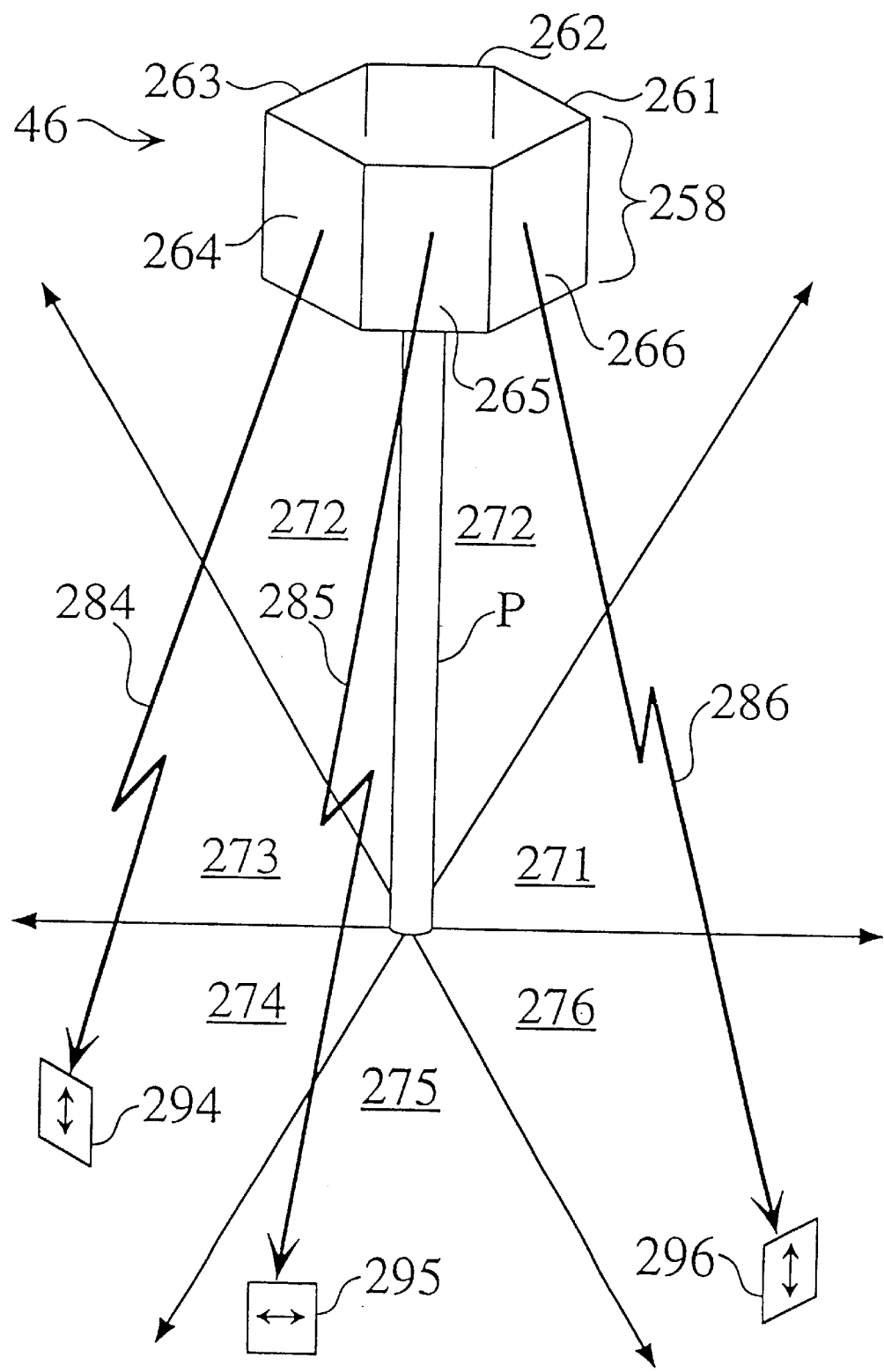

FIG. 36 shows antenna arrays transmitting signals to receivers situated in six sectors. The beams are alternately polarized to insure signal isolation between beams that serve adjacent sectors.

Figure 37:
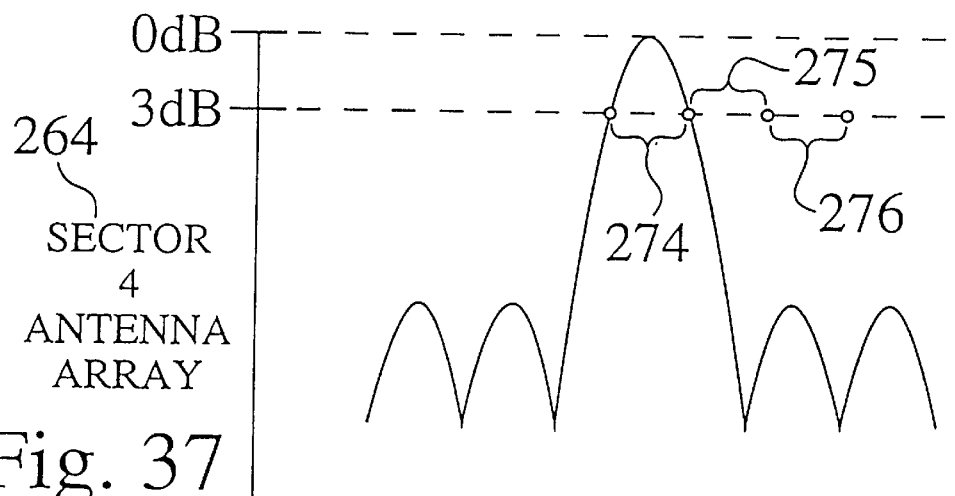
Figure 38:
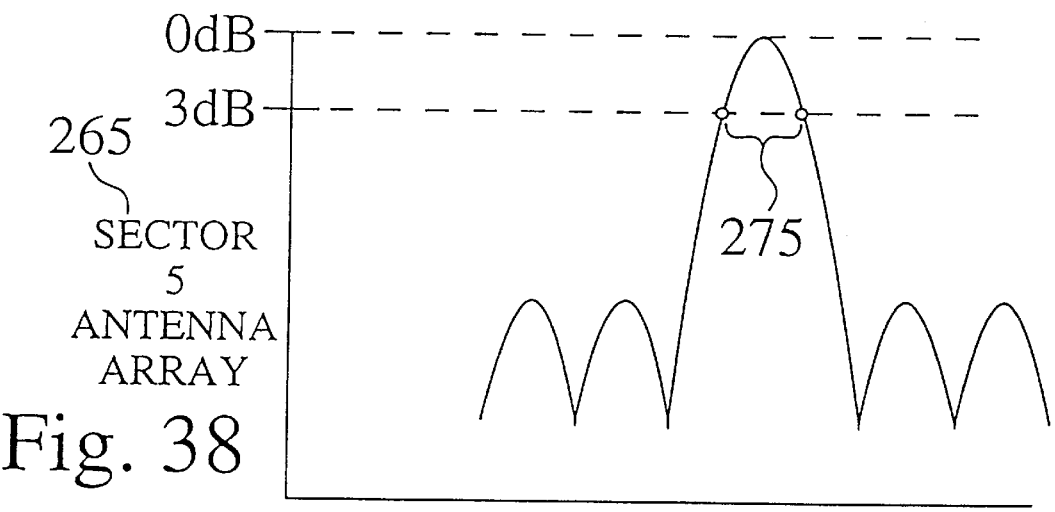
Figure 39:
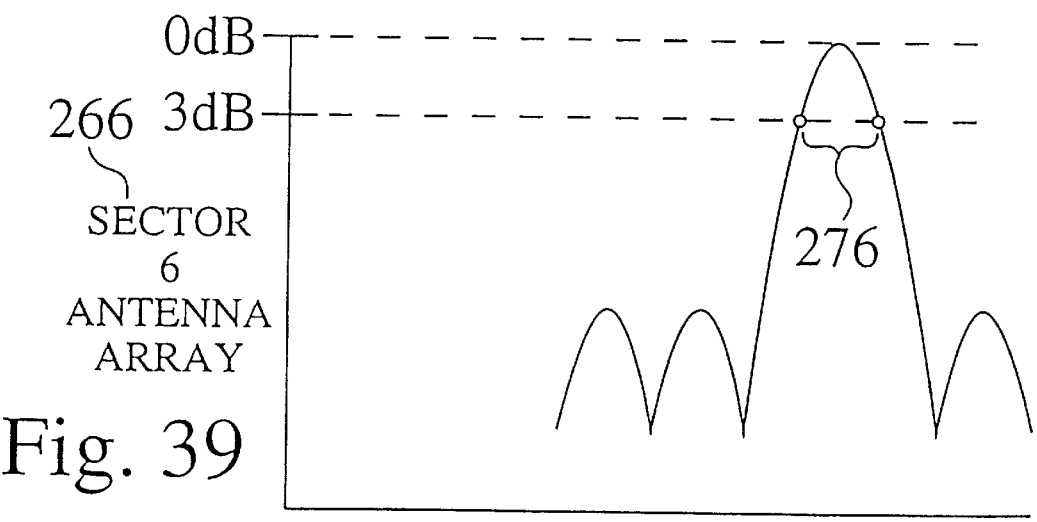

FIGS. 37, 38 and 39 are graphs that plot signal strength in dB versus signal strength received at three different sectors shown in FIG. 36.

Figure 40:
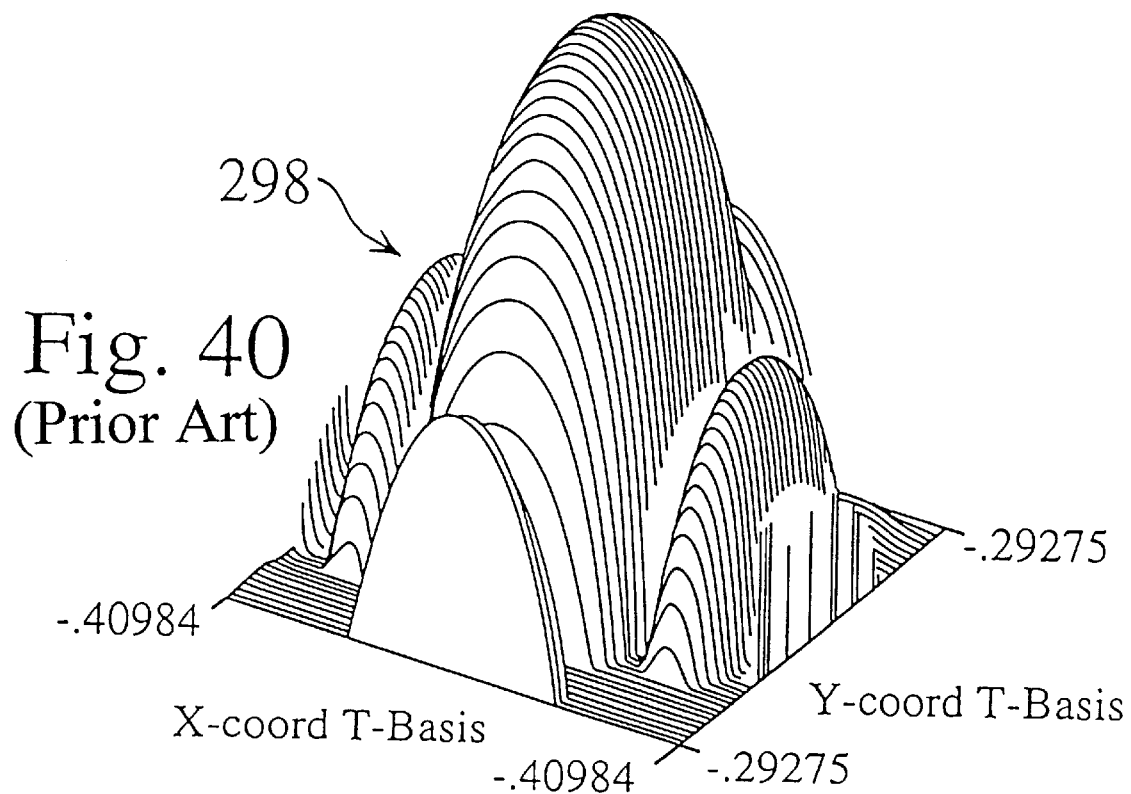
Figure 41:
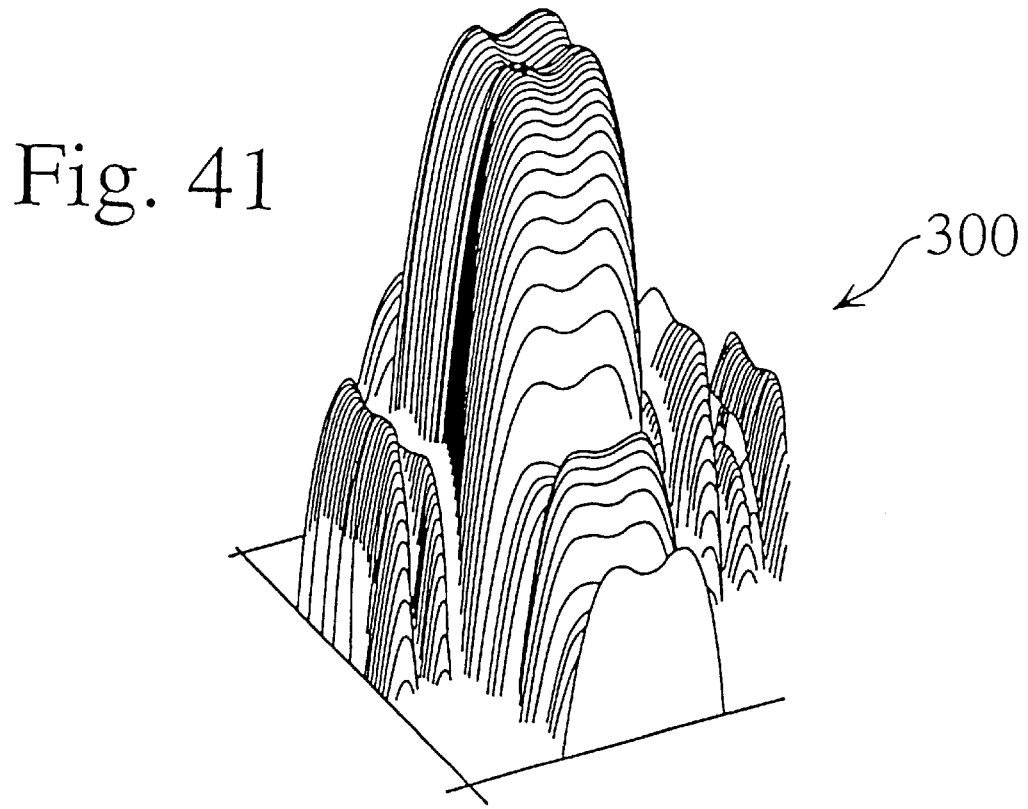

FIGS. 40 and 41 are graphs that compare the output of a conventional antenna with the beam-shaped output produced by the present invention.

Figure 42:
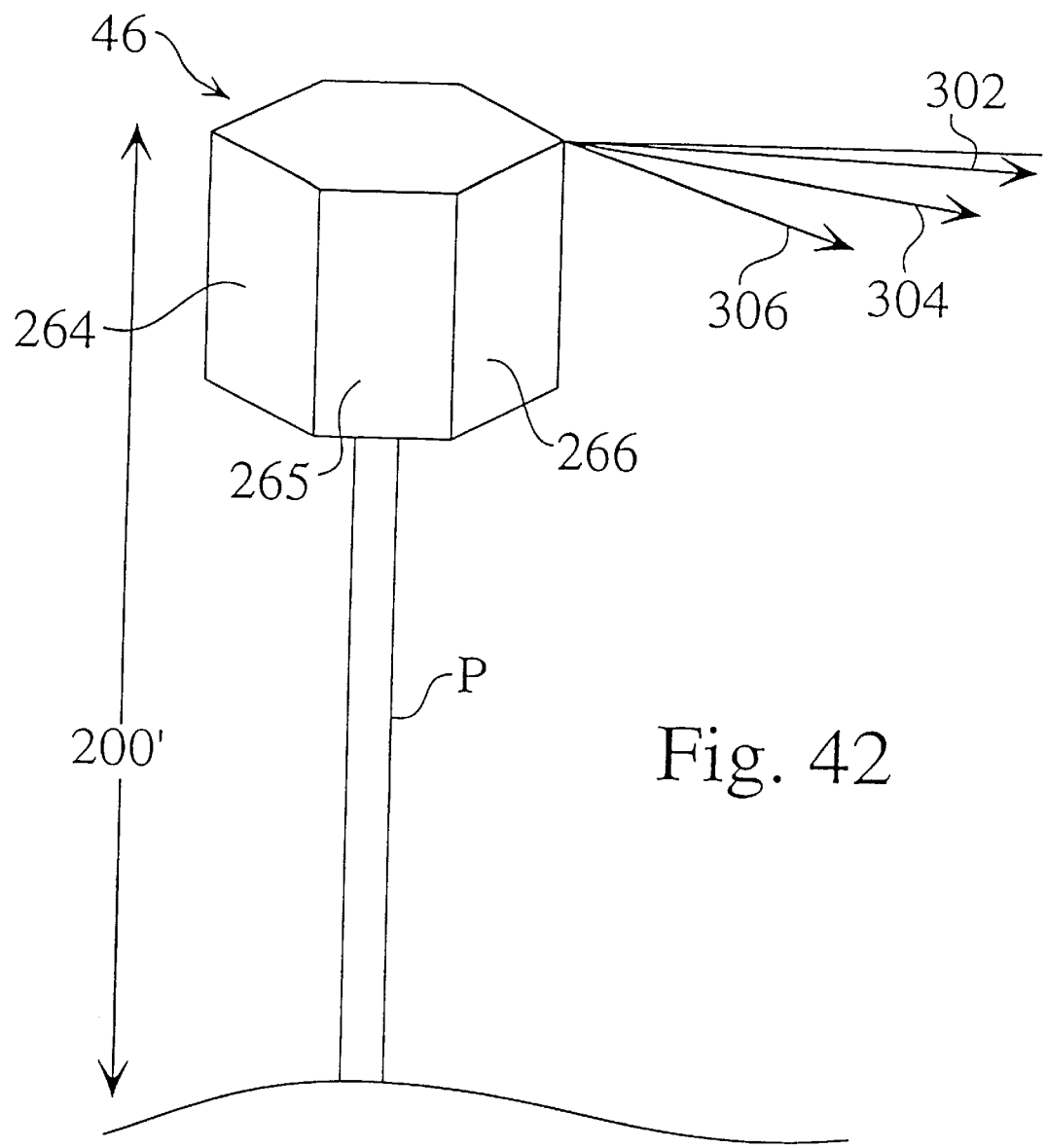
Figure 43A:
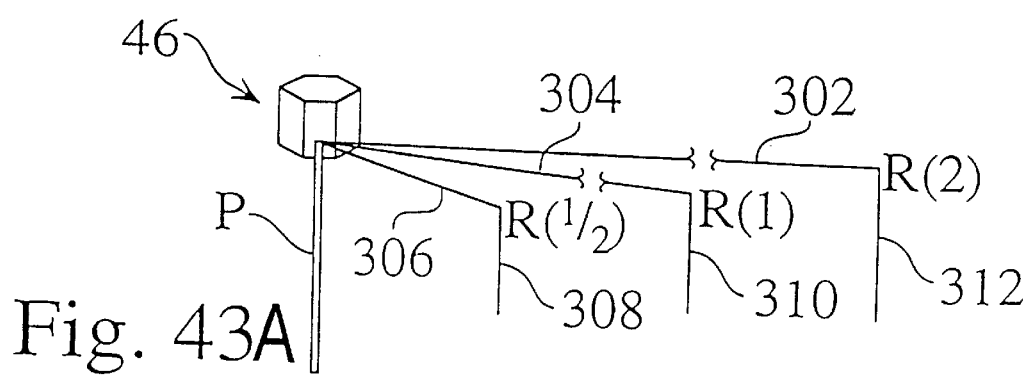

FIGS. 42 and 43A reveal sectorized antenna arrays that serve three different receivers.

Figure 43B:
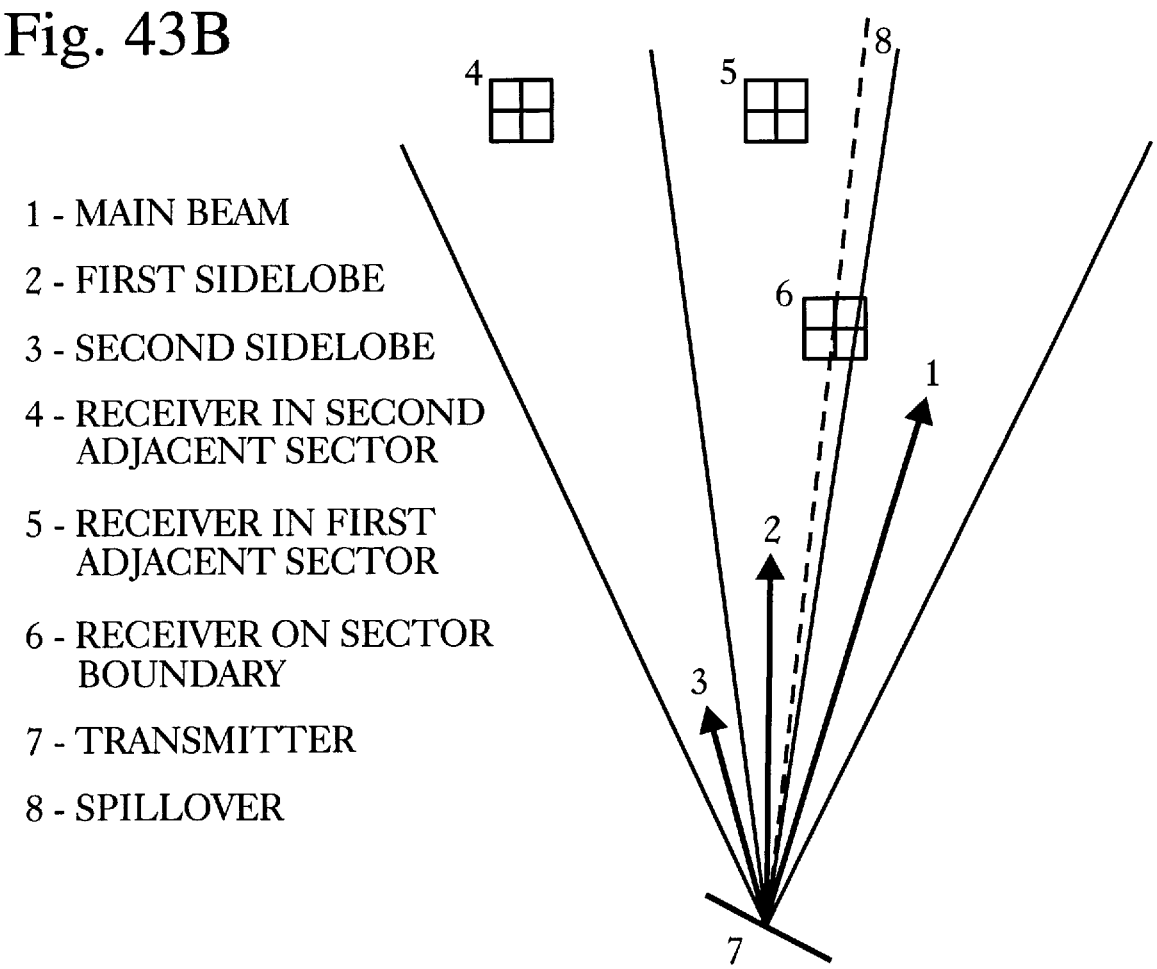

FIG. 43B illustrates interference among adjacent sectors.

Figure 43C:
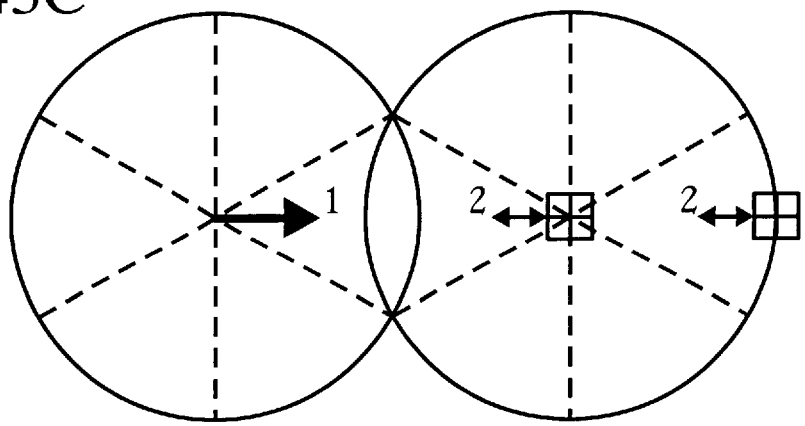

FIG. 43C shows interference in adjoining cells.

Figure 43D:
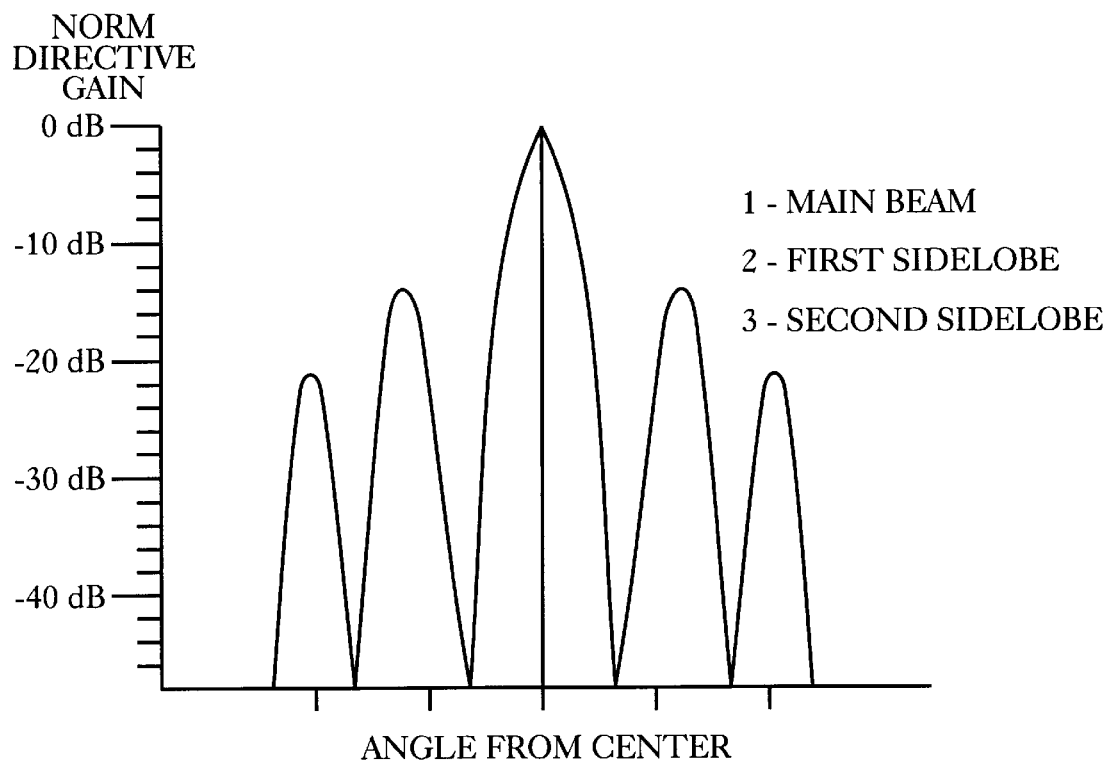

FIG. 43D exhibits a conventional antenna pattern.

Figure 43E:
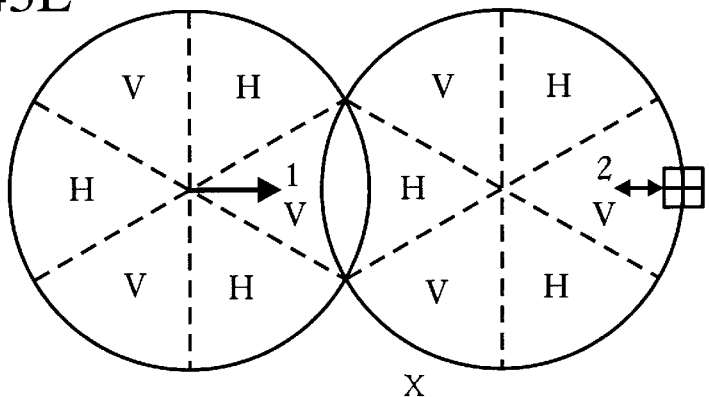

FIG. 43E presents polarization patterns.

Figure 43F:
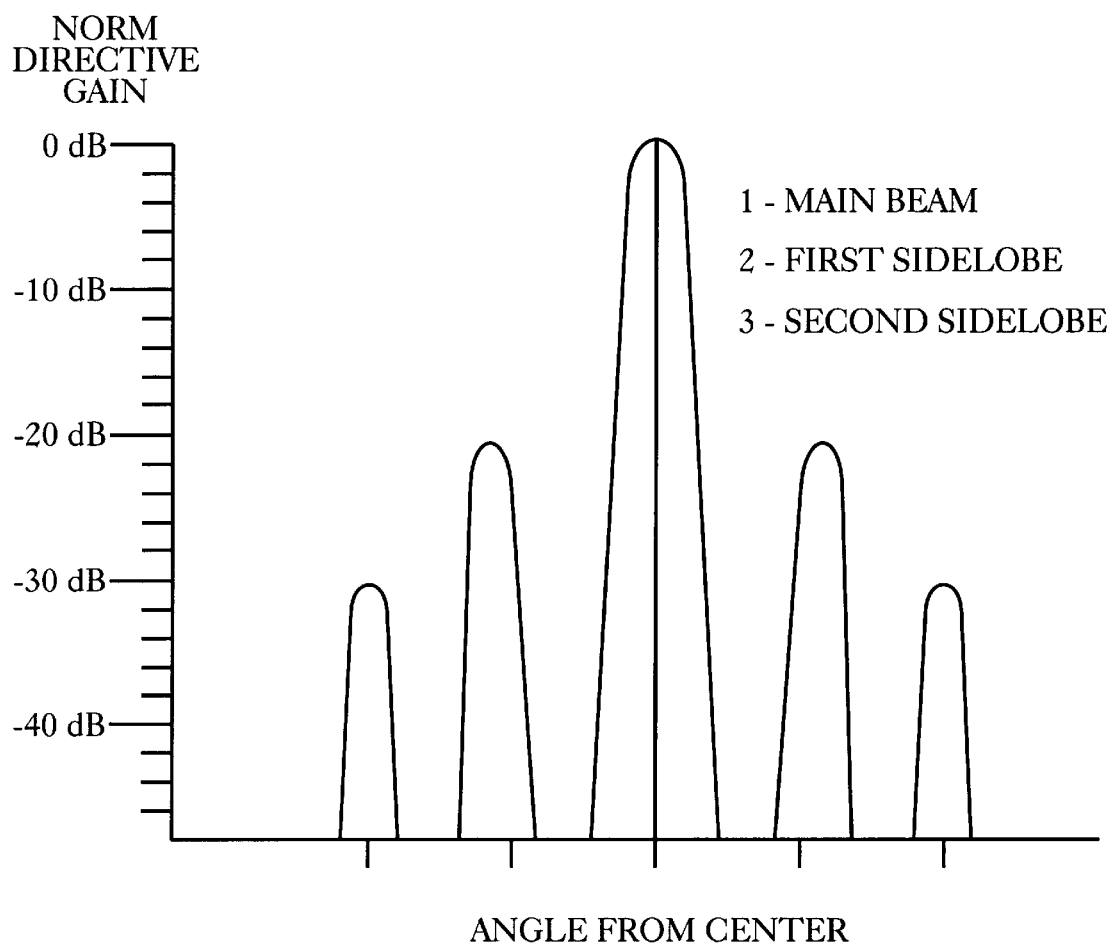

FIG. 43F provides a beam-shaped antenna pattern.

Figure 44:
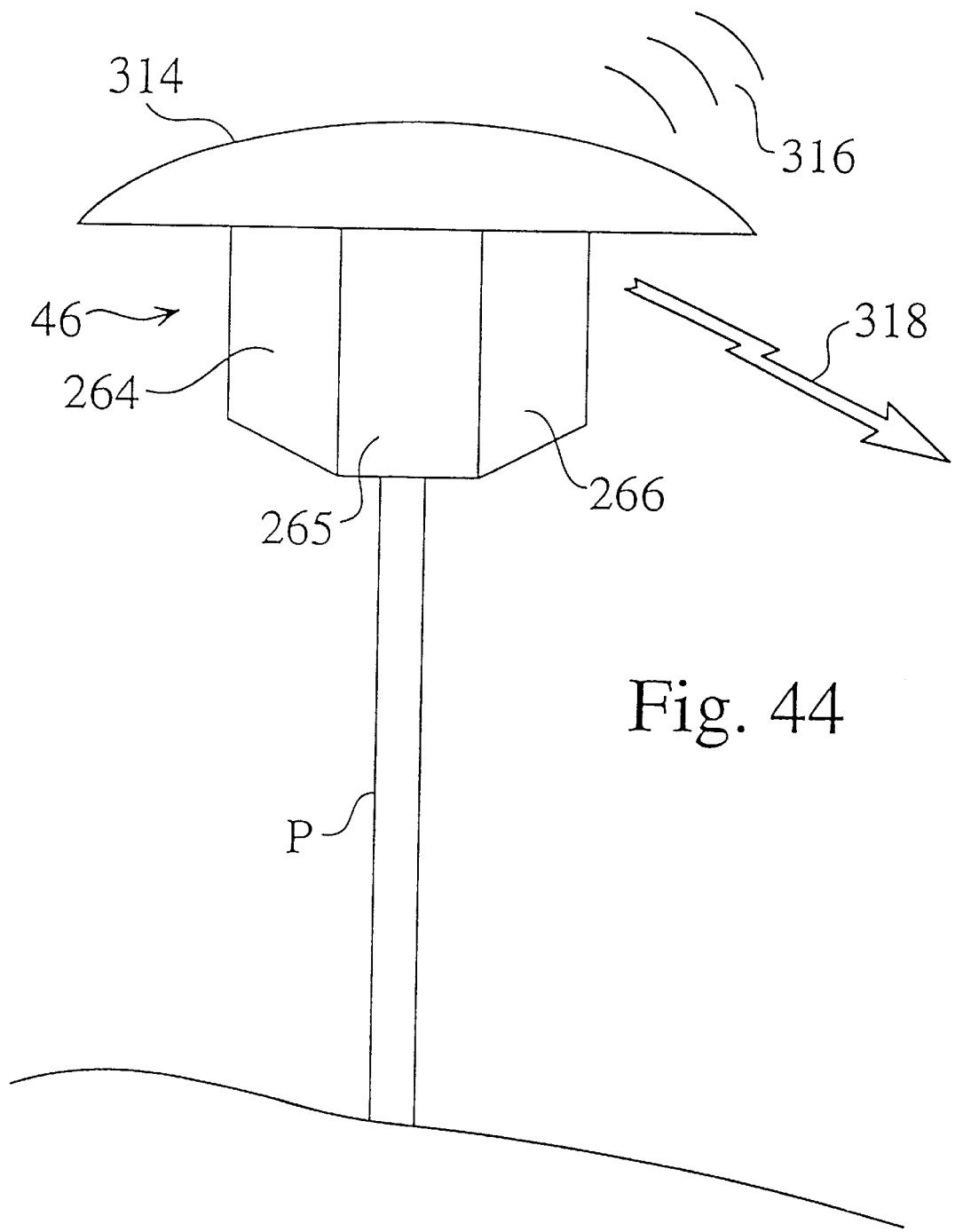

FIG. 44 shows sectorized antenna arrays covered by a shroud.

Figure 45:
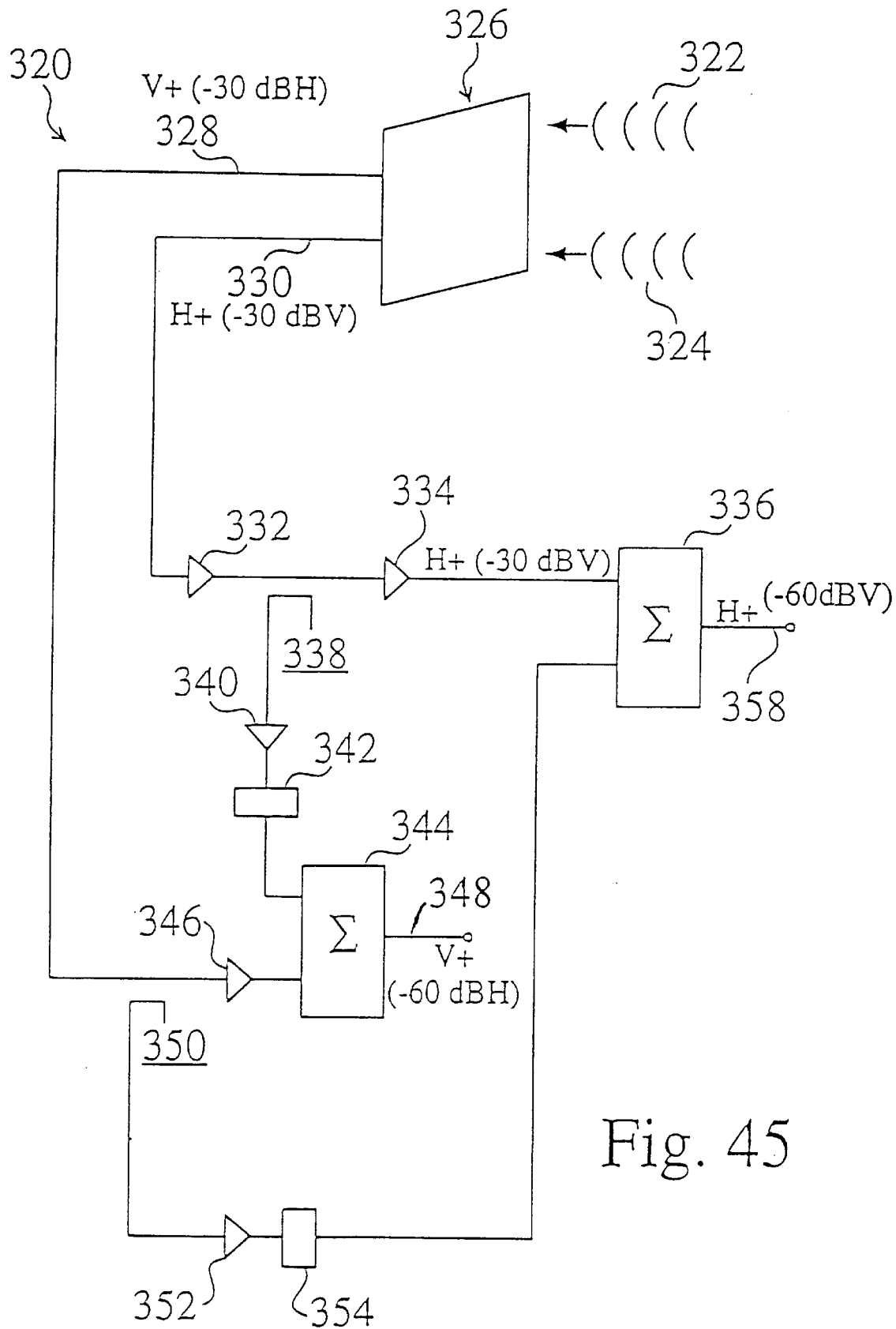
Figure 46:
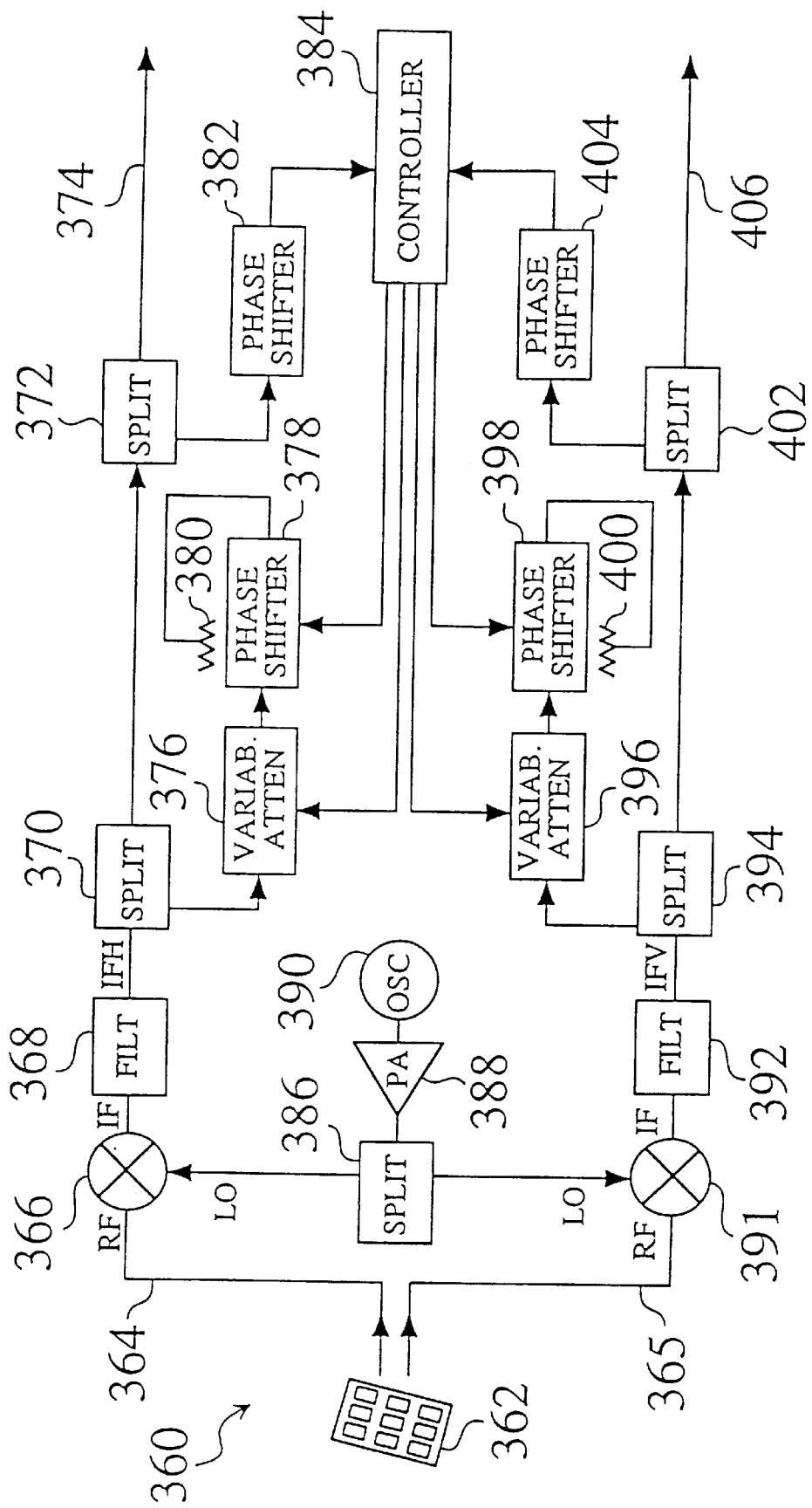

FIGS. 45 and 46 are schematic block diagrams of circuits that may be used to implement active cancellation methods.

Figure 47:
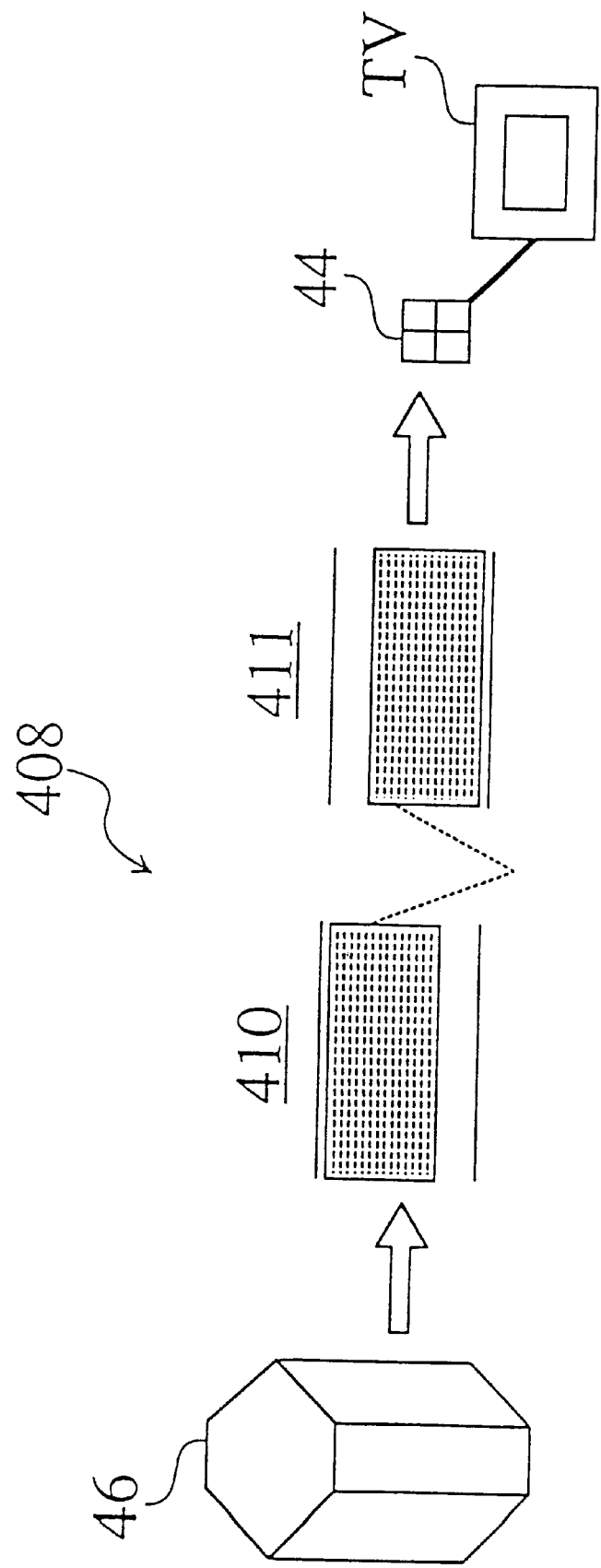
Figure 48:
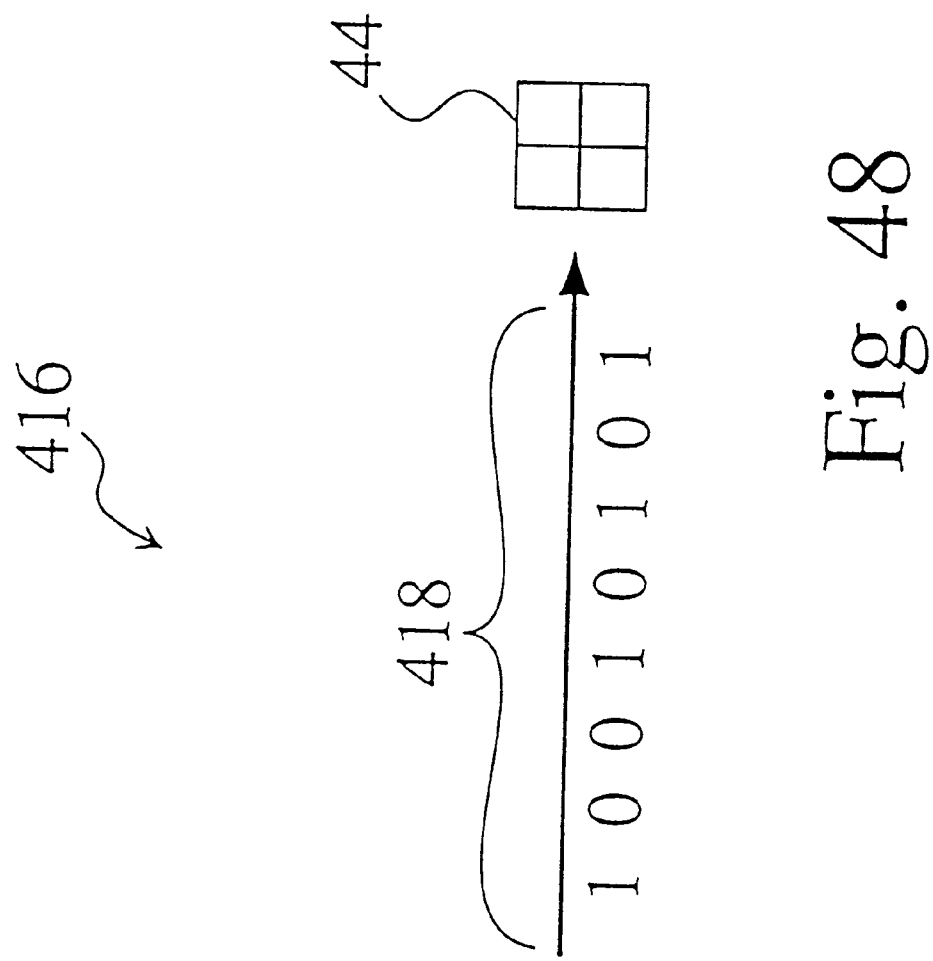

FIG. 47 is a schematic illustration of block scrambling, while FIG. 48 reveals a method for descrambling.

Figure 49:
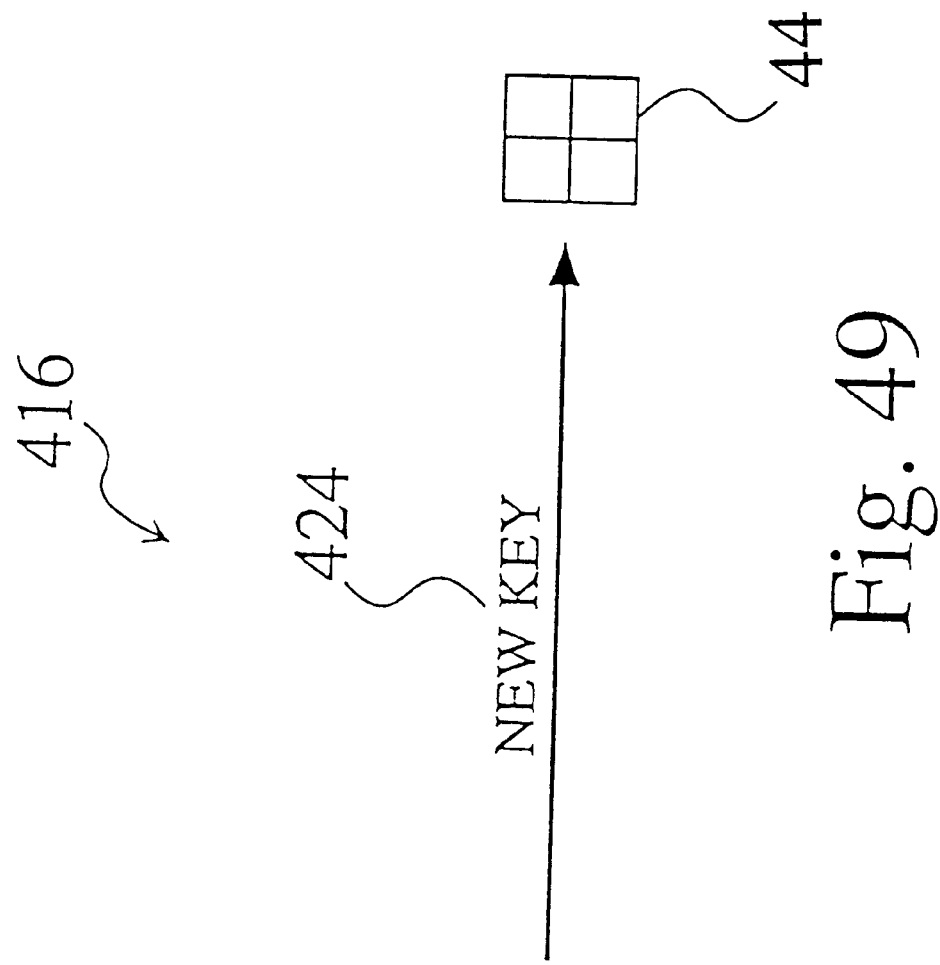

FIG. 49 exhibits a technique for invalidating pirates.

Figure 50:
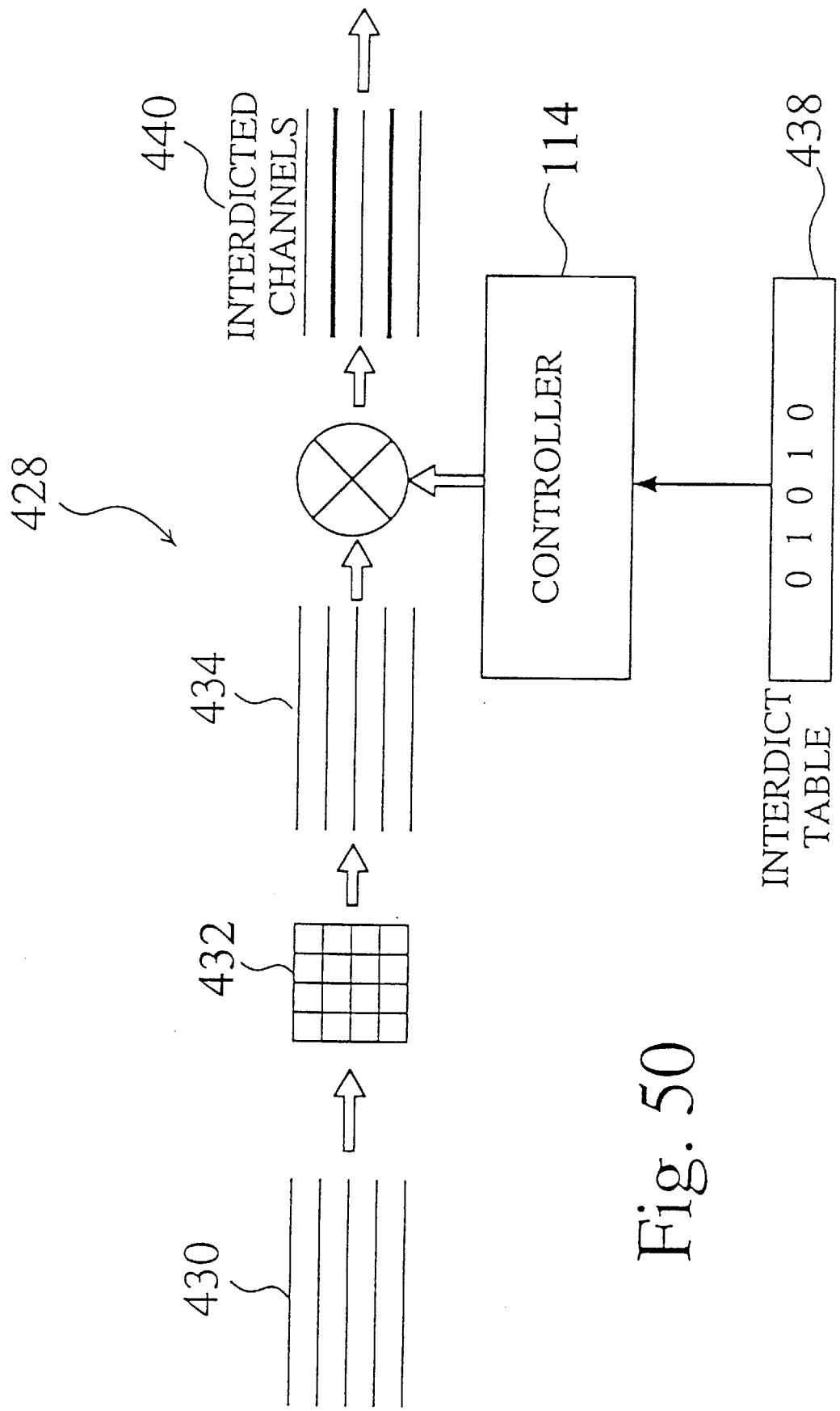

FIG. 50 relates to channel interdiction.

Figure 51:
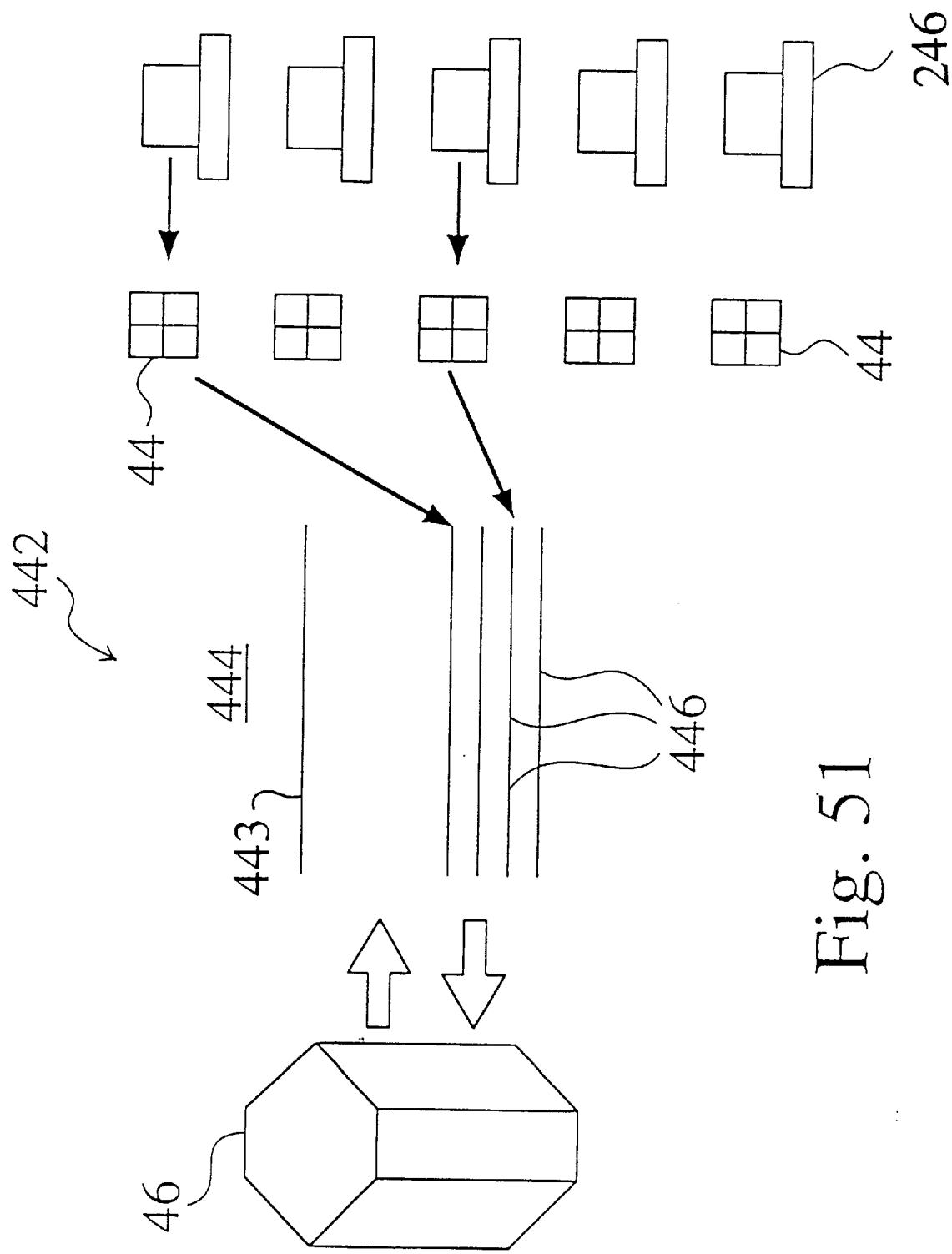

FIG. 51 is a diagram that reveals a local switching function.

DETAILED DESCRIPTION OF PREFERRED & ALTERNATIVE EMBODIMENTS

Figure 1:
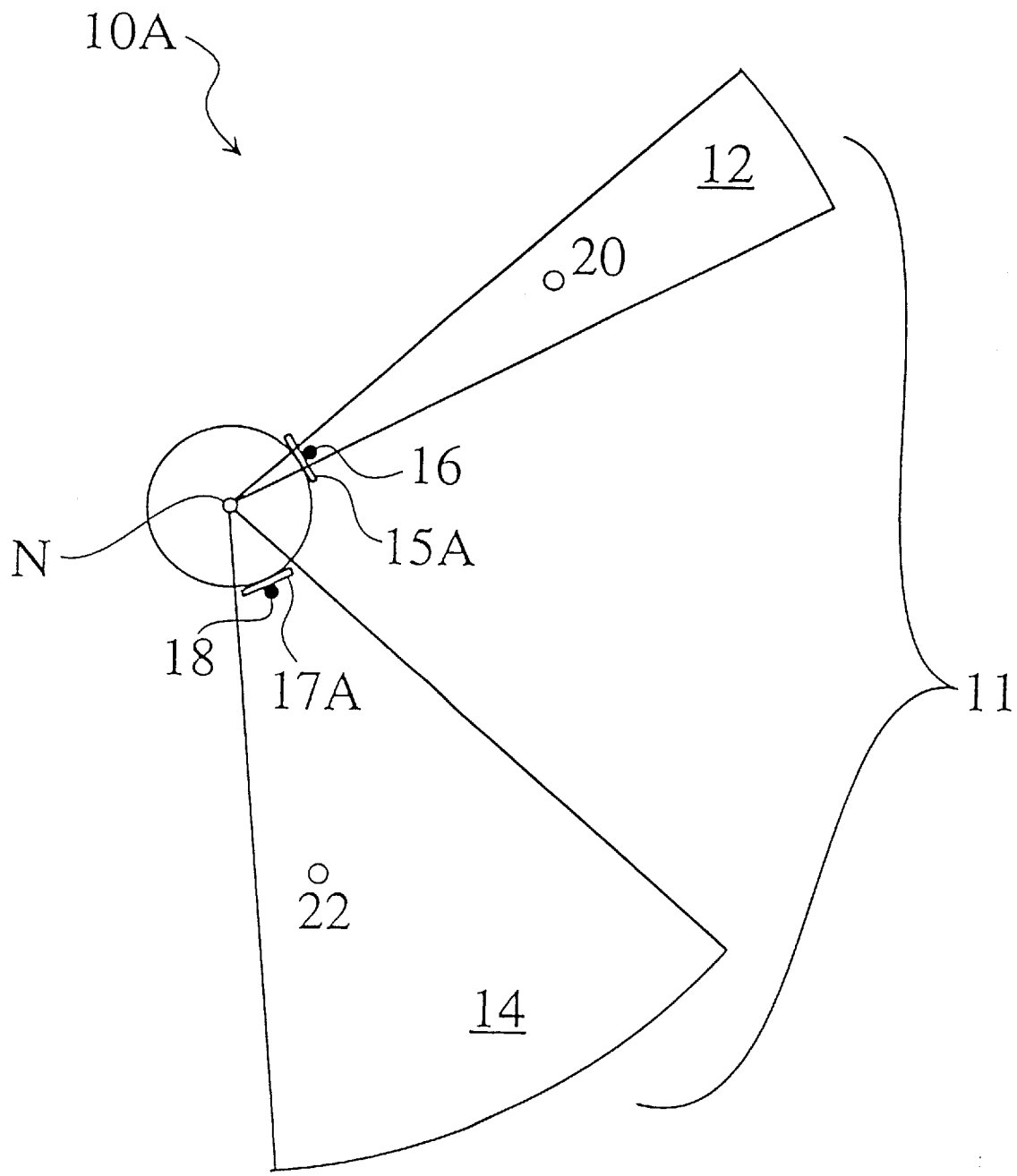

FIG. 1 is a schematic depiction of a preferred embodiment 10A of the present invention which offers one-way point-to-multipoint communications services. FIG. 1 shows a cell 11 comprising two wedge-shaped sectors 12 & 14. Each sector 12, 14 is bounded by two radii and a length of arc along the circumference of the sectors. All sector radii extend from a point called a node, N. The first sector 12 is served by a first transmitting antenna array 15A located at the node N. Similarly, the second sector 14 is served by a second transmitting antenna array 17A. The first transmitting antenna array 15A includes one or more transmitting antennas 16, while the second transmitting antenna array 17A includes one or more transmitting antennas 18. Each cell 11 may vary in size from a single sector 12, 14 to an entire circular cell 11 served by a number of transmitting antenna arrays. Geographical regions that are served by the system are divided into a number of cells 11. The size of each sector 12, 14 and the cells 11 may be determined by a variety of factors, including the density of subscribers in a particular geographic region, and by the type of services these subscribers wish to receive.

For the sake of simplifying the description of a basic embodiment of the invention, FIG. 1 shows only two transmitting antenna arrays, 15A and 17A. Each transmitting antenna array 15A, 17A is dedicated to serve only one of the sectors in the cell 11. In FIG. 1, transmitting antenna array 15S serves only sector 12, while transmitting antenna array 17A serves only sector 14.

Each transmitting antenna array 15A, 17A is characterized by a beamwidth 19 that is not omni-directional. The beamwidth 19 of each of the transmitting antenna array 15A, 17A may be uniform or may be varied to suit particular applications, but is typically less than fifteen degrees of arc. Although some of the drawing figures show sectors which measure more than fifteen degrees of arc, this presentation is furnished only for the sake of clarity. In the preferred embodiment of the invention, the beamwidth 19 is less than fifteen degrees.

In the one-way embodiment 10A, fixed receivers 20 & 22 are located at customer premises throughout cell 11. As a simple example, FIG. 1 depicts a receiver 20 in sector 12, and a receiver 22 in sector 14. All receivers are highly directional, and are limited to communicating with a single transmitting antenna array 15A or 17A that is assigned to exclusively serve a particular sector.

Figure 2:
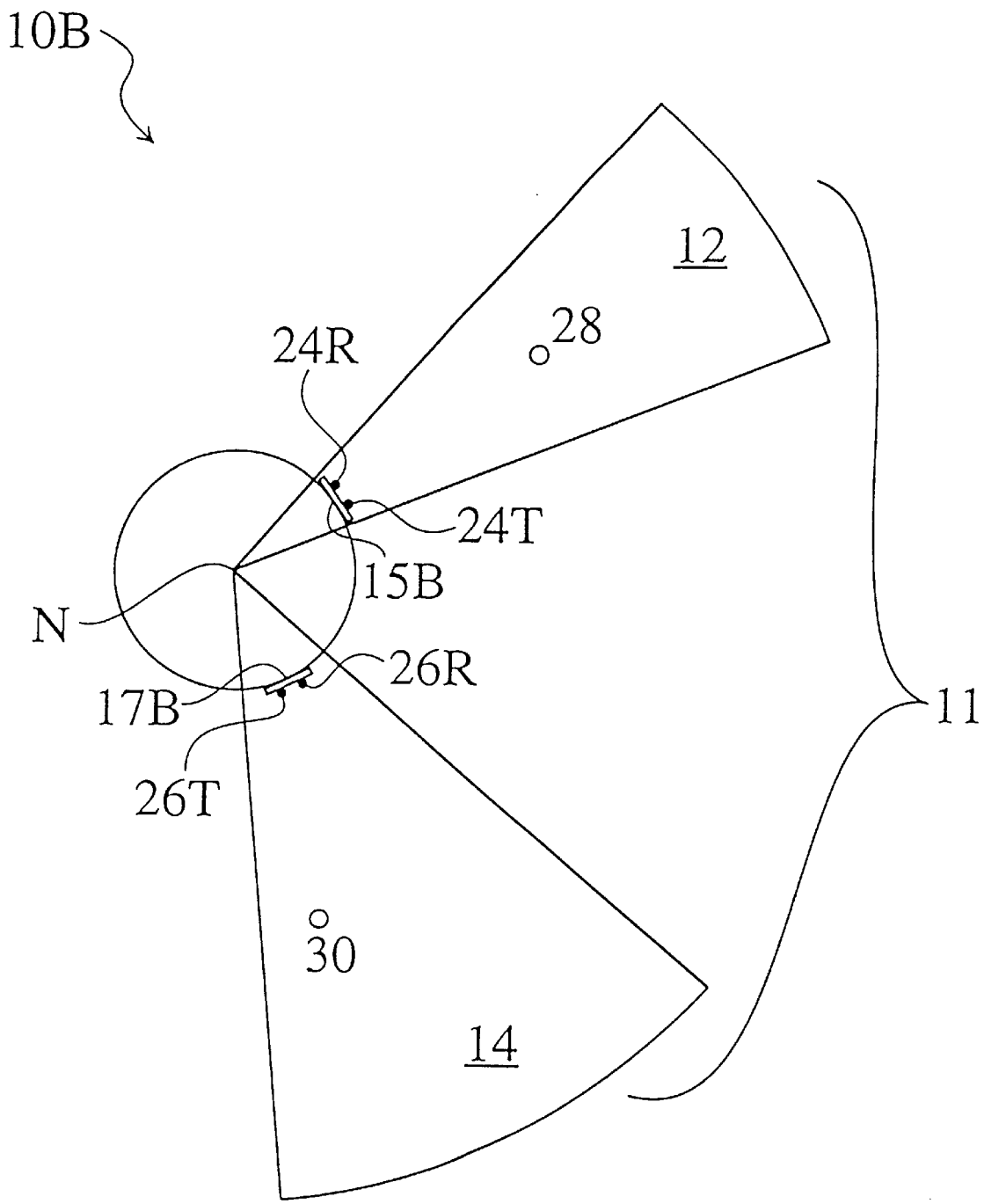

FIG. 2 exhibits a two-way communications system 10B. As in FIG. 1, cell 11 comprises sectors 12 & 14. The two-way system, however, utilizes transmitting and receiving antenna arrays 15B and 17B that each include at least one transmitting antenna and one receiving antenna instead of only transmitting antennas. Sector 12 is served by transmitting antenna 24T and receiving antenna 24R, while sector 14 is served by transmitting antenna 26T and receiving antenna 26R. In this embodiment, fixed transceivers 28 & 30 occupy sectors 12 & 14, respectively. Just as in the one-way system 10A, each transceiving antenna array 15B, 17B has a limited beamwidth 19 that is not omni-directional, and each transmitting and receiving antenna array 15B, 17B is restricted to conveying signals only in one sector 12 or 14. The transceivers are similarly constrained to operate with particular transmitting and receiving arrays 28, 30. Signals originating at adjacent transmitting and receiving arrays as well as signals emanating from the transceivers in adjacent sectors may be characterized by different polarizations to reduce interference.

Figure 3:
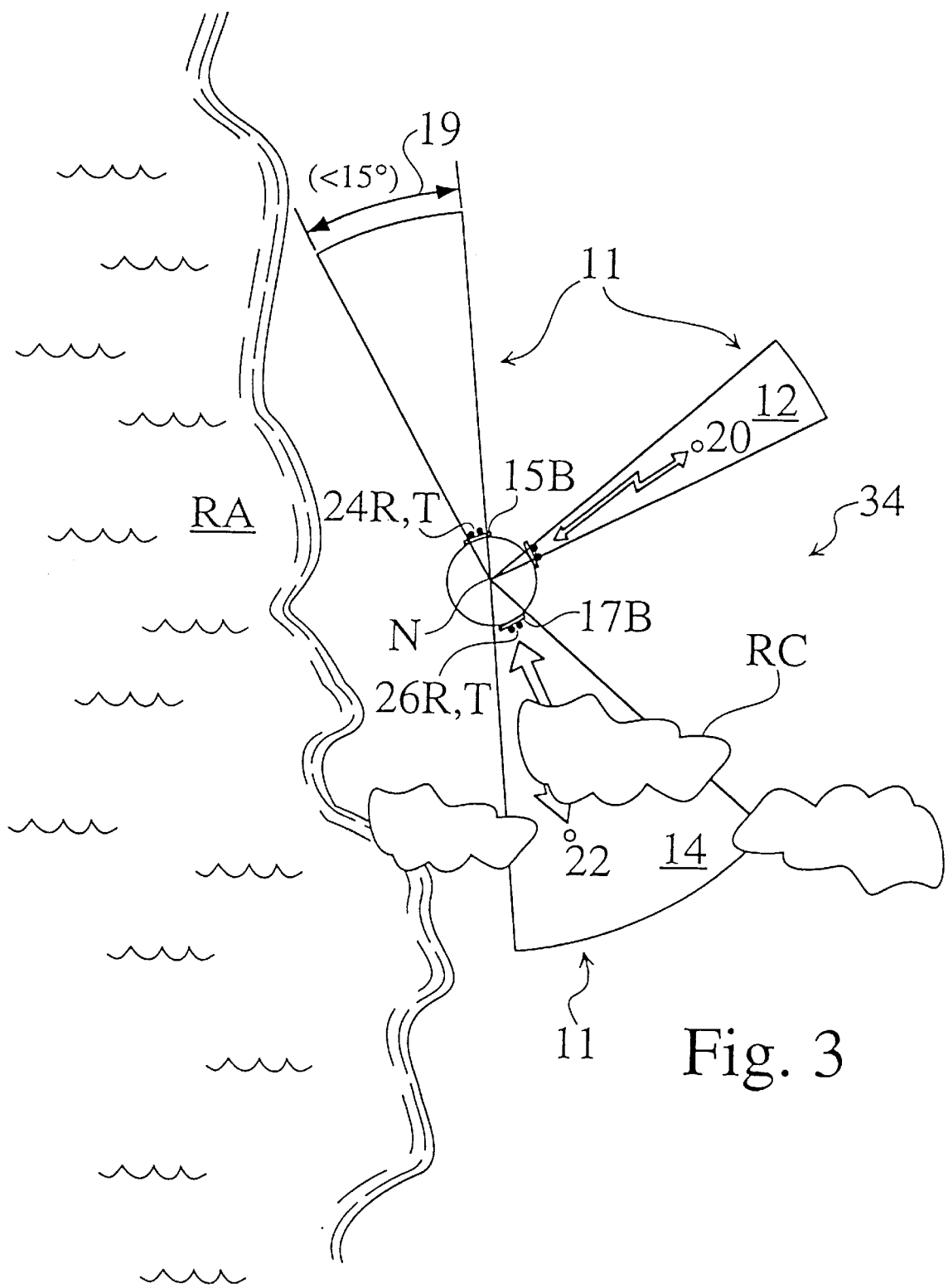

FIG. 3 is a schematic depiction 34 which portrays sectors 12 & 14 that are designed to selectively serve various geographical regions. The sectorized communications system can be configured to serve only regions with desired customers 20 & 22. This configuration avoids the cost of providing signals to remote or sparsely populated areas RA, such as the offshore regions, By incorporating intelligence at the node N, various embodiments of the present invention are able to attenuate the signal power output for sectors 12 or 14 which are affected by adverse weather conditions, such as rain clouds RC.

Figure 4:
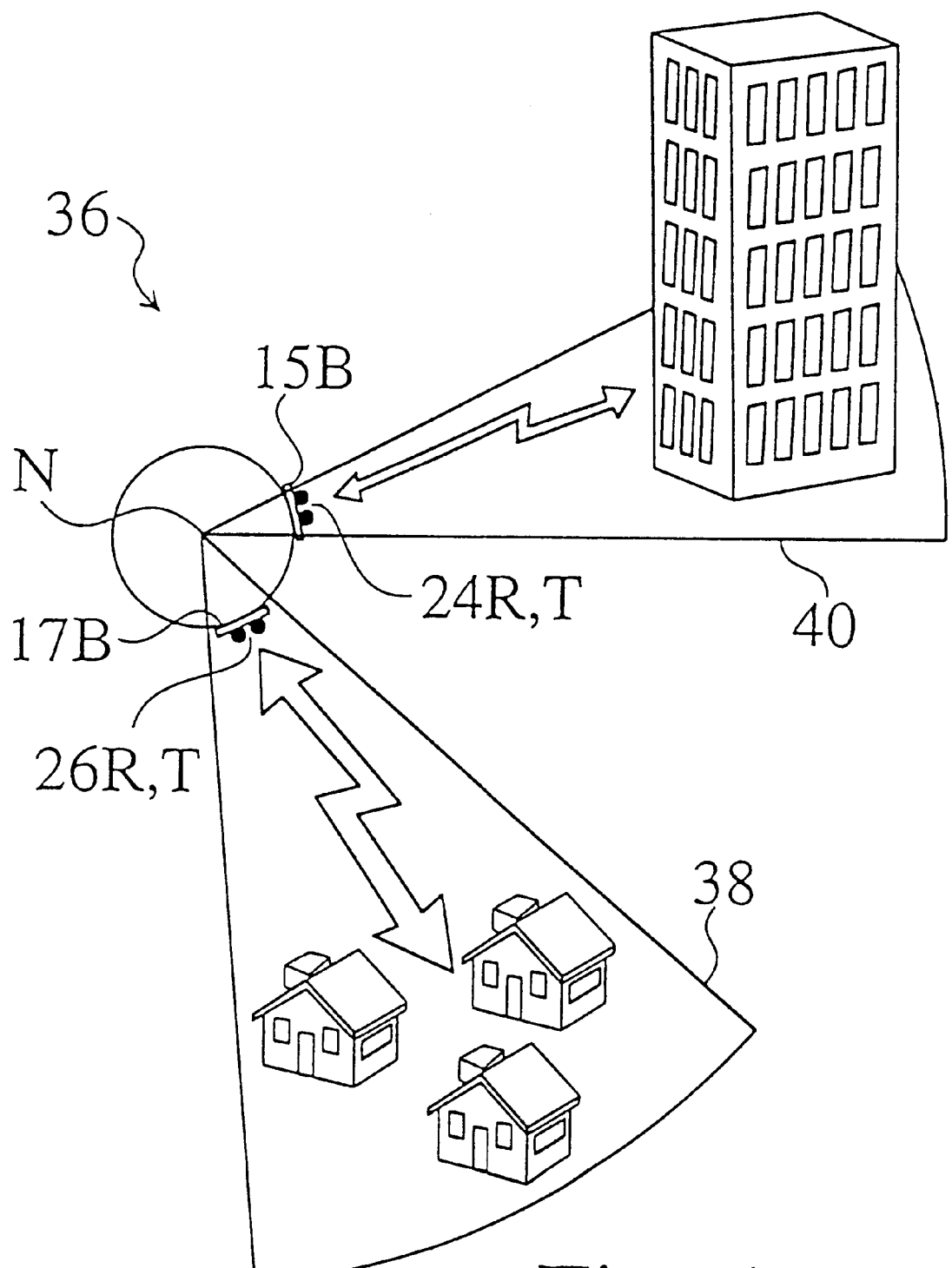
FIG. 4 illustrates a node which is able to provide different levels and bandwidths to sectors that have different communications requirements.

FIG. 4 is an illustration 36 which indicates how a node N is able to provide different levels and bandwidths to sectors that have different communications requirements. For a typical residential sector 38, the transmitting and receiving antenna arrays used at the node N might have a fairly wide band, providing typical signal transmission and reception of such services as television, telephone communication, and video on demand.

For regions requiring larger capacities of services such as data transmission, two-way audio or video, as indicated by the commercial community 40 in FIG. 4, the transmitting and receiving antenna arrays chosen for the node N to serve the region might have a fairly narrow band.

Figure 5:
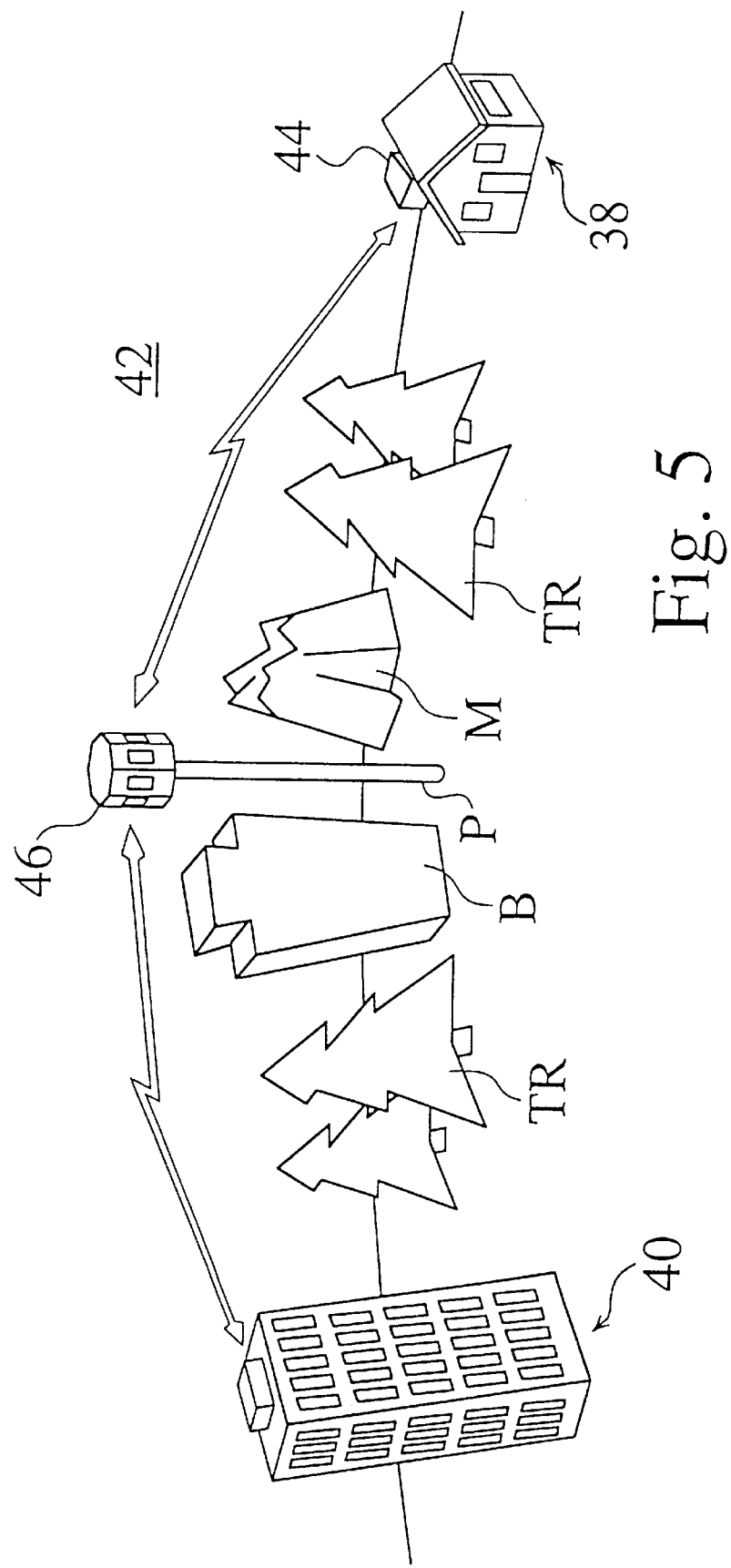
FIG. 5 is a schematic depiction of the line of sight requirements for a sectorized antenna, which is shown communicating with business and residential subscribers.

FIG. 5 is a schematic depiction 42 of the line of sight requirements for a sectorized antenna 46 as it communicates with subscribers in residential and business communities 38 and 40. The locations and configurations of particular sectorized antenna arrays are determined by the signal frequency and bandwidths needed for particular customers. Service to customers is required to be substantially line of sight between nodes N and customer interface units 44. Both natural and man-made structures, such as mountains M, trees TR, foliage and buildings B can diminish the effective area served by a sectorized antenna array. These obstacles may be overcome by careful placement of the arrays and by customizing antenna networks to adapt to specific local requirements.

In some neighborhoods, it may be desirable to locate the sectorized array 46 on a tall tower, building, mountain or similar object. Such a location enables the transmission of signals down to customers 38 and 40, and avoids many potential signal barriers. Sectorized antennas 46 can also be used to receive the broadcast signals and broadcast them below the level of obstacles such as foliage. These methods allow an increased percentage of area coverage for rural, hilly or urban areas.

The actual percentage of customers in a sector that can be served can vary by the geography and the local rainfall characteristics. A region like Miami or the Caribbean which experience heavy average rainfall may require smaller sectorized cells, to allow enhanced control of sector signal power. In dry, relatively flat areas, such as Phoenix, Ariz., the size of a cell 11 might well be six to ten miles across, with antenna arrays located on local high points.

Figure 6:
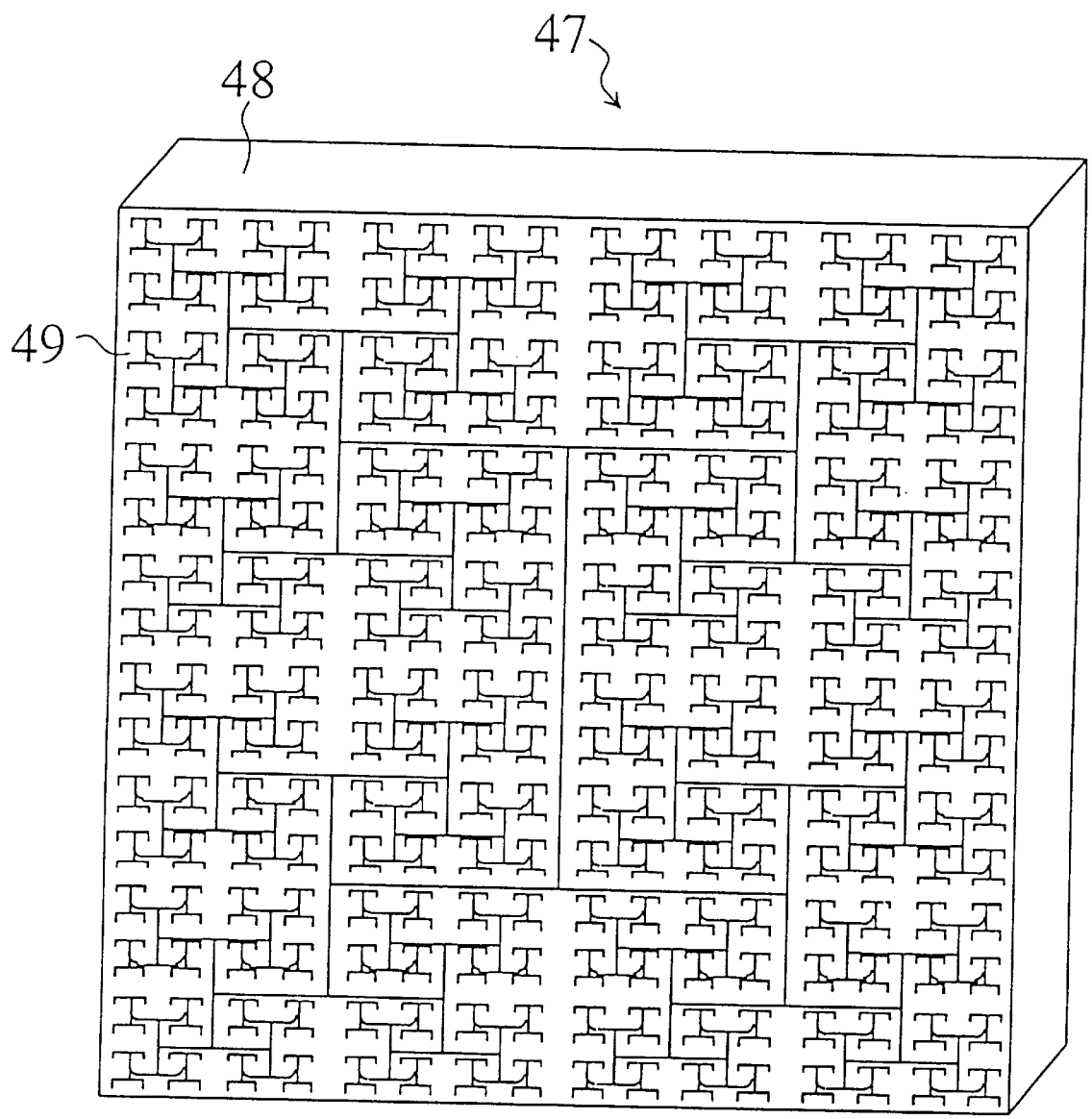
FIGS. 6 and 7 are schematic diagrams of a planar antenna arrays which may be used in combination with one of the preferred embodiments of the present invention. The planar array shown in FIG. 7 offers a more narrow beamwidth than the antenna shown in FIG. 6.
Figure 7:
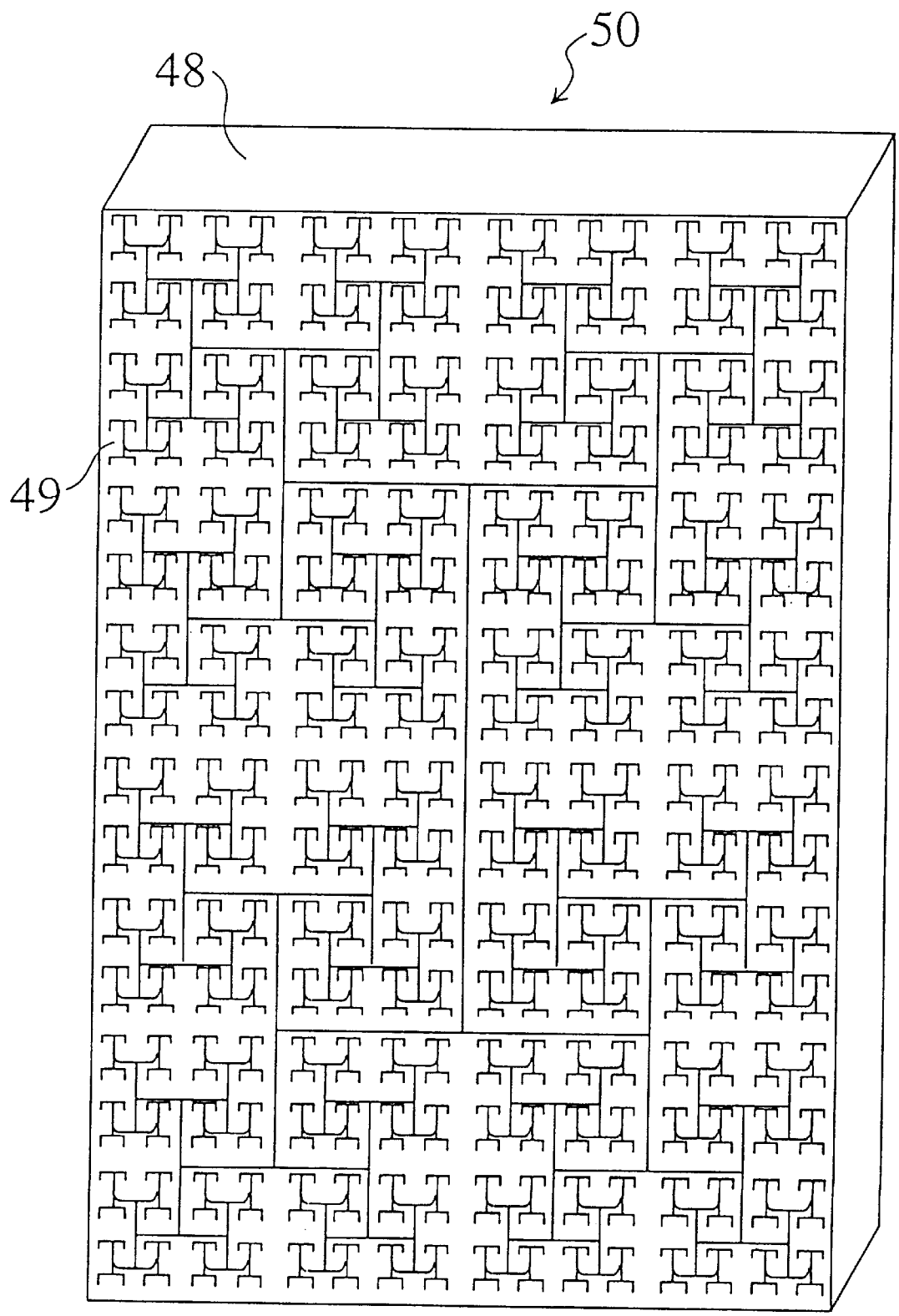

FIGS. 6 and 7 are schematic diagrams of a planar antenna arrays 47 and 50 which may be used in combination with embodiments of the present invention. Both the square and rectangular arrays 47 and 50 comprise a substrate 48 and feed terminals 49. The rectangular planar antenna array 50 shown in FIG. 7 offers a more narrow beamwidth than the square planar antenna array 47 shown in FIG. 6. These arrays may be used as the transmitting or receiving antenna arrays located at the nodes N of the system. Arrays located at the customer interface units 44 may also use similar devices for signal reception or transmission.

The square planar antenna array 48 shown in FIG. 6 would provide a 2 degree by 2 degree beam. In most antenna arrays, it may be desirable to have greater horizontal coverage than 2 degrees together with tight control over the vertical disbursement of power. The coverage requirements for most sectors dictate that the planar antenna arrays should be rectangular, measuring approximately 12 inches high by 2 wide, as suggested by the more rectangular planar antenna array 50 shown in FIG. 7.

The sectorized nature of the antenna array employed by the present invention affords the designer of the entire communication system a wide variety of options. Different types of planar antenna arrays 47 and 50 may be deployed at the node N to serve many different types of customers. Because the diverse antenna arrays are modular, the configuration of antenna arrays at any node may be easily changed at a minimal cost. If a narrow beamwidth is desirable, a large antenna array 47 or 50 may be utilized. A two degree array would be approximately 12 inches on a side. For sectors that would be used to serve residential customers, a 10 degree planar antenna array measuring approximately 3 inches across may be selected.

Table One summarizes some of the available beamwidths and dimensions for planar antenna arrays that could be implemented in conjunction with the present invention. This table presents dimensions which are accurate for 28 GHz, and would be different for other frequencies.

TABLE One

| Beamwidth in degrees | Dimension |
| --- | --- |
| 0.5 | 36" |
| 2 | 12" |
| 5 | 6" |
| 10 | 3" |
| 15 | 2" |
| 90 | 1" |

The range of potential sector sizes that could be served with this sectorized antenna array is only limited by the size of planar antenna arrays 47 and 50 that can be manufactured, and the ability to install them at a node N. A sector covering only one half of one degree would utilize an antenna array that would be about three feet on a side.

For most applications, the smallest planar antenna array might be approximately 5 degrees, and the largest might be 15 degrees. For an array serving customers in all directions with 10 watt, 5 degree planar array antennas, the total power output from the 72 sectors at the broadcast node would be 720 watts, significantly higher than the broadcast power from conventional broadcast antennas.

The significance of the this increased power allowed by the present invention is related to the fact that number of homes that reside in a particular sector increases with the square of the radius measured out from the node. If the antenna array has increased available power to transmit and receive signals, the market potential for the system is greatly enhanced.

Figure 8:
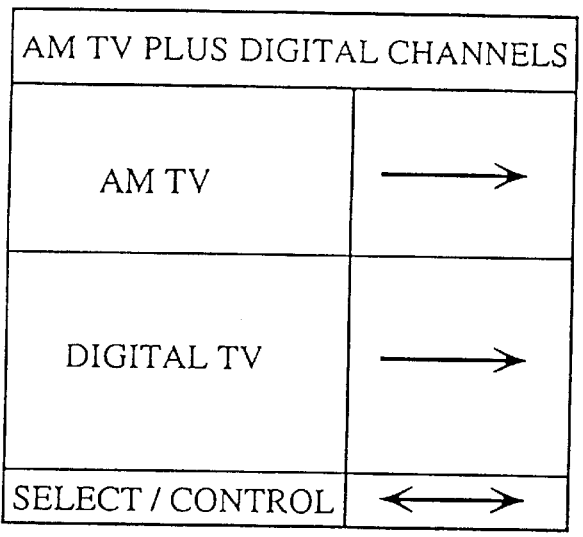
FIGS. 8, 9 and 10 illustrate three potential channel usage diagrams for a sectorized cellular communication system. The available frequencies may be used for AM, FM or digital television; for broadband data or for voice or select/control functions.
Figure 9:
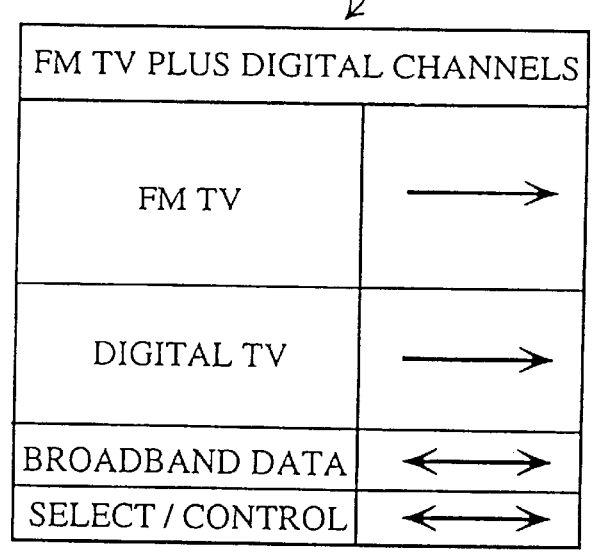
Figure 10:
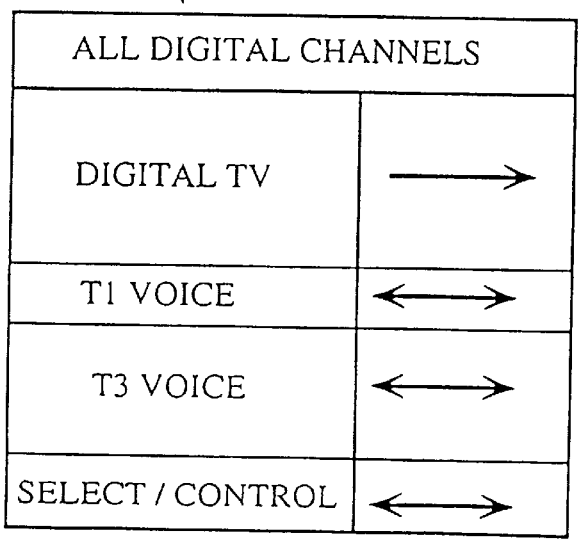

FIGS. 8, 9, and 10 illustrate three potential channel usage diagrams 52, 54 & 56 for a sectorized cellular communication system. The available frequencies may be used for amplitude modulation (AM), frequency modulation (FM) or digital television; broadband data; voice or select/control functions. The signal frequencies shown in the drawings are used throughout the other figures to show the transmission and reception of signals though the antenna arrays, and also enhance the description of the services offered by various embodiments.

For each of the 1,000 MHZ blocks 52, 54 & 56 shown in FIGS. 8, 9 and 10, the potential channel assignments can be allocated in any combination that would provide the greatest benefit to the customers in a region. In this description of an embodiment of the invention, the block size of 1,000 MHZ should be understood to be a nominal size. FIG. 8 shows an allocation of bandwidth blocks 52 that might be in demand at the present time for many locations, with AM TV channels, digital TV signals, and channels for selection and control. FIGS. 9 and 10 show other potential channel assignments 54 and 56 for the bandwidth blocks. As the available services change, the present invention is able to vary the available allocation to different types of channels.

Figure 11:
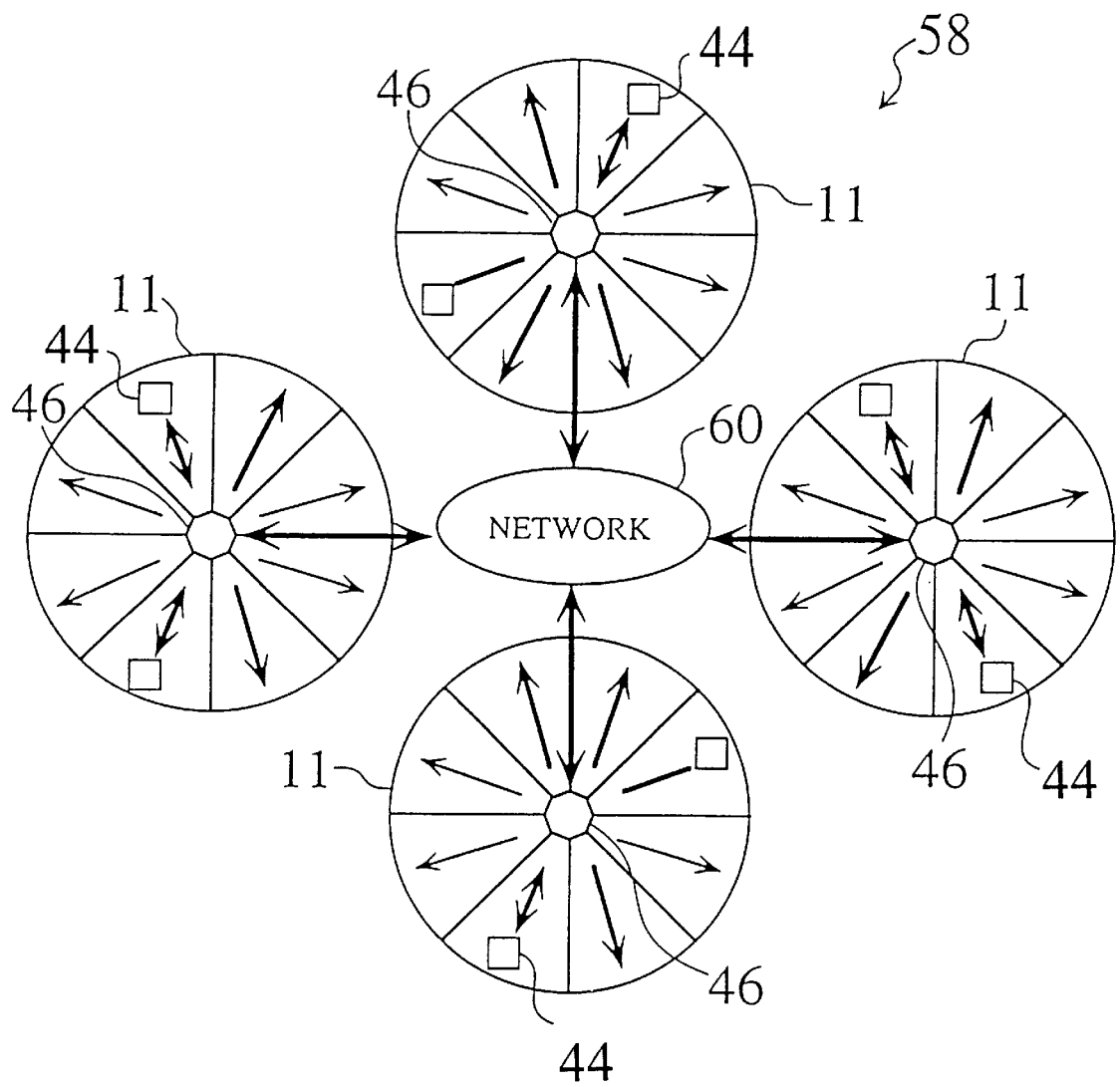
FIG. 11 is a diagram that represents a system overview of one embodiment of the present invention. Individual sectorized cells receive signals from and transmit signals to a common central network.

FIG. 11 is a diagram that depicts a system overview 58 of the present invention. Individual sectorized cells 11 receive signals from and transmit signals to a common, central network through the sectorized antennas 46.

As the system 58 grows, its capacity can be increased by installing independent feeds for each sector or group of sectors. For example, for two sectors 12 and 14 served by the same antenna array, each sector is served by its own set of planar array antennas. As one example, each installed antenna array could be assigned a licensed bandwidth block of 1,000 MHZ, either from 27.5 to 28.5 GHz or from 28 to 29.5 GHz. As an alternative, the 38 GHz band may also be utilized. Licensing proceedings which are currently in progress before government authorities around the world may result in other frequency allocations. When first installed, all customer interface units 44 within the sectors served by the antenna array might receive the same signal feed signals. As traffic builds, sectors 12 or 14 could be separated to receive different feeds to increase the available capacity to each sector 12 or 14. This modular approach allows the maximum service capacity equal to the product of the number of sectors 12 or 14 times the number of cells 11.

Figure 12:
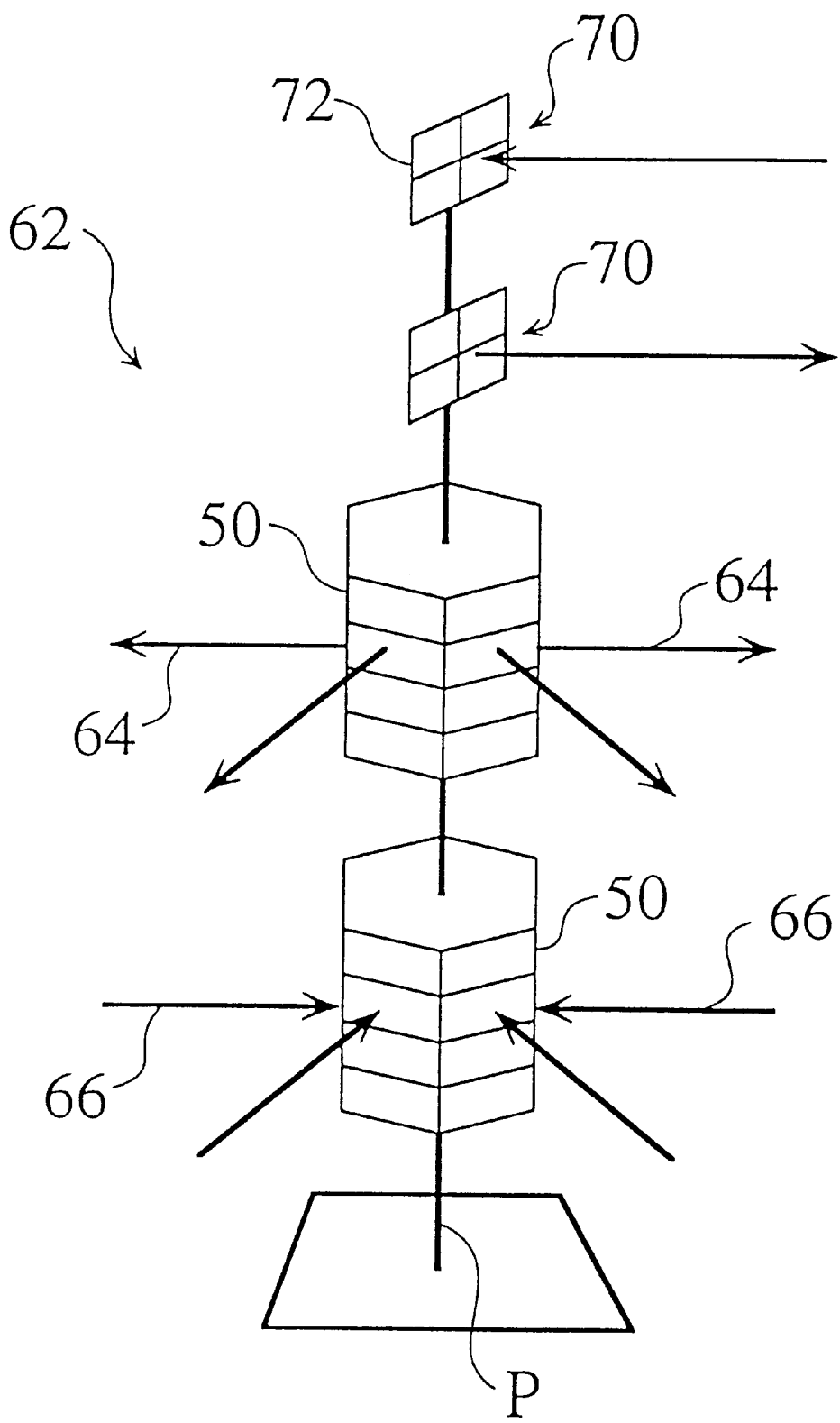
FIG. 12 is a pictorial representation of the sectorized hub design utilized by one of the preferred embodiments of the present invention.

FIG. 12 is a pictorial representation of the sectorized hub design 62 utilized by one of the embodiments of the present invention. The antenna configuration is shown as it might be mounted on a tower or a pole P. The pole supports a number of transmitting and receiving antenna arrays 50, which are typically paired up to serve individual sectors 12 or 14. Although the configuration shown in FIG. 12 incorporates service for six sectors, a typical design may include service to twenty four to over seventy two sectors. The individual transmitting antenna arrays 50 generate a sector's worth of outgoing signals 64, and the individual receiving arrays 50 receive all incoming signals 66 from a specific sector. All received signals are fed into the telephone network 60, or into a dedicated network. All signals destined to be transmitted from the transmitting antenna arrays originates from the telephone network 60, or from the dedicated network.

Connections to the telephone network 60 or dedicated network servers can be achieved by two methods. One preferred method involves connecting the antenna arrays to the telephone network through a fiber link FL, thus avoiding signal interference from other signals or weather. An advantage of using fiber links FL is that they allow for enhanced system capacity. As more subscribers and services are provided though the system, such as audio, video, and data services, additional fiber links FL can be installed to support the increased demand.

Point-to-point microwave links 70 may also be used to connect together different hubs. These links 70 employ narrow beam antennas 72. In this embodiment, one half degree transmitting and receiving antenna arrays might be employed. Point-to-point microwave links 70 can transmit or receive 1,000 MHZ signals directly from the telephone network 60. This arrangement may provide a means to add new antenna arrays to the system 58 for particular regions, such as those where fiber links have not been installed.

FIG. 13 presents a diagram 71 which portrays the switching, up-conversion and transmission of signals from a TV head-end 73, signals from a video server 74 and signals from a public switched telephone network 75. These signals 73, 74 and 75 arrive at switch circuitry 76, and depart the switch circuitry 76 as fixed blocks 77, switched channels 78 and fixed individual channels 79. These outputs 77, 78 and 79 flow through up-converters 80 to node transmitter 82.

FIG. 14 is a diagram 81 which depicts the distribution of various services 78 through the node receiver 46 that may be selected by individual consumers. Services may be requested over switched channels 78 using a television TV, over dedicated channels 86 using a personal computer PC or may be initiated by an off-hook signal 84 using a telephone TP. A one-way transmission 88 emanated from to the node receiver 46 is fed to a demultiplexer 89 which, in turn, conveys the requests to the telephone network 60. Various options may include television programming and data and voice communication. Within a particular sector, several different kinds of service connections can be provided, including service to wired or cordless telephones TP, to data devices such as personal computers PC with modems, to interactive interface units IIU, or to televisions TV. The network 58 will be able to provide service to digital telephone services as well, such as digital cellular systems.

The service connection to analog telephones TP would usually be a permanent allocation, with dedicated channels 86 being allocated through by a controller 32. This dedicated channel allocation would allow the customer to have instant communication access, without waiting for polling to take place in the system. Individual analog voice channels require only about 4 KHz of bandwidth, so the burden of dedicated phone line access 86 on the total system frequency spectrum is minimal. Most telephone networks carry analog signals until they reach the electronic switching systems ESS, where the analog signals are converted to digital signals for further distribution.

The dedicated channel access 86 would provide convenient operation for its users. The customer would pick up the receiver of the telephone TP, which would generate an off-hook signal 84 through the channel 86 to the switch ESS (not shown) at the public switched telephone network. The outgoing channel is already assigned to the customer's phone TP, which allows the signal to go through the ESS to a second phone TP. The system 58 also provides the return channel 86 to the customer's phone TP from the second phone TP. A full duplex transmission is provided both directions, using a pair of channels 86. Every telephone instrument TP in the system would have two narrowband channels associated with it, and one controller 32 that it connects through to the public switched telephone network 60 (PSTN).

System connections to personal computers PC with modems could be supplied with permanent channel allocations 86 in a similar method to channel allocations 86 for telephone service. 13roader channels could be provided for the faster speed requirements of data communication through computer modems.

For connections that require larger bandwidths, such as the transmission of video signals, the switching of channels would be used, using a polling process. The electronics within the node controller 32 would scan the incoming signals for any video channel service requests from customers. The controller 32 would respond to an incoming video request by allocating a channel 78 to the requesting customer's interface unit 44 for the transmission of the video signal.

These switched video channels 78 would be used for a variety of services, such as video-on-demand or interactive video services. The controller 32 is capable of identifying that a request is being made. The controller 32 would also examine the request to approve or disapprove the service.

Interactive requests would also be possible with this type of service. The node controller 32 could supply information on available upcoming programming, either directly, by publishing transmission schedules, or by customer prompting, such as if asked by a customer for a list of upcoming western movies. This intelligent information access at the controller 32 would be downloaded from each server that provides broadcast services, which might include information on upcoming free, premium, pay-per-view or special event programs. The controller 32 would keep a table of programming provided by every server, and would sort each database into a node table that could be used by the customers through a menu selection process.

Dual-Frequency System

As an alternative implementation to accomplish specific objectives of wireless distribution, the system shown in FIG. 15 could be used. FIG. 15 presents a diagram 83 which depicts the distribution of various services 78 through the node transmitter 46 to individual consumers. Telephones TP are connected to the transmitter 46 through up/down converters 85. A two-way transmission 90 flows between the node transmitter 46 and demultiplexer 89 which, in turn, is coupled to the telephone network 60. In the dual-frequency embodiment, a second, lower frequency such as 900 MHZ is used in conjunction with the microwave bandwidth used for video and other broadband transmissions. Up and down-conversion units would be placed at the nodes to convert signals between the two frequency ranges. A low-frequency base station at the customer premises might also form part of the design. Control and switching functions similar to those performed for an all-microwave system would also be available for transmissions making use of the second frequency band.

The principal purpose served by the lower-frequency portion of this system would be to provide freedom from line-of-sight restrictions for services such as cordless telephones. Low-power television distribution might also be envisioned.

FIG. 16 is a diagram 91 which portrays a conventional cable TV network signal distribution system that includes switches 92 and customer terminals 93. FIG. 17 is a diagram 94 that portrays a conventional telephone network 60 connected to switches 92 and customer terminals 93.

FIG. 18 is an illustration 95 of one of the embodiments of the present invention that can function as an extension of an existing data network. A typical application for this embodiment could be video distribution. Servers 96 that are attached to the network 60 would supply information, such as film libraries or games. The telephone network 60 used for such an embodiment would require broadband switching and sufficient trunking capacity. Servers 96 supplying these services would be connected throughout the network 60.

One option for this system embodiment would be to install dedicated fiber links 98 between the servers 96 and the antenna arrays to supply signals directly. Another option shown would be to install dedicated links 99 between antenna arrays, which would allow passing information from one array to another. In this embodiment, dedicated fiber links 99 are employed, although they could be point-to-point microwave links 70. One array shown in FIG. 18 has a direct fiber trunk 98 to the network 60, and another uses a dedicated fiber link 99 for the purpose of distributing information from servers 96 to an array in the system.

In the one embodiment of the invention, the telephone company network would use broadband capacity electronic switching system 97, which can each handle thousands of lines. In another embodiment, where broadband capacity switching is not offered by the local telephone company network 60, the switching function operations can be provided directly at the antenna arrays. The arrays would receive a single incoming channel, and either:

a) route it to the customer(s) programmed to receive it within the territory, or b) generate a point to multi-point distribution.

The present invention includes six alternative embodiments shown in FIGS. 19, 20, 21, 22, 23 and 24, which are each described below in increasing order of their functionality. Table Two identifies the key characteristics of these six alternative embodiments TABLE Two

| System/ Figure | Node Intelligence | CIU Intelligence | Outbound Channels | Return Channels | Functions Added Over Previous Embodiment |
|---|---|---|---|---|---|
| 1/19 | No | No | Fixed | None | Transparent One-Way Information Distribution |
| 2/20 | Yes | No | Fixed | None | Monitoring and Reporting Node Performance |
| 3/21 | Yes | Yes | Fixed | Shared | Implementing Requests. Dynamic Power Control. Monitoring CFU Performance. |
| 4/22 | Yes | Yes | Fixed | Fixed | Full-Duplex Services |
| 5/23 | Yes | Yes | Switched | Fixed | Shared Outbound Channels |
| 6/24 | Yes | Yes | Switched | Switched | Shared Return Channels |

For the six embodiments described below, the system 58 is used as a telephone network extension. In these embodiments, central serving, switching and control capabilities are externally located. Alternative embodiments may incorporate these functions within the system, which can provide additional features or services.

Level I System

Figure 19:
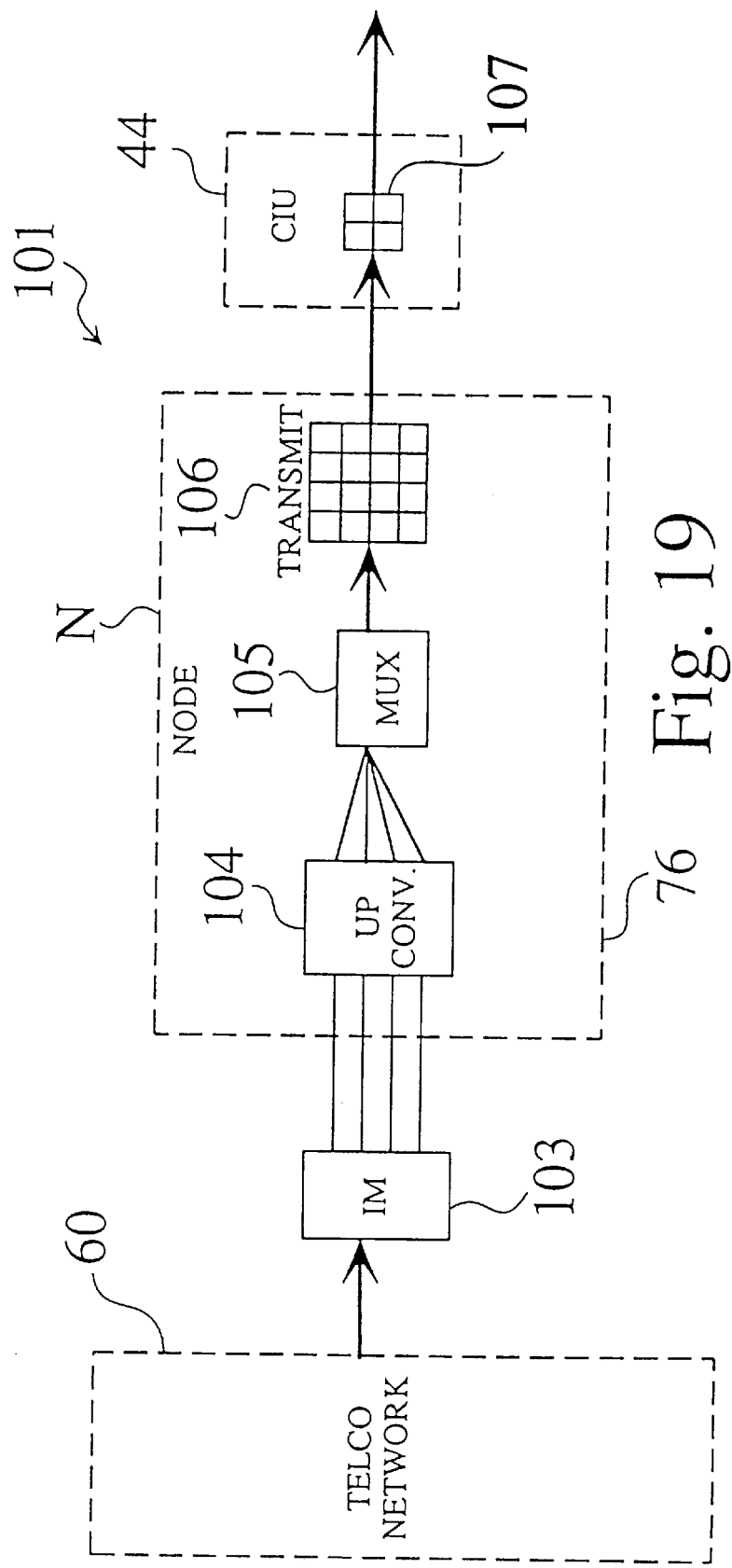

FIG. 19 depicts the most basic Level 1 embodiment 101 of the present invention. The antenna array is used as part of a one-way distribution system for wireless cable or any similar service. Incoming analog or digital signals are received from the network 60, passed through interface modules 103, up-converters 104 and multiplexers 105 en route to a transmit array 106. The signals are upconverted into the 28 GHz range and multiplexed on a frequency division (FDM) basis into a single block corresponding to the band licensed for Local Multi-Point Distribution System (LMDS) transmission.

At the receiving site, the customer interface unit 44 is a receive-only device that down-converts the entire LMDS block into a baseband or IF frequency range and outputs the block on a cable for subsequent tuning by a set-top box or other device. A pilot signal contained within the licensed block is transmitted continuously from the antenna arrays to all customer interface units 44 through CIU receiving antenna arrays 107, for their use in performing the down-conversion function.

As an option, instead of passing a full LMDS block on to a connected device, the CIU 44 can include a fixed filter that will isolate a single channel. The location and bandwidth of the passed channel will be determined by the filter module installed. With this design, a device not having a built-in tuner can be connected directly to the system for receiving information.

The Level 1 System 101 has no intelligence anywhere within the system. Any intelligent functions required by the application must be assigned either to a customer interface device or to a unit in the telephone company network 60.

A typical application for this level 1 System 101 would be for the distribution of wireless cable television programming. The system would act as a transparent link in the "last mile" of the programming distribution. The system network that would feed into the controllers 32 might look like that in FIG. 11 or 18, in which a series of sectorized cells 11, each made up of multiple sectors, would be used to distribute the signals. In one of the embodiments, each of the cells 11 are made up of at least twenty four sectors. The node controller 32, located at the origin point of each sectorized cell 11, would receive a block of television programming material from the system network, on a coaxial or fiber-optic cable or other suitable signal transmission means. The controller 32 upconverts the signal to the 20–28 GHz radio frequency band, and broadcasts the upconverted signal to each of its sectors. In this Level One System 101, no control or power output would be handled at the controller 32. The signal which is processed and broadcast by the controllers 32 is multiplexed and may be characterized by a variety of forms. An interface box might be used to provide multiplexing functions in systems where the incoming signal is not in a form that can be received by the CIUs 44. This might be an analog or digital frequency multiplexed signal (FDM).

The converted signal, transmitted from the antenna arrays, is received by the customer interface units 44 located in each of the sectors and served by the antenna arrays. The CIUs 44 receive the whole block of broadcast FDM signals, and down-convert these FDM signals into a suitable range for the televisions TV connected to them. This type of system does not require a set-top box STB. The television tuner would be used by the customer to select the desired channel from all the available channels.

Level 2 System

Figure 20:
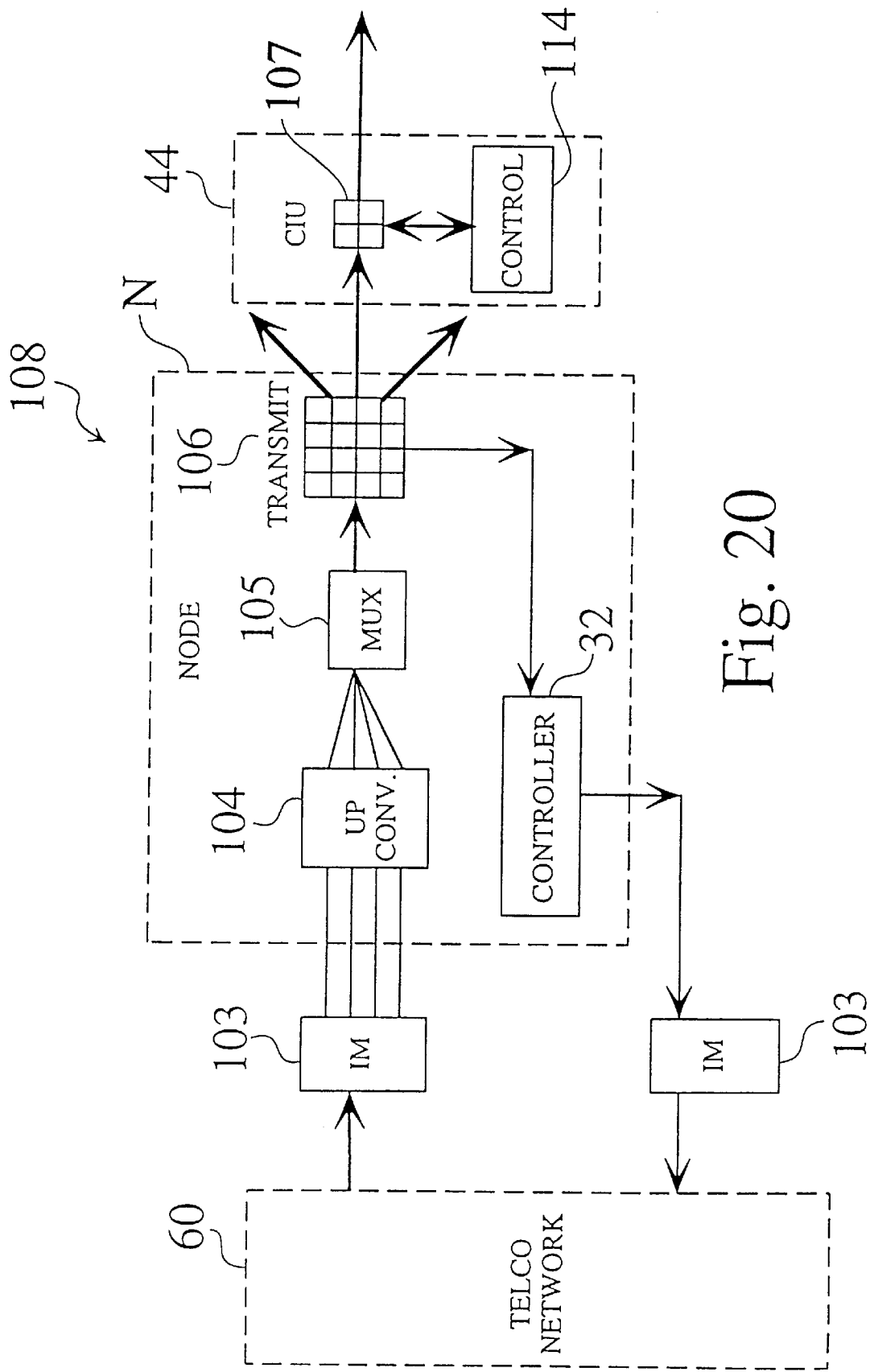

The second functional level 108, as shown in FIG. 20, includes a general-purpose processor that acts as a controller 32 for the sectorized antenna array 46, and another processor at the CIU 44. A variety of functions can be performed by this configuration. One such function would be that of monitoring the operation of the sectorized antenna arrays present in its cell 11. With equipment in place to measure output power levels for each sector, the controller 32 can sample these readings periodically and apply program logic to detect the deteriorating trends in any system element. When a potential problem is identified, the node controller 32 can transmit a warning to the telephone company's central office for maintenance attention. By this means, it should be possible to eliminate most calls for emergency repairs on the antenna arrays, and ensure maximum continuity of the service.

A second function for the node controller 32 in the level 2 System 108 would be that of providing security for the signals transmitted from the node, by performing block scrambling using frequency-hopping techniques. The CIU controller 114 would unscramble the transmission by making use of a secret code stored in its memory, as described elsewhere. Still another level of functionality would involve the joint operation of the node and CIU controllers to perform positive interdiction services, inhibiting the ability of the customer to access unauthorized programming on a channel-by-channel basis.

Level 3 System

Figure 21:
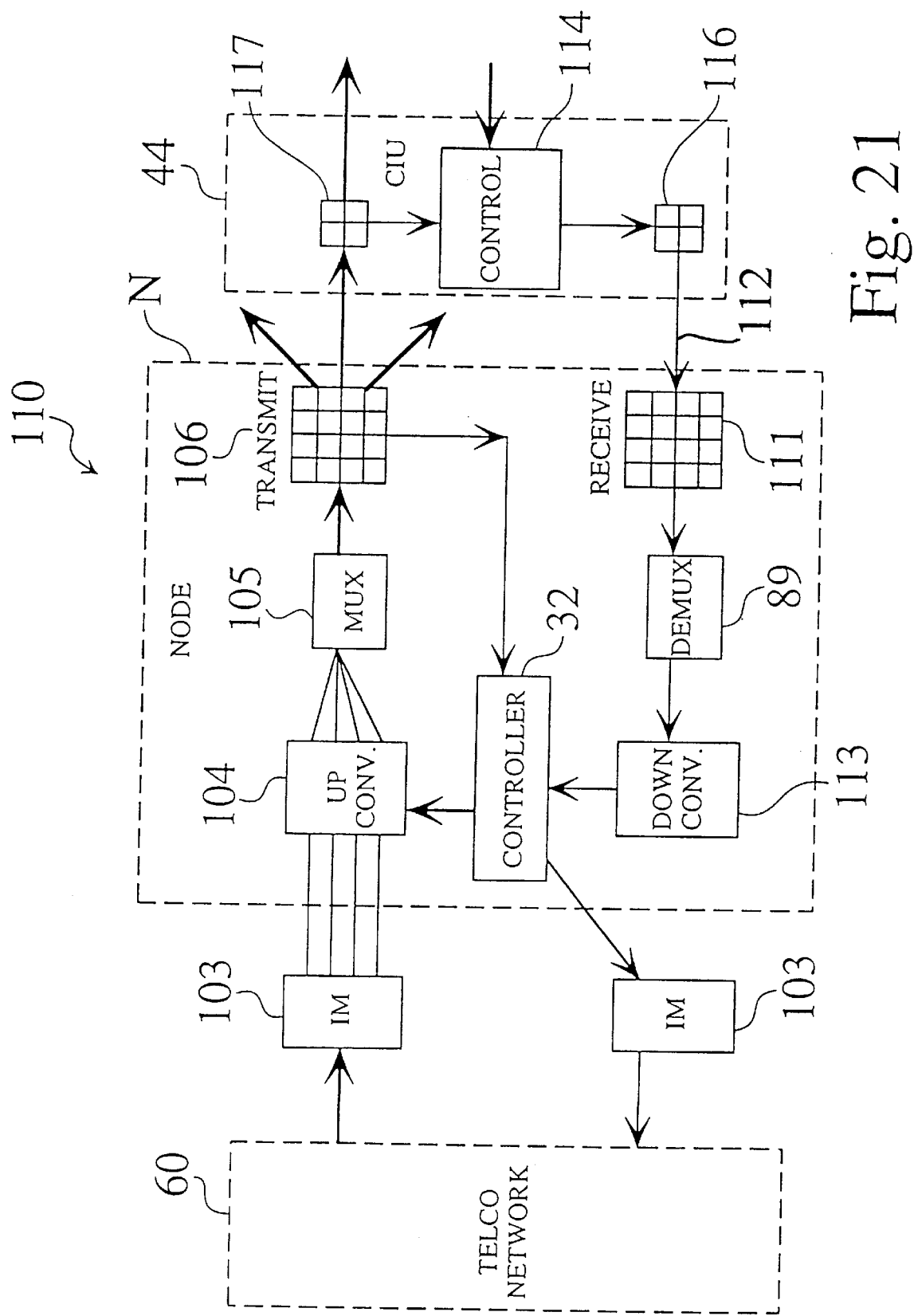

FIG. 21 provides a schematic view of the Level 3 System 110. At this level, a shared return channel 112 is generated which is used to relay requests for service from the CIU 44 to the controller 32. This design supports applications such as video on demand. With the narrowband return channel used to select programming, request information, and place orders for pay-per-view services. Performance of these functions requires of intelligence at both the controller 32 and at the IU 44. The CIU controller 114 accepts service requests from an attached device and buffers the request codes and associated information in memory until a polling signal is received from the controller 32, transmitted over the pilot channel or another channel reserved for the purpose. When its polling address is received, the CIU controller 114 transmits this stored information over the shared channel faction by the node. Relatively little data must be sent to specify a request. Accordingly, the data rate on the shared channel can be low, typically from 16 KBPS to as much as I MBPS, if many CIUs 44 are expected to participate.

Sharing of the return channel 112 can be accomplished in several ways. The simplest design is the polling approach described above. Other alternatives are:

Time division multiplexing, with each CIU 44 assigned a slot in the time domain during which it can transmit all or part of its message; or Contention, using a technique such as those employed in the Aloha or Ethernet networks, whereby a CIU 44 can determine the availability of the shared return channel 112 and seize control.

The spectrum efficiency of the shared channel 112 may be designed to be very low, in order to achieve a low cost implementation. As only one channel is involved, assigning extra bandwidth does not significantly affect system capacity. Upon receipt of a service request, the controller 32 can perform a number of useful functions. These might include:

Determining the validity of a request by examining a code transmitted from the CIU 44;

Providing program information and navigation assistance using a data base downloaded periodically from the server centers 96;

Advertising coming attractions and commercial products, and accepting orders to upgrade service or to receive specific offerings such as pay-per-view programs;

Collecting billing data for transmission on demand to the billing office; and

Reporting failures in individual wireless loops or CIUs 44.

By monitoring the strength of the signal received from each CIU 44, the node controller 32 can undertake to control its output power in a sector-by-sector basis, in order to improve system performance during conditions of heavy rainfall. When a storm front moves through a particular sector, the controllers 32 can use dynamic power controls to boost the signal power to the affected sector; and then return the signal power to a lower level as the storm passes. If necessary, instrumentation to measure the signal strength from the antenna arrays can be built into some or all CIUs 44, and the current reading would be included in the polling response.

This sector-by-sector dynamic signal control has distinct advantages over previous omni-directional systems. By limiting the boost in signal power to only sectors influenced by rainfall, the risk of burning out CIUs 44 in unaffected sectors is minimized. In prior omni-directional systems, the amount that the signal power could be increased to all customers was limited to the maximum power limit of all customers. The present invention, which utilizes many narrow sectors, allows signal power to be boosted in only the affected sectors, leaving the other sectors untouched. Since rainstorms can vary widely in size, this system ability provides distinct advantages over previous systems.

The intelligence in the CIU 44 can also be employed to perform additional functions to assist customers in using the system. For example, menus for program selection could be stored in memory, along with a set of help messages to assist in explaining their use. By implementing this capability, in conjunction with the increased functionality of the controller 32, many of the routine navigation functions needed for advanced video services could be accomplished without the need for an expensive set-top box STB.

Various approaches to CIU antenna design may be used for the Level 3 system 110. It may be possible to use the receive antenna for the return path, either by using a circulator or by time-sharing techniques. A small CIU transmitting antenna 117 could also be used, which would be separated by a few inches from the CIU receiving antenna 116.

Level 4 System

Figure 22:
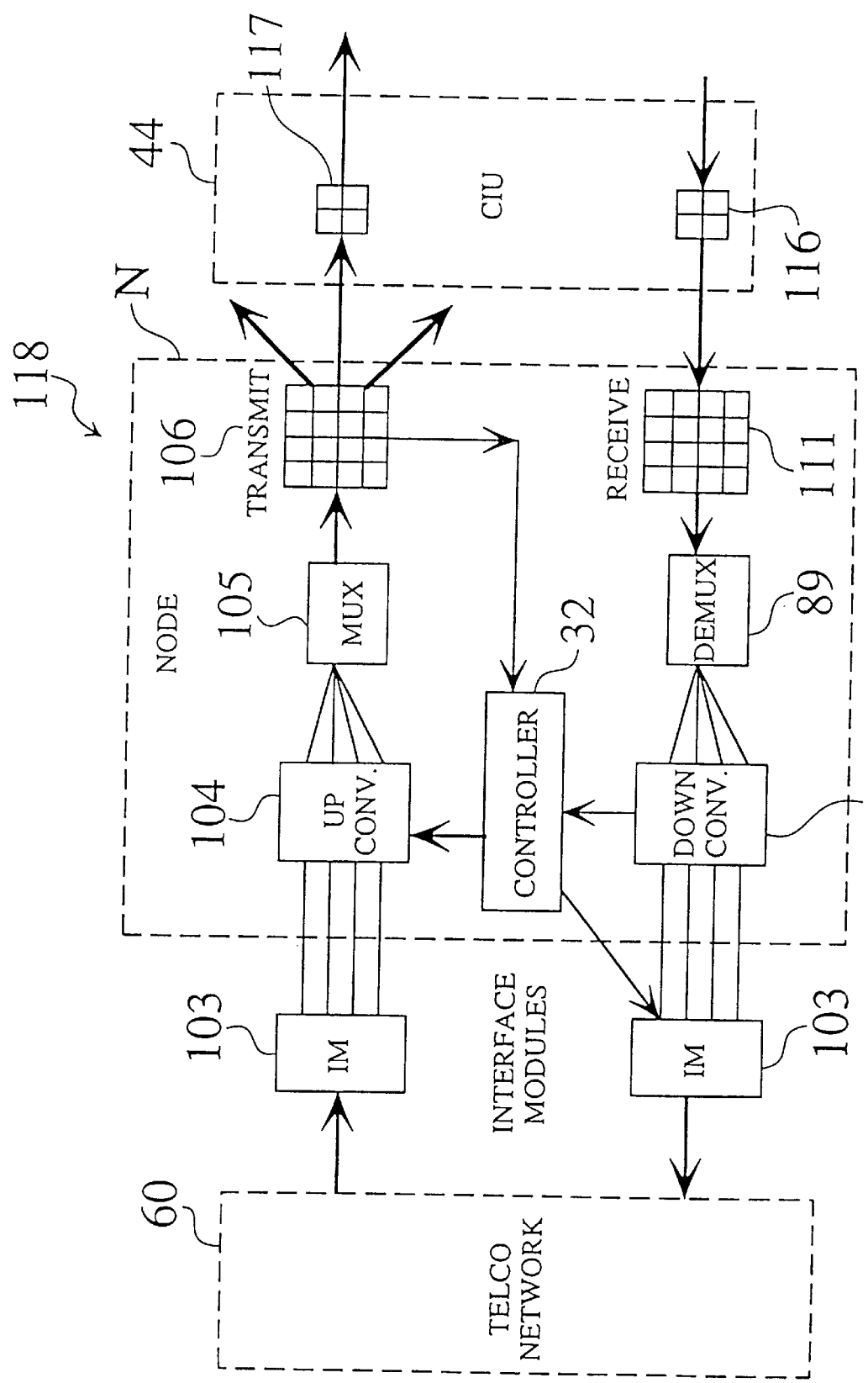

FIG. 22 depicts a fourth level of the system 118 that is designed to permit two-way broadband communication. A CIU transmit antenna 117, approximately equal in size to the CIU receive antenna 116, has been incorporated in the CIU 44. The transmitter 106 feeding this antenna 117 will operate on a fixed-channel, established at the time this unit is installed. With circuitry at the antenna arrays to identify and trap requests on the return channels, the controller 32 would be capable of performing similar control functions to those of the Level 3 system 110.

As an option to the design shown in FIG. 4, a processor/controller 114 similar to that shown in FIG. 21 would be added to the Level 4 CIU 44. With this addition, plus request code traps, the Level 4 System 118 would have full control functionality. A shared channel would be used for communications from the antenna arrays; while the controller 32 would identify requested actions by scanning a table corresponding to the CIU polling sequence.

Level 5 System

Figure 23:
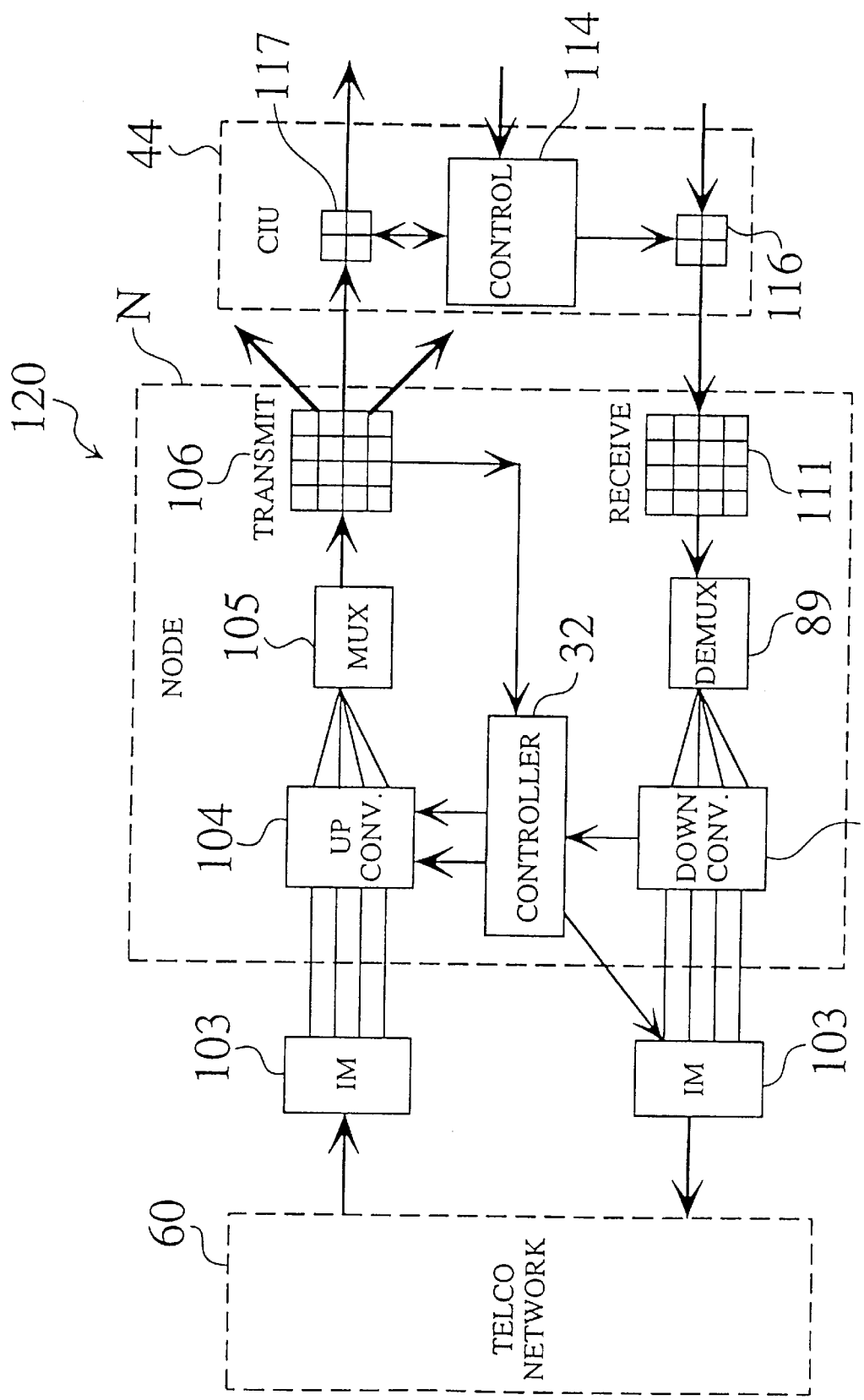
Figure 24:
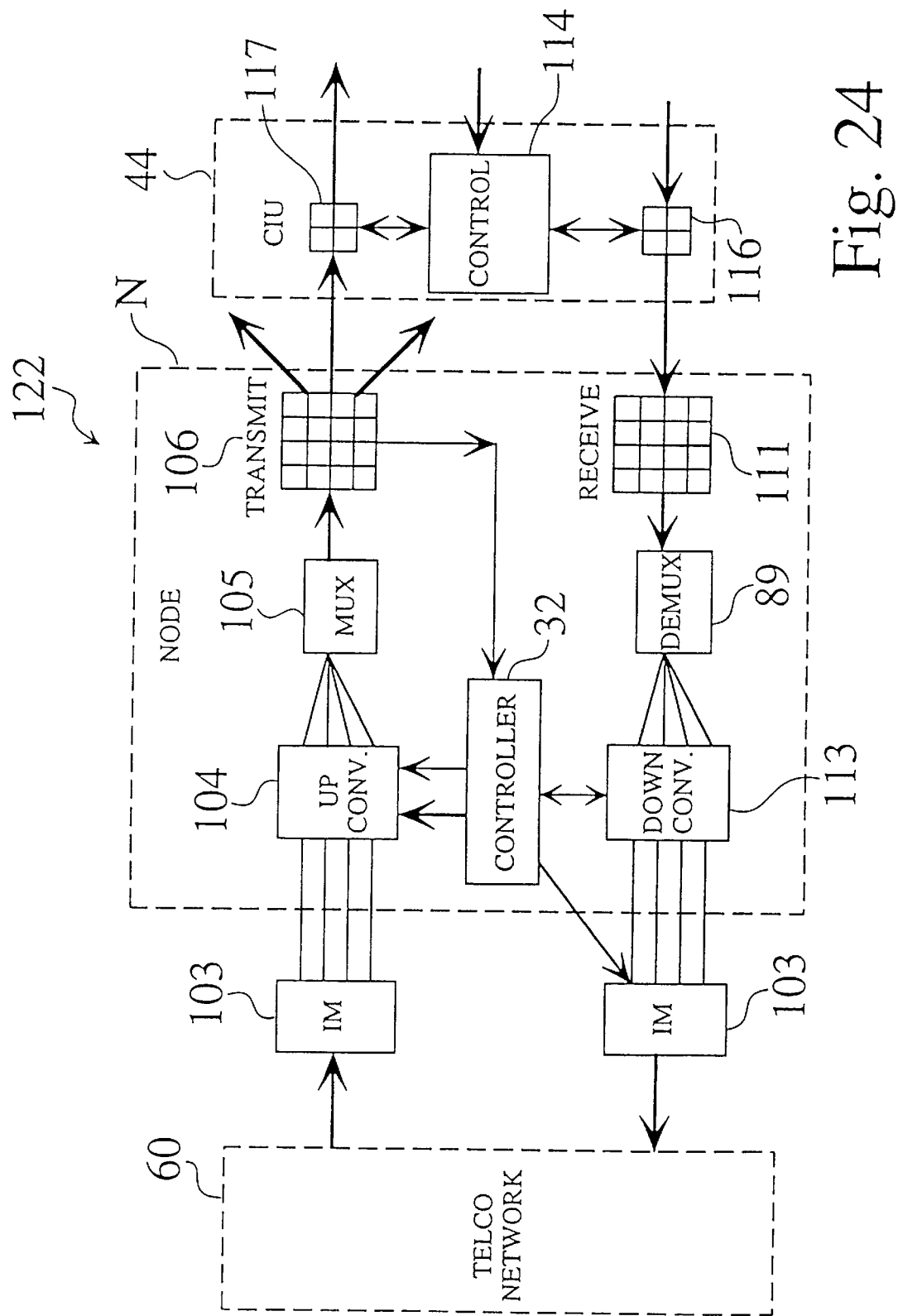

FIG. 23 portrays a level 5 system 120, with intelligent controllers 32 and 114 installed at both the antenna arrays 46 and the CIU 44. This configuration makes it possible to perform a cross-connect switching function on the transmissions entering the system from the telephone company network 60. The purpose of providing this function would be to reduce the demands on the network facilities outside LMDS, the servers, switches, and distribution plant required to deliver information to the antenna arrays.

To implement the Level 5 design 120, the CIU 44 must incorporate a frequency controller which, operating under the command of the CIU controller 114, is capable of tuning the output from the unit to any channel available in the LMDS block. When a service request is made through the CIU 44, the controller 32 logs the incoming call and reserves a channel for the requested transmission. It then forwards the request to the appropriate server center 96, which acknowledges the request and indicates which of the channels connecting it to the antenna arrays will be used for the transmission. Over the shared control channel, the controller 32 issues instructions to the CIU 44 to tune to the local charmer that it has reserved. At the antenna arrays, it resets the up-converter 104 assigned to the transmission from the server center 96, in order that the incoming signal will be transmitted on the proper LMDS channel. In the same way, a single incoming transmission can become a point-to-multipoint distribution, simply by instructing multiple CIUs 44 to tune to the same channel.

As an alternative to this approach, a standard cross-connect switch might be installed at the antenna arrays. Operating under the command of the controller 32, this unit would be capable of connecting any incoming transmission with any LMDS channel. Under this arrangement, the up-converters 104 at the antenna arrays, as well as the CIU receivers 116, could continue to operate at fixed bandpass frequencies. Additional flexibility and functions such as bandwidth on demand requires a tunable CIU receiver 116.

Level 6 System

At the sixth level system 122, the same switching function performed for incoming transmissions in the Level 5 system 120 are extended to transmissions originating at the CIU 44. This design provides increased flexibility for handling full-duplex communications such as voice service. Level 6 also allows operation with fewer channels than customers, in recognition of the fact that circuit occupancy for this type of device is always well below 100%.

The switching of outbound channels can be accomplished simply by using a frequency synthesizer in the CIU 44 that is capable of being tuned under command of the node controller 32. To create a full duplex circuit, a pair of channels would be assigned to the CIU 44 at either end. The transmitter of each would be tuned to the frequency assigned to the other's receiver.

As with the Level 5 design 120, a similar function might be performed through the use of a cross-connect switch at the antenna arrays. In this case, transmissions from the CIU 44 would always be made in the same frequency band, but the switch would be set by the controller 32 to route the signal to the appropriate port for entry into the telephone company network.

FIGS. 25 and 26 present diagrams which portray two-way communications between cellular nodes and televisions TV, personal computers PC and telephones TP situated in single family residential 124 and multiple dwelling 126 environments. A residential antenna 125 is shown on the buildings in both FIGS. 25 and 26.

FIG. 27 exhibits an allocation 128 of program channels that may be selected by a customer who subscribes to the advanced wireless cable service that may be offered using the present invention. The first allocated channels are standard broadcast channels 130 available to every subscriber, which in this example consists of fifteen channels. For an additional fee, the subscriber could receive one or more blocks of additional broadcast channels 132, 134 & 136 from one or more providers through the broadcast node, which in this example are blocks 132 and 134, which in this example are each carrying 30 channels. Blocks 132 and 134 may also provide optional premium channels 136, such as movie, sports, news, or special interest channels, which would be available to the subscribers for an extra fee.

To order additional services, the subscriber could either call the service directly, or, for system embodiments that include control channels back to the network 60, the subscriber could order the desired services directly through a set-top box STB or some other interface unit.

One embodiment of the present invention uses a pair of notch filters to provide customer access to blocks 132 and 134. The notch filters, installed at the customer's interface box, would allow three alternatives; block 132 service, block 134 service, or both block 132 and 134 service.

The first thirty channels provided by block 132 may be provided by a primary common carrier, while the second thirty channels provided by block 134 might be provided by secondary supplier who requests available access to the local broadcast spectrum. The total bandwidth required for blocks 132 and 134 may be on the order of 1 GHz.

For non-subscription pay-per-view services and interactive programming and communication, a set-top box STB would usually be required at the customer location, such as manufactured by Hewlett-Packard™ or Scientific Atlanta™. For instances where interdiction is available, pay-per-view services may be available without a set-top box STB. Where used, the set-top box STB would send the outgoing signals to the antenna arrays through the CIU 44.

FIG. 28 is an interdict table 138 that may be utilized as a filter which blocks access to specific channels shown in FIG. 15. Implementation of the interdict table may be achieved through the use of filters or synthesizers. If filters are used on every channel, the filters would be set either on or off at the antenna arrays or from a central location, depending on the customer order. Upon a request for a change in service, a new interdict table 138 would be implemented for the customer to add or remove available channels, by using appropriate logical values of "0" or "1" within the interdict table 138.

The use of synthesizers to implement the interdict table 138 would require the synthesizers to block or enable transmission of selected channel signals, with each channel covering approximately 6 MHZ of bandwidth. For residential users, the interdict table 138 may operate at the CIU 44 to control access to channels for the entire household. For service to apartment buildings 126, it may be desirable to use a single front-end CIU 44, while using separate interdict tables 138 to provide different services to different customers at the site. A single control box could be used to control access to the customer television set or other connected devices.

With an outgoing channel to provide channel requests back to the network 60 by the viewer, interdiction could take place between the controller 32 and the set-top box STB on each television set TV to provide or to restrict access to channels. Blocking channels could be achieved either by simply blocking or scrambling the signal, or by replacing the signal with a prompt that could explain, on the viewer's television screen, how to request the service.

FIG. 29 is a node block diagram which reveals the flow of signals from the transmitting and receiving antennas through controller 32 to fiber trunks 142. Fiber trunks 142 carry signals into optical/electrical converter 144, a demultiplexer 89, independent up- and down- converters 148, a frequency domain modulation multiplexer/up converter 150 and a transmitter 152. Signal and control links 146 connect the demultiplexer 89 to a controller 32. The lower half of the node block diagram 140 contains a receiver 154 which feeds signals to a frequency domain modulation multiplexer/down converter 156, converters 148, a multiplexer 105, an electrical/optical converter 157 and finally out to fiber trunks 142. Signal and control links 146 connect the multiplexer 105 to controller 32.

FIG. 30 exhibits a block diagram 158 for a generalized switch. Demultiplexers for a first, a second and a third sector 160, 164 and 168 are coupled via single channel buses 161 to sets of switches 163 to multiplexers 162, 166 and 170 dedicated to each of the three sectors. The switch 158 shown in FIG. 30 may be used in conjunction with various embodiments of the present invention. In a small network which only supports local subscribers, service may be provided by supplying the composite received signal to the antenna arrays and by controlling traffic through end-to-end channel assignments. Larger networks call for frequency reuse to manage higher traffic volume. Some form of switching must be employed if local calls are allowed to cross sector boundaries. In addition, many calls conveyed by the system are likely to be long distance calls. Since a 1 GHz bandwidth will be insufficient to serve the call traffic for the entire United States, each region that is served must be free to make its own local channel assignments independently.

One embodiment of the present invention overcomes the enormous challenge posed by this switching requirement using the switch shown in FIG. 30. One requirement of this design is that the same channel be assigned in all sectors designated to receive a particular transmission. For example, Channel 1 in Sector 1 may communicate with Channel 1 in Sectors 2 and 3, but not to any other channel. By imposing this constraint, the need to up- and down-convert frequencies between channels is avoided.

Multiple access from Channel 1, Sector 1 to two or more other Channel 1's in other sectors necessitates the use of a series of buses. One bus for each channel conducts the demux outputs into the appropriate slots in the muxes for all sectors, including Sector 1. Switching is performed after the bus, by opening the connections to any sectors that are not intended to receive the transmission. This innovative design greatly reduces the number of connections needed, and concomitantly affords dramatic cost savings.

FIG. 31 reveals the details of a POP interface 172, which is used as an interface for sending and receiving long distance calls. Demultiplexers for a first and a second sector 160, 164 are coupled via single channel buses 161 to sets of switches 163 to multiplexers 162 and 166 which are dedicated to the first and second sectors. A POP demultiplexer 174 is connected through variable upconverters 176 through a set of switches 178 and variable down-converters 180 to a POP multiplexer 182.

Each demultiplexer 160, 164, 174 or single line is routed through a variable up-converter switch 176, which, under computer control, adjusts the incoming baseband or IF signal to that of the local channel assigned. Exiting the converter, each data channel is connected through switches 163 to all buses carrying channels of its bandwidth. In FIG. 31, Signal A is connected only to the Channel 1 bus. Signals B and C have the same bandwidth, and are connected to both the Channel 2 and Channel 3 buses. Sector-to-sector switching requires that the signal be placed on the specific channels which are designated to receive it by disabling the switches on all other channels.

In the case of outgoing long distance calls, a similar approach is employed. Traffic from any channel is directed by switches toward channels of appropriate bandwidth on the POP multiplexer 182. Variable down-converters 180 will adjust the frequencies of these signals to baseband or any other levels required by the specific interface involved.

As the system expands, additional point-to-point links can be installed to carry information from the added sectors to all cells. FIG. 32 presents diagrams showing alternate point-to-point routing 184 and links tailored to traffic density 188. The diagrams reveal signal pathways conveyed among sectorized antennas 46. The location of the city center is represented by reference character 186.

FIGS. 33 and 34 portray the single and multiple user transceivers that may be employed to implement the present invention. FIG. 33 is a block diagram of a single user transceiver 196 mounted on the rooftop 192 of an office building 194. The transceiver 196 includes an antenna 198, a local oscillator 200, a modem 202, a fiber interface 204, control circuitry 114, and is connected to a DC power supply 208 and a fiber interface 210 inside the building 194. The interface 210 in the building is coupled to a coder/decoder 212 and to the particular device 214 used by the customer.

FIG. 34 is a block diagram of a multi-user transceiver 216 mounted on the roof 192 of a building 194 that utilizes two antennas 198 and 199. The transceiver 216 comprises a multiplexer 105, a local oscillator 200, demodulators 218–220, control circuitry 222, modulators 224–226, and fiber optic interfaces 204. The transceiver 216 is connected to a DC power supply 208 and to fiber optic interfaces 210 inside the building 194. Within the building, the interfaces 210 are linked to half-duplex (HD) and full-duplex (FD) devices 232 and 234.

The antennas 198, 199 used for the transceiver would be about eight to nine inches long, and have a gain of about 31 to 32 dB. These transceivers 196, 216 are capable of handling a full 1 GHz of spectrum without division into smaller blocks. They have the ability to select a channel of any bandwidth from anywhere in the full range under local control, as well as possessing send and receive capabilities at the device interface level in half-duplex mode. The transceivers 196, 216 exhibited in FIGS. 33 and 34 would support fiber optic connections carrying baseband information between a remote RF unit and an interface unit located at the connected device. The multiple-user design would nominally support ten channels, and would require a pair of antennas 198, 199. The incoming signal would be routed to parallel demodulators 218, 220, each dynamically tuned to a different channel. Their baseband outputs would be fed along fiber optic cables to the individual device interface units. An alternative embodiment also calls for multidrop connections that may be made to these cables for providing "party line" service on a contention basis. The return channels parallel the incoming channels, but in this case, the signals emerging from parallel modulators must be combined in an FDM multiplexer before transmission.

FIG. 35 is a flow diagram that depicts both a wait state 236 and a transmit condition 248. The upper half of the diagram reveals an antenna 198 coupled through a control channel 238 to a modem 202, a switch 240 and a device 214. The modem 202 is also linked to control circuitry 114, while the switch is also linked to a buffer 244. The lower half of the diagram shows the same components feeding signals to the antenna 198 through a data channel 250.

Polarization Control for Isolation of Adjacent Sectors

One of the important features of the present invention is that the transmitting antenna arrays are capable of forming a highly controllable and well defined pencil beam pattern. While is not possible to roll the antenna sidelobe off very far (on the order of 20 dB or so) within the first portion of the first beam width, the present invention is capable of rolling off sidelobe to this degree within the next beam width. In one embodiment of the invention, each sector of the cell is illuminated with a modified pencil beam antenna pattern. The resulting transmitting pattern illuminates a wedge shaped sector radiating out from the node. The antenna pattern is formed so that the adjacent sector is begun at approximately the 3 dB roll off of the central antenna pattern. The signals from one sector are kept from the signals in the adjacent sector by using orthogonal polarization techniques. Polarization is used in the adjacent sector because it is physically impossible to have a practical roll off of on the order of 20 dB in the few inches or few feet of distance separating one sector from another. (This turns out to be a few hundredths of a degree in the antenna pattern.) It is possible to produce antenna roll off on the order of 20 dB one beam pattern away.

In the third sector over from the main beam, the antenna pattern has rolled off enough (on the order of 20 dB or more) to have enough isolation that a reasonably error corrected signal will work very well. It should be noted that this third sector three utilizes the same polarization as the first sector. As a consequence, no isolation is maintained between odd or even numbered sectors based on alternate polarization alone.

The polarization isolation provides 20 to 30 dB of isolation even if the antenna arrays that serve different sectors are in the same physical space (separated only by the size of the respective antennas). Better performance can be realized by implementing low side lobe or shaped beam antennas. An antenna array with a uniform illumination will produce a sidelobe that is 13 dB lower than the main antenna's gain at the center of the beam. This first sidelobe can be reduced to 20 or 30 dB with proper attention to design of the amplitude and phase characteristics of each radiating element. These antennas are used to ensure that the next sector over receives interfering signals from the once removed adjacent sector that are 7 to 17 dB lower in size. The signal to noise ratio is also enhanced using this technique.

FIG. 36 depicts a sectorized antenna 46 that includes a hexagonal array 258. Six transmitting antenna arrays 261, 262, 263, 264, 265 and 266 serve six sectors 271, 272, 273, 274, 275 and 276 numbered counter-clockwise from 1 to 6. Three receivers 294, 295 and 296 are shown in sectors numbered 274, 275 and 276. The signal 284 transmitted by the antenna array 264 will be received at full strength by receiver 294 because the antenna polarization is the same as the sector transmitter 264. The receiver 295 in sector 275 will reject the signal 284 transmitted by antenna array 264, because arrays 264 and 265 are alternately polarized with vertical and horizontal signals. Each antenna array on the pole P is alternately polarized, so that signals transmitted to adjacent sectors will not interfere.

All the even numbered arrays (262, 264 and 266) are polarized differently from all the odd numbered arrays (261, 263 and 265). As a consequence, the alternate polarization scheme will not reduce interference among the even numbered sectors or among the odd numbered sectors.

The isolation between even and odd numbered sectors is accomplished via the novel antenna pattern roll off technique illustrated in FIGS. 37, 38 and 39. These three figures supply graphs that plot signal strength in dB versus signal strength received at three different sectors. FIGS. 37, 38 and 39 illustrate how interference among even or odd numbered sectors is substantially reduced through the implementation of the novel antenna roll off method. Each beam is shaped so that most of the energy from a given antenna array is directed only toward the sector it serves. Even though receivers in sectors 271, 273 and 275 or the receivers in sectors 272, 274 or 276 sense the same type of polarized signal, the different signals destined for each one of those similarly-polarized sectors is isolated. The implementation of this antenna roll-off method does require an even number of antenna arrays at any given node. At the 28 GHz frequency band, one may utilize from about 6 to 200 sectors per node. This same method of using sectorized antenna arrays combined with alternate polarization to isolate adjacent sectors works equally well in the reverse mode for transmitting information from users in the area of the node to the node itself. In this case, the pencil beam antennas at the node are designed to receive signals, and they reject signals from the adjacent sector by using the same concept of reverse polarity. It may also be beneficial to use one set of polarities during transmission and the opposite set of polarities during reception to reuse the same frequencies twice.

Use of Shaped Beam or Ultra Low Sidelobe Antennas to Improve Signal to Noise in Adjacent Sectors An additional aspect which may be implemented in conjunction with the system described above is to use low sidelobe antennas as the transmitter sources at the node. This gives the advantage of reducing the sidelobe in the one over adjacent sectors where the polarization is again the same as for the transmitting antenna. There are two basic approaches. The first involves using antennas which distribute power to the individual radiating elements so that the center-most elements radiate more power than the elements at the periphery of the antenna. In this fashion, the first sidelobe exposed to the one over adjacent sector is substantially lower. This results in a lower level of unwanted energy in the one over adjacent sector.

Shaped Beam Antenna Patterns

Another feature of the invention involves the use of a shaped beam antenna. In this case, the transmit antenna emanates a shaped beam with the kind of pattern 300 shown in FIG. 41. FIG. 40 illustrates a conventional beam pattern 298 that is formed without beam shaping. As can be seen from the figure, the 3 dB roll off within the main beam is reduced to approximately 1 dB. This results in a reduced amount of power necessary to illuminate the edges of the sector with minimum power levels as compared with the conventional antenna. Either the center of a sector receives 3 dB excess power or the sector edge receives 3 dB to little power, depending on the point of reference when using a conventional antenna. For the shaped beam antennas the difference is only 1 dB, a substantial improvement. This has the advantage of reducing the power spillover into the next cell in a cellular system. See FIG. 41. The shaped beam antenna also has very good sidelobes which result in low levels of one over adjacent sector unwanted signals.

FIG. 42 depicts a sectorized antenna array 46 that emits three different beams. The first, 302, is directed down toward the ground at an angle of −1.0 degrees. The gain of the first beam 302 is 38 dB. The second, 304, is directed down toward the ground at an angle of −2.17 degrees. The gain of the second beam is 32 dB. Finally, a third beam, 306, is pointed downwards at −4.3 degrees, and has a gain of 26 dB.

FIG. 43 reveals another schematic depiction of the sectorized array 46 shown in FIG. 42. Each of the three beams 302, 304 and 306, is sensed by a receiver located at two miles, one mile and one-half mile away, respectively. At a distance of two miles, which is indicated by reference character 312, beam 302 (−1.0 degrees) experiences a space loss of 133 dB. At one mile, shown by reference character 310, beam 304 (−2.17 degrees) experiences a space loss of 126 dB. Beam 306 (−4.3 degrees) realizes a space loss of 120 dB at one-half mile (308).

Sources of Potential Signal Interference

In a system such as that described in this Specification, a major concern is co-channel interference originating from multiple transmitters contained in various sectors and/or cells. Four sources of such interference require special concern:

- a) Spillover interference from one sector to another, as experienced by receivers located along the boundary between sectors (See Spillover "8" in FIG. 43B). This factor becomes increasingly critical as sector beamwidth decreases, as the portion of a sector affected by spillover becomes an increasingly large percentage of the total area.
- b) Interference arising from the first sidelobe of an antenna transmission pattern. The intensity of this interference source peaks in the middle of the adjacent sector. (See First Sidelobe "2" in FIG. 43B.)
- c) Interference arising from the second sidelobe of an antenna transmission pattern. Intensity peaks in the center of the second adjacent sector. (See Second Sidelobe "3" in FIG. 43B.) Typically, interference from third and higher sidelobes can be considered negligible.
- d) Interference experienced at receivers located in an adjoining cell. (See FIG. 43C). These may be located at the node or at customer premises.

In the basic embodiment of the invention, isolation from the above classes of interference can be obtained in three ways:

- a) Through horizontal directionality, providing the ability to reject signals arriving from adjacent sectors or adjoining cells, where the angle of incidence differs significantly from the direct horizontal line between the transmitter and receiver.
- b) Through vertical directionality, providing the same ability to discriminate between transmissions from the closest node and one located in an adjoining cell.
- c) Through signal attenuation due to free-space, atmospheric, and rainfall attenuation. This factor tends to favor a signal from a nearer, rather than a more distant source.

FIG. 43D shows a cross-section of a typical antenna pattern generated by a node transmitter.

Polarization Control for Improved Signal Isolation

In the basic embodiment of the invention, each sector of the cell is illuminated with a modified pencil beam antenna pattern. The resulting transmitting pattern illuminates a wedge-shaped sector radiating out from the node. An antenna pattern similar to that shown in FIG. 43D is observed, with the adjacent sector beginning at approximately the 3 dB roll-off point of the central antenna pattern. Signal isolation is limited to the directionality characteristics of the system design.

To achieve increased isolation, the signals from once sector can be isolated from those in the adjacent sector through the use of orthogonal polarization techniques.

Through the use of polarization, approximately 20 to 30 dB of isolation can be produced between adjacent sectors, even when the antenna arrays serving adjacent sectors are separated only by the width of the respective antennas. In the second adjacent sector, the transmission pattern generated from the central antenna will have rolled off enough (on the order of 20 dB or more) that a reasonably error-corrected signal will work acceptably.

It should be noted that the second adjacent sector utilizes the same polarization as the central sector. As a consequence, no isolation is maintained between odd or even numbered sectors based on alternate polarization alone.

As indicated above, interference can also occur between a transmitter in one node and receivers located in an adjoining cell. By alternating the polarity used in adjoining sectors (See FIG. 43E), isolation from this type of interference can be reduced by 20 dB or more. The closest receiver sharing the original polarity is now distant by a full two cell radii, with maximum interference, after allowing for vertical directionality, occurring at a distance of three radii from the original node.

The use of polarization to isolate adjacent sectors works equally well in the reverse direction, for transmitting information from users in the sector back to the node. The same polarity may be used in both directions; alternatively, one polarity may be used for transmission from the node, with the orthogonal polarity used for return transmissions. Potentially, this may make it possible to use the same frequencies twice, doubling the spectral efficiency of the system.

Beam-Shaping Technology for Improved Signal Isolation

A second approach for improving the performance of the invention is the use of shaped-beam antenna design. This involves creating antenna arrays which distribute power to the individual radiating elements in such a way that the centermost elements radiate more power than the elements at the periphery of the antenna.

An antenna array with a uniform illumination will produce a first sidelobe that is 13 dB lower than the gain at the center of the beam. By applying beam-shaping technology to the design of the antenna, the first sidelobe can be reduced by an additional 7 to 17 dB, providing total isolation of 20 to 30 dB at the center of the first adjacent sector. The second sidelobe can be reduced by a similar amount, implying a total isolation at the center of the second adjacent sector of 27 to 37 dB. The signal-to-noise ratio is also improved by this technique.

As illustrated in FIG. 43F, a major effect of beam-shaping design is the concentration of energy into a narrower beam than is achievable with conventional antennas. Each beam is shaped so that most of the energy from a given antenna array is directed only toward the sector that it serves., In the example shown, the rolloff at the sector boundary is only 1 dB, rather than the 3 dB typical of conventional antennas. Accordingly, the spillover interference between sectors is drastically reduced.

Combined Polarization and Beam-Shaping Technology

Many possible applications of the present invention, such as its use for telephony and data transmission, will require higher standards of signal isolation than can be achieved by polarization or beam-shaping alone. By applying both technologies to the basic system, extremely attractive isolation figures can be achieved in all three instances of potential interference. The following tables indicate a likely level of performance for this system:

a) Spillover at 1 degree from sector boundary

| | |
|---|---|
| Receiver directionality | −10 dB |
| Transmission rolloff | −10 dB |
| Polarization | −20–30 dB |
| | 40–50 dB |

-continued

| b) First adjacent sector | |
| --- | --- |
| Receiver directionality | −15 dB |
| Transmission rolloff | −20 dB |
| Polarization | −20–30 dB |
| | 55–65 dB |
| c) Second adjacent sector | |
| Receiver directionality | −20 dB |
| Transmission rolloff | −30 dB |
| | 50 dB |
| d) Next cell maximum (at two-mile cell radius) | |
| Vertical rolloff | −20 dB |
| Incremental space loss | −30 dB |
| | 50 dB |

The figures presented above are approximate, and depend on frequency, system configuration and other factors.

Use of Transmitter Incorporated into the User Receiver for Weather Gain Feedback Another characteristic offered by the present invention pertains to the installation of a very low power transmitter in each remote receiver. The transmitter may use the same antenna and local oscillator as the receiver, and in the low duty cycle mode interjects signals in the received stream in a back-channel mode.

The receive system samples the received signal strength, and when it falls below minimum levels, it sends a signal back to the node requesting additional transmit power. In this manner, a feedback loop is established to increase transmit power during period of rain.

Use of the Return Signal as the Enabling Element in an Active Public Key Private Key Encryption System The system may also employ a return channel to carry information for an encryption system. The use of public and private keys for encryption is well known to persons skilled in the encryption arts. The present invention uses keys that can be changed at will and randomly for each individual user. The key and an acknowledgment can be conveyed back and forth between the transmit node and the user. This method has the advantage of making the code breaking process very difficult for even very inexpensive, low overhead forms of encryption.

One way to implement this encryption method is to use frequency hopping of the local oscillator on the receive and transmit system. A two or three oscillator system is used where one oscillator is providing a local oscillator signal for the radio at time t=0. The second oscillator is set to the next frequency, and begins to stabilize and go through the process of phase or frequency locking. The third oscillator is set to the third frequency to be used in the hopping scheme, and begins the process of stabilizing in the same fashion as the second. When the second oscillator is stabilized, the output is switched to the mixer and the first oscillator is switched away from the mixer. Switches that can toggle in a few nanoseconds are utilized to implement this method. In contrast, oscillators may take upwards of several microseconds to stabilize and lock after being set to a new frequency. The hopping frequency can be increased by the number of oscillators used. As an example, if three oscillators are used and the settling time is 6 microseconds, and the switch-over time is 10 nanoseconds, then each oscillator can be switched to a new frequency every 2 microseconds. The encryption signal tells what the hop sequence is. Unless the hopping sequence is known, an oscillator trying to follow the hopping scheme will never have enough dwell time to synch up with the signal, hence rendering its output useless. An unique code can be stored in each receiver in a digital look up table. The code can be the serial number of the receiver. This code can be a vary with the time of day or the day of the year, or may be a special code transmitted from the node at any time. The transmit signal from the receiver to the node can select from a number of look up tables stored in the receiver, and thereby request from the node a corresponding code (or key) to unlock a decryption code based on the time, day of year and the code just requested. The decryption signal can be accessed only when the user key that is transmitted correlates with all three oscillators.

Use of Antenna Pattern to Provide Constant Power to Receive Locations

Another feature of the present invention concerns the use of transmitting antennas having antenna patterns that provide uniform illumination to receive locations far from the node, as well as to those that are close to the node. This is accomplished by using an antenna pattern for the transmitting antenna arrays that provides higher amounts of gain at horizontal elevations and less gain at lower elevations. FIGS. 42 and 43 show that for a minus 1 degree elevation angle, the maximum range receivers at two miles are illuminated. With a −4 degree angle, the antennas illuminate a receive location that is one half mile. The −4 degree angle needs 12 dB less transmit signal than does the −1 degree angle.

Use of a Radar Absorbing Hood over the Antenna Arrays to Reduce Emissions to Satellite Some of the bands being awarded in the millimeter wave frequencies are shared with satellite services. To maintain compatibility with the satellites, it is necessary to reduce the emissions radiating upward. FIG. 44 shows sectorized antenna arrays 46 with a hood or shroud 314 positioned over them. The shroud 314 is made of a radar absorbing material, such as Emerson and Cummings Echosorb. The shroud 314 serves the function as a radar absorbing surface and reduces the upward emissions of sidelobe energy 316. This shroud 314 also serves to shield the antennas from rain and from waste products from birds. The desired transmitted energy is represented by arrow 318.

Use of Active Cancellation and Sampled Cross Polarization Signal for Active Cancellation The present invention also offers additional advantages when a planar array is configured so that one output delivers a signal of vertical polarization and another output delivers a signal of horizontal polarization. This configuration is illustrated in FIG. 45. When the antenna is exposed to a signal which has two components of equal strength but of opposite polarities, the antenna will output two signals, one from each output, one being vertical and the other being horizontal. The signal that is vertically polarized will have predominantly a vertical signal, but there will be some horizontal signal leaking through. This unwanted horizontal signal will be less than the vertical signal, typically by 15 to 30 dB. The horizontal output of the antenna containing predominantly the horizontal signal will likewise have a small vertical component which is smaller than the desired horizontal signal by typically 15 to 30 dB.

The circuitry shown in FIG. 45 samples the horizontal signal, attenuates it, shifts the phase angle by 180 degrees and adds this signal to the signal from the vertical output. The net effect is to cancel the unwanted horizontal leakage by another 20 to 30 dB. This technique is well known and has been used by American Nucleonics™ and the U.S. Air Force for a number of years in a different fashion. The result is an antenna with rejection from polarization and active cancellation on the order of 40 dB to 60 dB at small fractions of a beamwidth from the main beam, and with 20 to 30 dB rejection due to antenna roll off at just over one beamwidth from the main beam.

The circuit components depicted in the schematic diagram 320 shown in FIG. 45 comprise an antenna 326 which receives vertically and horizontally polarized signals 322 and 324. The antenna 326 produces a vertical V+(−30 dBH) and a horizontal H+(−30 dBV) output 328 and 330. The horizontal output 330 is fed to two amplifiers 332 and 334 and then to an adder 336. A coupler 338 is connected between amplifiers 332 and 334, and conveys signals through another amplifier 340 and a phase reverser 342 to an adder 344. The vertical output 328 is fed through an amplifier 346 to adder 344, which produces an output V+(−60 dBH) 348. A coupler 350 picks up the vertical output 328 before amplifier 346, conveys them through another amplifier 352 and a phase reverser 354, and finally to adder 336, which produces an output H+(−60 dBV) 358.

The present invention offers an alternative cross polarization cancellation scheme that assumes the signals sent in the horizontal and vertical polarization have pilot carriers on each to identify them. That is, on the signals sent horizontally, there is a CW pilot carrier different from the CW pilot carrier sent with the vertically polarized signals.

FIG. 46 furnishes a schematic diagram 360 of a cross-polarization cancellation scheme. The cross-polarization cancellation circuit includes an antenna 362 which produces horizontal and vertical outputs 364 and 365. The horizontal output 364 flows through a mixer 366, a filter 368, and two splitters 370 and 372. Output 374 is a horizontal signal with canceled cross-polarization. Splitter 370 conveys a portion of the horizontal signal to a variable attenuator 376, a phase shifter 378 and a coupler 380 which directs its own output into the link which connects the two splitters 370 and 372. Splitter 372 conveys a portion of the horizontal component to a vertical pilot filter 382 which, in turn, provides an output to a controller 384 that is coupled to phase shifters 378 and 398. An oscillator 390 supplies a signal through an amplifier 388 to a splitter 386 which feeds both mixers 366 and 391.

The vertical output 365 of the antenna 362 is conducted through a mixer 391, a filter 392 and another splitter 394. The two outputs of splitter 394 are fed to a variable attenuator 396 and yet another splitter 402. The variable attenuator 396 is linked to a phased shifter 398 which is also linked to a coupler 400. Splitter 402 passes signals to both a horizontal pilot filter 404 which has an output that is fed to controller 384. Splitter 402 also provides a flow of signals to an output 406 which is a vertical component with canceled cross-polarization 406.

The squares in FIG. 46 marked "H" and "V" represent the horizontal and vertical portions of the antenna 362. In practice, the horizontal and vertical portions of the antenna 362 must be co-located in order to have the phase relations between a signal and its cross-polarized signal be as constant as possible. Additionally, the signals received from both the horizontal and vertical ports on the antenna 362 are converted down to an IF frequency to make the signal processing simpler. The oscillator LO for both antenna ports must therefore be the same and must feed two identical mixers in an identical manner. The IF filters in each of the down converted ports must also be identical. The signals that arrive from the horizontal and vertical ports then are treated identically up until the points marked IFH and IFV.

The signals at the IFH and IFV are splits in two directions each. One portion is sent to a splitter that allows some of the signal to pass on to the output, and the other portion to be used to recover the pilot carrier of the oppositely polarized channel. This signal is used to determine the level of cancellation of the cross polarized signal.

The other direction that the IFH and IFV signal travels is to a phase shifter and then a variable attenuator. After the signal passes through the phase and amplitude correction, it travels to a directional coupler. When the phase and amplitude of this signal is adjusted to be exactly equal and in opposite phase with the cross polarized signal traveling on the other side of the coupler, then cancellation will occur in the main line output for the non cross polarized signal.

The controller 384 shown in the middle of the diagram manages the error signals (pilot carriers) and adjusts the attenuators 376 and 396 and phase shifters 378 and 398 to minimize the respective pilot carriers.

Consider, for example, that the cross polarized signal is −20 dB from the main signal. This signal is split off and detected for the controller 384. A representation of this signal comes from the opposite polarized antenna. It is not attenuated. The signal level must be attenuated by 20 dB through the action of the attenuator and the coupling level of the directional coupler. Gain therefore is not needed in this cancellation scheme for the main line correction. This feature of the invention permits antennas from adjacent sectors to be positioned over a wider range of cross-over distances extending from the sector edge more towards the center of the sector.

Video Delivery

One embodiment of the invention offers video services. The system can handle a block of 40 to 70 broadcast channels, including about 12 off-air channels, delivered in AM NTSC format for tuning at the customer's TV set. This entire block could be received on a cable-ready set without the need for a set-top box.

Additional delivery capacity would be dedicated to digital channels, containing Near Video on Demand (NVOD) and Interactive Video on Demand (IVOD) transmissions. The preferred format for these channels is 64 QAM or 16 VSB modulation, with eight digital subchannels carried in each 6 MHZ of spectrum. A total of 320 digital delivery ~subchannels would be provided for each 100 MHZ block under this approach. Of these, it is expected that 80 would initially be IVOD channels; the ratio of IVOD and NVOD will grow over time.

Block Scrambling

Wireless delivery faces a greater challenge than fiber/coax in that its signals are perceived to be more susceptible to piracy than those transmitted on wireline systems. The historical solution to this problem, as employed by MMDS wireless cable operators for many years, is to scramble each channel at the headend and use a set-top box to descramble the channel as it is selected for viewing. The same approach will work for the Sectorized Multi-Function Communication System. For operation without a set-top box, however, a different technique must be found. Ideally, it would be desirable to scramble the entire broadcast block for radio transmission, and descramble it in the Customer Interface Unit (CIU).

The system shown in FIG. 47 employs block scrambling that relies on computer-controlled frequency hopping techniques. This approach requires that a small amount of the available spectrum be reserved for the block to be scrambled. Over time, the frequency bandpass for the block will be shifted up and down within the reserved range. Each NCIU contains a processor and a frequency synthesizer that will empower it to follow these frequency shifts as they occur.

FIG. 47 is a schematic diagram 408 of a block scrambling feature, useful for reducing the possibility of unauthorized reception of wireless transmissions. The transmissions from a sectorized antenna 46 are contained in a block of spectrum 410 (shown at time=$t_1$,) which is less than the total envelope of frequency which is available. At varying intervals the entire block is shifted up or down within the envelope, as indicated by reference character 411 (shown at time=$t_2$). The customer interface unit 44 tracks these shifts, adjusting its down-converter as required to maintain a constant output to a television TV or other attached device.

Descrambling

A code indicating the next frequency to be used must be distributed to all NCIUs before the change occurs. To distribute this information at lowest system overhead, the NCIUs are divided into groups based on their serial numbers. A simple example consisting of 99 groups, with codes derived from the last two digits of the serial number is shown in the diagram 416 presented in FIG. 48. This drawing depicts a transmission from a sectorized antenna 46 to a customer interface unit 44. A control channel is reserved for the transmission of the code.

Each group is assigned a key, i.e., a selection pattern to be used for decoding transmissions from the node. The key 418 provides the CIU control processor with the information it requires to anticipate the block frequency changes imposed on the transmission from the sectorized antenna 46. In the example shown, the key is 418, indicating that the fourth, fifth and eighth bits of the frequency code are to be selected.

Before changing frequency, a message containing sufficient bits to convey the desired information to all NCIUs is prepared at the node. It is transmitted on the pilot channel, which also serves to synchronize NCIU operation. At a common moment, all NCIU controllers 114 will reset their synthesizers to match the new standard. For video programs within the block, it may be necessary to perform a frame synchronization at the headend, as has been done in other services for purposes of rescrambling.

Invalidating Pirates Part of the plan for defeating attempts to pirate wireless transmissions include a scheme for invalidating the operation of an NCIU that has been stolen or reverse engineered to obtain free service. This can be achieved with the proposed design, using the technique shown in FIG. 49.

Three general features of the design make piracy difficult:

Dependence on a software algorithm to decode the transmitted message;

Assignment of membership in a group, based on a hidden code; and

The ability of the individual NCIU to respond to commands sent from the sectorized antenna controller 32.

Using the third feature, a pirate unit can be invalidated when the need arises. If it is determined that a knockoff or stolen unit is stealing service, a new key can be distributed to all other members of the group in its locality. When the change is complete, the contents of the frequency code can be altered in such a way that a unit using the old key will no longer be able to determine the correct frequency. As a convenient means of suspending a legitimate unit for nonpayment of bills, a code can be transmitted to the CIU that will make it incapable of decoding any frequency information until it is replaced.

FIG. 49 furnishes a diagram 422 which shows a sectorized antenna 46 transmitting a new key 424 to a legitimate subscriber CIU.

Interdiction

The descrambled block will leave the NCIU in clear form, ready for connection to a cable-ready television. It is clearly mandatory, however, to be able to withhold specific services from the customer in order to collect a monthly subscription charge or a one-time payment for a pay-per-view event. Ideally, it should be possible to enable or interdict any channel at any time, on command from the node controller 32.

FIG. 50 exhibits a diagram 428 shows how channel interdiction could be accomplished using the basic system design. An interdict table is transmitted to each NCIU on startup, and again whenever any service changes are made. The NCIU controller 114 cycles semi-continuously through the channels of the broadcast block, excluding any that form part of the basic service package. When it discovers a channel that should be blocked, it causes a burst of noise to be injected into that frequency band. By repeating this positive interdiction procedure at frequent enough intervals, reception should be effectively disrupted. The duty cycle for this function can be determined through laboratory testing.

With this combination of feature to provide block scrambling and channel interdiction, it will be possible to accomplish the goal of providing secure, flexible service without a set-up box SIB. Some additional cost would be incurred to implement this system, as opposed to one providing pure bandpass delivery. The incremental cost would be considerably below the cost of providing a set-top unit. Operational costs should also be significantly reduced.

If a set-top box STB is present, or if an alternative means can be found to identify the channel requested at the TV set, additional functionality can be obtained. Given this knowledge, for example, interdiction can be imposed on a set-by-set basis, rather than for an entire household at a time. Likewise, interdiction can become more creative, offering the viewer, for example, an opportunity to subscribe on the spot to a blocked program, rather than just injecting noise into the channel.

FIG. 50 depicts the use of a customer interface unit 44 to prevent the unauthorized reception of specific transmissions by specific customers. Transmissions 430 from the sectorized antenna 46 are received at the CIU antenna 432 and down-converted into a block containing all the original channels of information 434. To prohibit the receipt of certain channels, e.g., pay-per-view TV programs not subscribed to by the customer, the CIU controller 114 examines an interdict table 438 transmitted periodically by the node controller 32 over the control channel. If a channel is indicated as appropriate for interdiction, the CIU controller 114 injects noise into that channel 440 as it emerges from the unit.

Advanced Modulation Schemes

The present invention will be capable of accommodating spectrally efficient modulation schemes such as 64 QAM and 16 VSB.

Single-Channel Output

The delivery system described above assumes that a tuning device of some sort is available for isolating a single channel from the output of the NCIU receiver. For television service this is an appropriate assumption, and the output from the NCIU receiver should be a passband containing multiple channels. For other services, however, it may be useful to include in the NCIU the ability to tune to a selected channel of a bandwidth suitable for a connected device such as a computer or telephone.

Back Channels

Two types of return channel can be considered for the LMDS system. For applications with light duty cycles, such as program selection, a shared channel will be the most economic approach. Such a channel could be transmitted through the same antenna used to receive signals from the node. For interactive use, as well as voice or data services, a dedicated channel will be required. However, by assigning some additional functionality to the node it should be possible to take advantage of the fact that less than 100% of these channels will be connected at any given time. Using a polling procedure or equivalent, the node controller 32 can be notified by an NCIU of the desire of a customer to use one of a pool of dedicated channels. Through a response directed to that unit, its controller 114 can be required to tune to a selected channel for its transmission. At the end of the call, the channel is returned to the pool of available resources. This procedure is illustrated in FIG. 51.

FIG. 51 is a diagram 442 that illustrates the use of the present invention to perform local switching functions. This feature maximizes the utilization of the available spectrum. The node controller 32 supervises this function through an interchange of information with customer interface units 44 over the control channel 443 included in the transmitted block 444. To receive or transmit information, the CIU controller 114 requests a channel appropriate for its attached device 246. If this capacity is available, the controller 32 identifies a channel 446 to the CIU controller 114, which proceeds to tune its input or output frequency to that band.

CONCLUSION

Although the present invention has been described in detail with reference to particular preferred and alternative embodiments, persons possessing ordinary skill in the art to which this invention pertains will appreciate that various modifications and enhancements may be made without departing from the spirit and scope of the Claims that follow. The various hardware configurations that have been disclosed above are intended to educate the reader about preferred and alternative embodiments, and are not intended to constrain the limits of the invention or the scope of the Claims. The List of Reference Characters which follows is intended to provide the reader with a convenient means of identifying elements of the invention in the Specification and Drawings. This list is not intended to delineate or narrow the scope of the Claims.

LIST OF REFERENCE CHARACTERS

10A Sectorized Multi-Function Communication System—One-Way Embodiment
10B Sectorized Multi-Function Communication System—Two-Way Embodiment
11 Sectorized cell
12 First sector
14 Second sector
15A Transmitting antenna array
15B Transmitting and receiving antenna array
16 Transmitting antenna
17A Transmitting antenna array
17B Transmitting and receiving antenna array
18 Transmitting antenna
19 Beamwidth
20 First receiver
22 Second receiver
24T Transmitting antenna
24R Receiving antenna
26T Transmitting antenna
26R Receiving antenna
28 First transceiver
30 Second transceiver
32 Controller
34 Schematic depiction of selective coverage to geographic areas
36 Illustration of selective bandwidths for sectors having different communications requirements
38 Residential sector
40 Commercial sector
42 Schematic depiction of line of sight requirements
44 Customer Interface Unit
46 Sectorized antenna
47 Square planar antenna array
48 Substrate
49 Feed detail
50 Rectangular planar antenna array
52 First 1,000 MHZ bandwidth block usage diagram
54 Second 1,000 MHZ bandwidth block usage diagram
56 Third 1,000 MHZ bandwidth block usage diagram
58 System overview
60 Network
62 Sectorized hub design
64 Outgoing signals
66 Incoming signals
71 Block diagram showing switching and transmission
70 Point-to-point microwave links
72 Antenna
73 Signals from TV headend
74 Signals from video server
75 Signals from PSTN
76 Switch circuitry
77 Fixed block output
78 Switched channel output
79 Fixed channel output
80 Upconverters
81 Diagram depicting requests for service
82 Node transmitter
83 Diagram showing dual-frequency system
84 Off-hook signal
85 Up/Down conversion
86 Dedicated channels
88 One-way transmission
89 Demultiplexer
90 Two-way transmission
91 Cable television network signal distribution system
92 Switch
93 Customer terminals
94 Telephone network signal distribution system
95 Network extension system
96 Server
97 Electronic switching system
98 Dedicated fiber links
99 Fiber trunks
100 Nodes
101 Level 1 system
103 Interface modules
104 Up converter
105 Multiplexer
106 Transmit array
107 Customer interface unit receiving antenna array
108 Level 2 system
109 Node controller
110 Level 3 system
111 Receive array
112 Shared return channel
113 Down converter
114 Customer interface unit controller
116 CIU receive antenna
117 CIU transmit antenna
118 Level 4 system
120 Level 5 system
122 Level 6 system 124 Single-family residence
125 Residential antenna
126 Multiple-dwelling apartment
128 Channel allocation diagram
130 Standard broadcast channels
132 Additional broadcast channel block
134 Additional broadcast channel block
136 Premium broadcast channel
138 Interdict table
140 Node block diagram
142 Fiber trunks
144 Optical/electrical converter
146 Signal/control link
148 Independent up- and down-converters
150 Frequency division modulation multiplexer/up-converter
152 Transmitter
154 Receiver
156 Frequency division modulation demultiplexer/down-converter
157 Electrical/optical converter
158 Switch
160 Sector 1 demultiplexer
161 Single channel buses
162 Sector 2 multiplexer
163 Switches
164 Sector 2 demultiplexer
166 Sector 2 multiplexer
168 Sector 3 demultiplexer
170 Sector 3 multiplexer
172 POP interface
174 POP demultiplexer
176 Variable up-converters
178 Switches
180 Variable down-converters
182 POP multiplexer
184 Alternate point-to-point routing diagram
186 City center
188 Diagram showing how links are tailored to traffic density
190 Single-user transceiver block diagram
192 Roof top
194 Office within building
196 Transceiver
198 Antenna
199 Antenna
200 Local oscillator
202 Modem
204 Fiber interface in transceiver
206 Control circuitry
208 DC power
210 Fiber interface in building
212 Coder/decoder
214 Device
216 Multi-user transceiver block diagram
218 Demodulator No. 1
220 Demodulator No. 10
222 Control circuitry
224 Modulator No. I
226 Modulator No. 10
228 Fiber optic interface
230 Fiber optic interface in building
232 Half duplex device
234 Full duplex device
236 Wait state diagram
238 Control channel
240 Switch
242 Control
244 Buffer
246 Device
248 Transmit diagram
250 Data channel
258 Hexagonal array
261 Antenna Array No. 1
262 Antenna Array No. 2
263 Antenna Array No. 3
264 Antenna Array No. 4
265 Antenna Array No. 5
266 Antenna Array No. 6
271 Sector 1
272 Sector 2
273 Sector 3
274 Sector 4
275 Sector 5
276 Sector 6
284 Vertically polarized beam from Antenna Array 4
285 Horizontally polarized beam from Antenna Array 5
286 Vertically polarized beam from Antenna Array 6
294 Receive antenna for Sector 4-Vertically polarized
295 Receive antenna for Sector 5-Horizontally polarized
296 Receive antenna for Sector 6-Vertically polarized
298 Conventional antenna output
300 Output with beam shaping
302 Beam at −1.0 degrees elevation
304 Beam at −2.17 degrees elevation
306 Beam at −4.3 degrees elevation
308 Receiver position at ½ mile
310 Receiver position at one mile
312 Receiver position at two miles
314 Shroud
316 Undesired side-lobe energy
318 Desired transmitted energy
320 Antenna signal processing block diagram
322 Vertically polarized signals
324 Horizontally polarized signals
326 Antenna
328 Vertical output
330 Horizontal output
332 Amplifier
334 Amplifier
336 Adder
338 Coupler
340 Amplifier
342 Phase reverser
344 Adder
346 Amplifier
348 Adder output
350 Coupler
352 Amplifier
354 Phase reverser
358 Adder output
360 Cross polarization cancellation circuitry block diagram
362 Antenna
364 Horizontal signal
365 Mixer
366 Mixer
368 Filter
370 Splitter
372 Splitter
374 Horizontal signal output
376 Variable attenuator
378 Phase shifter
380 Potentiometer
382 Vertical pilot filter 384 Controller
386 Splitter
388 Amplifier
390 Oscillator
391 Mixer
392 Filter
394 Splitter
396 Variable attenuator
398 Phase shifter
400 Potentiometer
402 Splitter
404 Horizontal pilot filter
406 Vertical signal output
408 Block scrambling diagram
410 Transmitted block at Time 1
411 Transmitted block at Time 2
416 Descrambling block diagram
418 Key
420 Premises unit
422 Diagram showing method of invalidating pirates
424 New key
426 Pirate unit
428 Diagram showing channel inderdiction
430 Radio frequency signal
432 Customer premises unit
434 Downconverted channels
436 Controller
438 Interdict table
440 Interdicted channels
442 Diagram showing local switching function
443 Control channel
444 1,000 MHZ block
446 Pool of dedicated channels
448 Customer premises
AM Amplitude modulation
B Buildings
CIU Customer interface unit
dB Decibel
DEMUX Demultiplexer
ESS Electronic switching system
FD Full duplex
FDM Frequency division modulation
FL Fiber link
FM Frequency modulation
GHz Giga Hertz
IID Half duplex
IF Intermediate frequency
IIU Interactive interface unit
IVOD Interactive video on demand
KBPS Kilo bits per second
KHz Kilo Hertz
LMDS Local multi-point distribution system
M Mountains
MBPS Mega bits per second
MHZ Mega Hertz
MUX Multiplexer
N Node
NVOD Near video on demand
P Pole
PC Personal computer
POP Point of presence
PSTN Public switched telephone network
RA Remote areas
RC Rain clouds
RF Radio frequency
STB Set-top box
TP Telephone
TR Trees
TV Television
TWT Traveling wave tube

What is claimed is:

1. A cell-based wireless communication system comprising:
at least first and second transmitting antennas, each antenna positioned for transmitting signals to an associated different sector of a cell and having a beamwidth of a maximum of fifteen degrees; and
at least one receiver located within each sector for receiving a signal from said transmitting antenna associated with the sector.

2. A communication system according to claim 1 wherein said at least first and second transmitting antennas transmit high-bandwidth communication signals.

3. A communication system according to claim 1 wherein said at least one receiver located within each sector is located at a fixed site.

4. A communication system according to claim 1 wherein said at least first and second transmitting antennas are dedicated to serve only the associated sector.

5. A communication system according to claim 1 wherein said at least one receiver located within each sector is adapted to receive only signals from the transmitting antenna associated with the sector in which the at least one receiver is located.

6. A communication system according to claim 1 further comprising a plurality of each of said at least first and second transmitting antennas forming respective antenna arrays.

7. A communication system according to claim 6 further comprising means for distributing power to said antenna arrays so that the centermost antennas radiate more power than the antennas at the periphery.

8. A communication system according to claim 6 wherein the antenna arrays form beams of adjacent sectors that are alternately polarized.

9. A communication system according to claim 1 wherein both of said first and said second transmitting antennas are low sidelobe antennas for reducing the sidelobe in adjacent sectors.

10. A communication system according to claim 1 further comprising a receiving antenna associated with each sector, and a transmitter associated with each receiver for providing two-way communication in each sector.

11. A cell-based wireless communication system comprising:
at least first and second antenna arrays, each of said at least first and second antenna arrays including at least a transmitting antenna positioned for transmitting high-bandwidth communication signals only to an associated different sector of a cell and having a beamwidth of a maximum of fifteen degrees, and at least a receiving antenna positioned for receiving communication signals only from a transceiver located within the associated sector; and
at least one transceiver located at a fixed site within each sector for receiving signals from only said transmitting antenna associated with the sector and for transmitting signals only to said receiving antenna associated with the sector.

* * * * *